United States Patent
Zuo

(10) Patent No.: US 10,263,889 B2
(45) Date of Patent: Apr. 16, 2019

(54) DATA FORWARDING METHOD, DEVICE, AND SYSTEM IN SOFTWARE-DEFINED NETWORKING

(71) Applicant: HUAWEI TECHNOLOGIES CO., LTD., Shenzhen, Guangdong (CN)

(72) Inventor: Shaofu Zuo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/623,489

(22) Filed: Jun. 15, 2017

(65) Prior Publication Data

US 2017/0310588 A1  Oct. 26, 2017

Related U.S. Application Data

(63) Continuation of application No. PCT/CN2014/094136, filed on Dec. 17, 2014.

(51) Int. Cl.
*G06F 15/173* (2006.01)
*H04L 12/741* (2013.01)
(Continued)

(52) U.S. Cl.
CPC .......... *H04L 45/74* (2013.01); *H04L 12/6418* (2013.01); *H04L 45/34* (2013.01);
(Continued)

(58) Field of Classification Search
CPC ......... H04L 45/74; H04L 45/64; H04L 45/02; H04L 45/54; H04L 45/745; H04L 69/22; H04L 12/6418
(Continued)

(56) References Cited

U.S. PATENT DOCUMENTS 9,451,053 B1 * 9/2016 Jindal .................... H04L 69/08
9,619,429 B1 * 4/2017 Wang ............... G06F 15/17331
(Continued)

FOREIGN PATENT DOCUMENTS

CN  102857416 A  1/2013
CN  103329488 A  9/2013
(Continued)

OTHER PUBLICATIONS

"Segment Routing", CCO presentation, ask-segment-routing@cisco.com, Mar. 21, 2013, XP055412512, 32 pages. https://www.slideshare.net/getyourbuildon/segment-routing-nework0-enablement-for-application.

(Continued)

Primary Examiner — Imad Hussain
(74) Attorney, Agent, or Firm — Fish & Richardson P.C.

(57) ABSTRACT

Data forwarding method, device, and system are provided for software-defined networking. An SDN control device delivers a proactive flow entry according to network topology information, where the proactive flow entry is unrelated to a service, and instead related to the network topology information. The proactive flow entry may be reused during data forwarding. After data is received, the SDN control device delivers reactive flow entries to some switching devices, where the reactive flow entries are related to the service, but are delivered to a subset of switching devices. This reduces flow entries delivered by the SDN control device to some switching devices, so that occupation of resources of the SDN control device and a switching device by flow entries is reduced.

24 Claims, 25 Drawing Sheets

(51) Int. Cl.
*H04L 12/64* (2006.01)
*H04L 12/715* (2013.01)
*H04L 12/721* (2013.01)
*H04L 12/751* (2013.01)
*H04L 29/06* (2006.01)
*H04L 12/18* (2006.01)
*H04L 12/931* (2013.01)
*H04L 12/723* (2013.01)

(52) U.S. Cl.
CPC .............. *H04L 45/64* (2013.01); *H04L 12/18* (2013.01); *H04L 12/1854* (2013.01); *H04L 45/02* (2013.01); *H04L 45/38* (2013.01); *H04L 45/50* (2013.01); *H04L 45/54* (2013.01); *H04L 45/745* (2013.01); *H04L 49/201* (2013.01); *H04L 69/22* (2013.01)

(58) Field of Classification Search
USPC ........................................................ 709/243
See application file for complete search history.

(56) References Cited

U.S. PATENT DOCUMENTS

| | | | |
|---|---|---|---|
| 2011/0261722 A1 | 10/2011 | Awano | |
| 2011/0261825 A1 | 10/2011 | Ichino | |
| 2012/0320920 A1 | 12/2012 | Akiyoshi | |
| 2013/0194914 A1* | 8/2013 | Agarwal | H04L 45/245 370/225 |
| 2013/0279371 A1 | 10/2013 | Takashima et al. | |
| 2014/0029410 A1 | 1/2014 | Kannan | |
| 2014/0050223 A1* | 2/2014 | Foo | H04L 47/2441 370/400 |
| 2014/0169158 A1 | 6/2014 | Mishra et al. | |
| 2014/0348171 A1 | 11/2014 | Akiyoshi | |
| 2015/0071289 A1* | 3/2015 | Shin | H04L 45/745 370/392 |
| 2015/0131666 A1* | 5/2015 | Kang | H04L 45/745 370/392 |
| 2015/0180769 A1* | 6/2015 | Wang | H04L 45/38 370/236 |
| 2015/0188804 A1* | 7/2015 | Ashwood-Smith | H04L 47/32 370/392 |
| 2015/0195197 A1* | 7/2015 | Yong | H04L 45/74 370/392 |
| 2015/0200838 A1* | 7/2015 | Nadeau | H04L 45/124 398/58 |
| 2015/0236948 A1* | 8/2015 | Dunbar | H04L 45/22 370/225 |
| 2015/0249572 A1* | 9/2015 | Mack-Crane | H04L 45/38 709/222 |
| 2015/0256397 A1* | 9/2015 | Agarwal | H04L 41/12 370/254 |
| 2015/0304206 A1* | 10/2015 | Filsfils | H04L 45/04 709/238 |
| 2015/0326473 A1* | 11/2015 | Dunbar | H04L 12/4633 370/392 |
| 2015/0358231 A1 | 12/2015 | Zhang et al. | |
| 2016/0036730 A1* | 2/2016 | Kutscher | H04L 45/38 370/401 |
| 2016/0173338 A1* | 6/2016 | Wolting | H04L 41/145 709/223 |
| 2016/0359735 A1* | 12/2016 | Zhao | H04L 45/42 |
| 2017/0012895 A1* | 1/2017 | Zhao | H04L 47/724 |

FOREIGN PATENT DOCUMENTS

| | | |
|---|---|---|
| CN | 103763146 A | 4/2014 |
| CN | 104022953 A | 9/2014 |
| CN | 104158733 A | 11/2014 |
| CN | 104158749 A | 11/2014 |
| EP | 2479937 A1 | 7/2012 |
| JP | 2013522934 A | 6/2013 |
| WO | 2012096131 A1 | 7/2012 |

OTHER PUBLICATIONS

Pablo Cabadas Aguilar, "PCE prototype with segment routing and BGPLS support", Universidad Carlos III de Madrid, Jul. 18, 2014, XP055413000, 88 pages.

Brzozowski, J. et al., "IPv6 segment routing use cases; draft-martin-spring-segment-routing-ipv6-use-cases-00.bd", Internet Engineering Task Force, IETF; Standard Working Draft, Internet Society (ISOC) 4, Rue des Falaises CH-1205, Geneva, Switzerland, Mar. 6, 2014, XP015097488, 12 pages.

Miya Kohno, 13th All about Software Defined Networking (SDN): Segment Routing attracting attention for WAN Realizing hybrid SDN between de-centralized and centralized, Nikkei Communications, vol. 604, Japan, Nikkei Business Publications, Inc., 2014, 23 pages.

Hiroyuki Kitada, Implementation and evaluation of service function chaining method, IEICE Technical Report, Japan, The Institute of Electronics, Information and Communication Engineers, 2014, vol. 114 No. 139, p. 113 to 115.

* cited by examiner

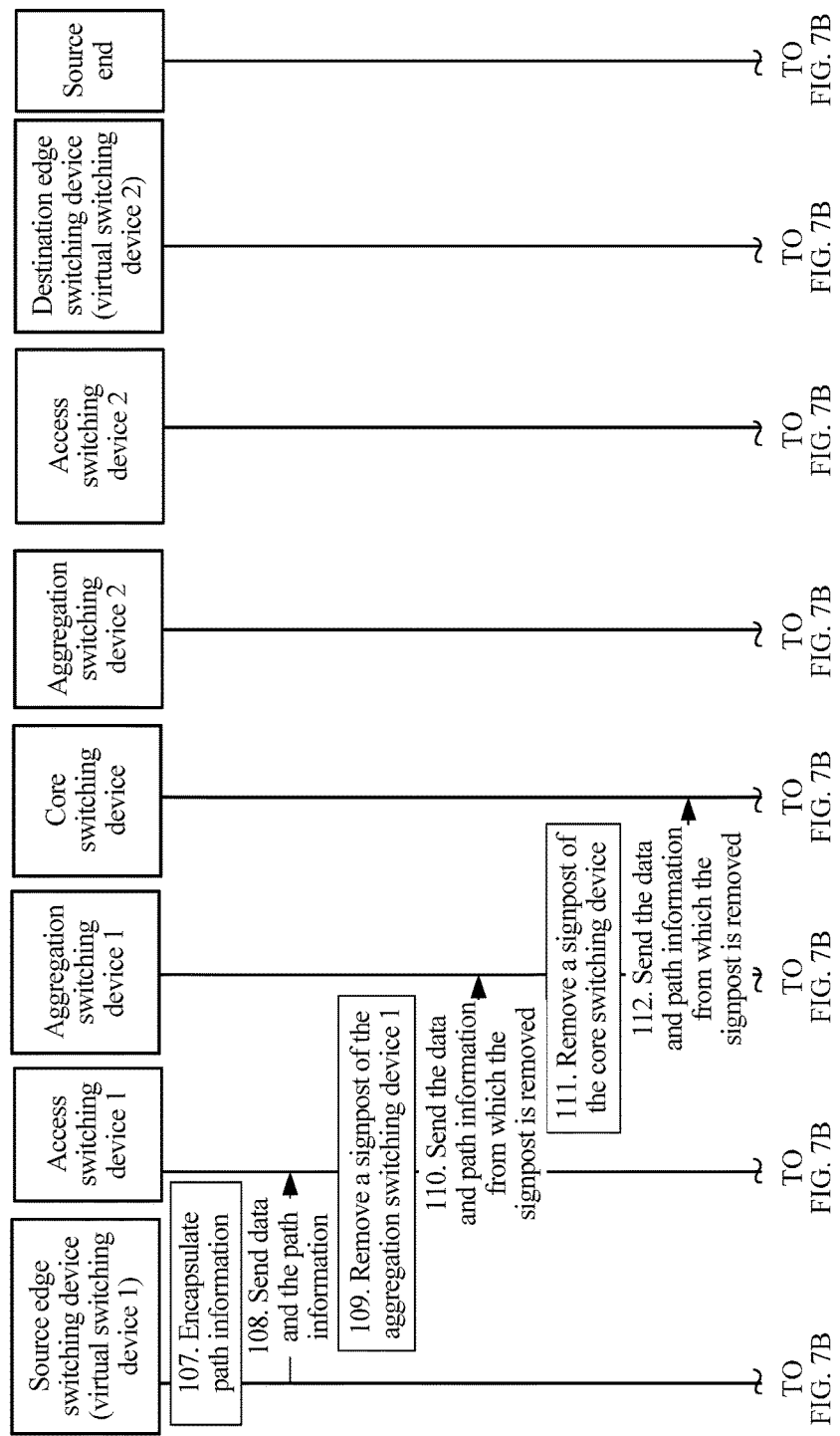

DATA FORWARDING METHOD, DEVICE, AND SYSTEM IN SOFTWARE-DEFINED NETWORKING

CROSS-REFERENCE TO RELATED APPLICATIONS

This application is a continuation of International Application No. PCT/CN2014/094136, filed on Dec. 17, 2014, the disclosure of which is hereby incorporated by reference in its entirety.

TECHNICAL FIELD

The present invention relates to the field of information technologies, and in particular, to a data forwarding method, device, and system in software-defined networking (Software Defined Networking, SDN).

BACKGROUND

With continuous development of technologies, construction of a data center (Data Center, DC) faces various severe challenges. How to improve a DC resource utilization rate and how to reduce DC energy consumption and costs become problems of concern.

Virtualization provides a direction for construction and development of a new generation data center. A virtualization technology helps the data center integrate hardware resources, establish a virtual resource pool, implement global resource sharing, perform distribution according to service requirements, so as to improve a comprehensive utilization rate of a system resource and reduce energy consumption of a device.

Data center virtualization requires network virtualization. A conventional network mode exposes many disadvantages in a data center virtualization network. A concept of decoupling a control plane of a network device from a data plane of the network device in SDN coincides with a virtualization network.

In SDN, the OpenFlow protocol may be used to decouple a control plane of a network device from a data plane of the network device to implement flexible control of network traffic. With evolution of a series of versions, the OpenFlow protocol is gradually standardized, tends to become mature, and forms a standard. The OpenFlow protocol supports a function of querying a flow entry according to any combination of fields, and proposes a concept of a multi-level flow entry. A size of a flow entry and a quantity of flow entries become a bottleneck that urgently needs to be broken through for an existing chip to support the OpenFlow protocol.

Each time end-to-end communication is implemented in the SDN, an SDN control device delivers a flow entry to each involved switching device. With an increase of switching devices at lower layers, flow entries of a switching device in a backbone network continuously multiply. A large number of flow entries occupy resources of a control device in the SDN and the switching device in the backbone network in the SDN, and affect performance of devices in the SDN.

SUMMARY

Embodiments of the present invention provide a data forwarding method, device, and system in SDN, to resolve a problem in the prior art that performance of a device in SDN is not high because of excessive flow entries.

To achieve the foregoing objective, technical solutions used in the embodiments of the present invention are as follows:

According to a first aspect, an embodiment of the present invention provides a software-defined networking SDN system for implementing data forwarding, where the SDN system includes an SDN control device and n switching devices, a first switching device is a switching device connected to a source end of data, an $n^{th}$ switching device is a switching device connected to a destination end of the data, and n≥3; where:

the first switching device is configured to request a forwarding rule from the SDN control device, where the request carries characteristic information of the data, and is further configured to: receive a first forwarding rule returned by the SDN control device, where the first forwarding rule includes information about a path from the first switching device to the $n^{th}$ switching device; and send, to a second switching device connected to the first switching device, the data and the information about the path from the first switching device to the $n^{th}$ switching device according to the first forwarding rule; and the second switching device is configured to: receive the data and the information about the path from the first switching device to the $n^{th}$ switching device that are sent by the first switching device; query, according to a signpost of a third switching device in the information about the path from the first switching device to the $n^{th}$ switching device, a second forwarding rule stored in the second switching device; obtain a port, on the second switching device, of the third switching device; and forward the data to the third switching device through the port, on the second switching device, of the third switching device, where the third switching device is a switching device connected to the second switching device.

With reference to the first aspect, in a first possible implementation manner of the first aspect, the information about the path from the first switching device to the $n^{th}$ switching device includes signposts of the third switching device to the $n^{th}$ switching device that are on a data forwarding path; and a match field of the second forwarding rule is the signpost of the third switching device.

With reference to the first possible implementation manner of the first aspect, in a second possible implementation manner of the first aspect, when n≥4, the second switching device is further configured to send, to the third switching device, information about a path from the second switching device to the $n^{th}$ switching device, where the information about the path from the second switching device to the $n^{th}$ switching device includes signposts of a fourth switching device to the $n^{th}$ switching device that are on the data forwarding path, and the fourth switching device is a switching device connected to the third switching device.

With reference to the second possible implementation manner of the first aspect, in a third possible implementation manner of the first aspect, an $i^{th}$ switching device is configured to receive the data and information about a path from an i−$1^{th}$ switching device to the $n^{th}$ switching device that are sent by the i−$1^{th}$ switching device, where the information about the path from the i−$1^{th}$ switching device to the $n^{th}$ switching device includes signposts of an i+$1^{th}$ switching device to the $n^{th}$ switching device that are on the data forwarding path, i is an integer greater than or equal to 3, and i is less than n; and is further configured to: query, according to a signpost of the i+$1^{th}$ switching device, an $i^{th}$ forwarding rule stored in the $i^{th}$ switching device, determine a port, on the $i^{th}$ switching device, of the $i+1^{th}$ switching device according to the $i^{th}$ forwarding rule, and forward the data to the $i+1^{th}$ switching device through the port, on the $i^{th}$ switching device, of the $i+1^{th}$ switching device.

With reference to the third possible implementation manner of the first aspect, in a fourth possible implementation manner of the first aspect, if the $i+1^{th}$ switching device is not the $n^{th}$ switching device, the $i^{th}$ switching device is further configured to send, to the $i+1^{th}$ switching device, information about a path from the $i^{th}$ switching device to the $n^{th}$ switching device according to the $i^{th}$ forwarding rule, where the information about the path from the $i^{th}$ switching device to the $n^{th}$ switching device includes signposts of an $i+2^{th}$ switching device to the $n^{th}$ switching device that are on the data forwarding path, and the $i+2^{th}$ switching device is a switching device connected to the $i+1^{th}$ switching device.

With reference to the fourth possible implementation manner of the first aspect, in a fifth possible implementation manner of the first aspect, that the $i^{th}$ switching device is configured to send, to the $i+1^{th}$ switching device, information about a path from the $i^{th}$ switching device to the $n^{th}$ switching device according to the $i^{th}$ forwarding rule specifically includes:

the $i^{th}$ switching device is configured to: remove the signpost of the $i+1^{th}$ switching device from the information about the path from the $i-1^{th}$ switching device to the $n^{th}$ switching device to obtain the signposts of the $i+2^{th}$ switching device to the $n^{th}$ switching device, and send, to the $i+1^{th}$ switching device, the signposts of the $i+2^{th}$ switching device to the $n^{th}$ switching device, according to the $i^{th}$ forwarding rule.

With reference to any implementation manner of the first to the fifth possible implementation manners of the first aspect, in a sixth possible implementation manner of the first aspect, the first switching device is configured to successively push the signposts of the $n^{th}$ switching device to the third switching device that are on the data forwarding path into a protocol stack, where a signpost of the $n^{th}$ switching device is pushed into the bottom of the stack, and the signpost of the third switching device is pushed into the top of the stack, so that the protocol stack carries the information about the path from the first switching device to the $n^{th}$ switching device.

With reference to the sixth possible implementation manner of the first aspect, in a seventh possible implementation manner of the first aspect, the protocol stack includes a Multiprotocol Label Switching MPLS stack, and one MPLS header of the MPLS stack carries a signpost of one switching device.

With reference to any implementation manner of the first aspect to the seventh possible implementation manner of the first aspect, in an eighth possible implementation manner of the first aspect, the second switching device is configured to identify, according to the signpost of the third switching device, that a next-hop switching device of the data is the third switching device, where the signpost of the third switching device includes at least one of the following: a device identifier of the third switching device, an identifier of the port, on the second switching device, of the third switching device, or an identifier of a link between the third switching device and the second switching device.

With reference to any implementation manner of the first aspect to the eighth possible implementation manner of the first aspect, in a ninth possible implementation manner of the first aspect, the first switching device is further configured to send, according to the first forwarding rule, a tenant identifier to the second switching device connected to the first switching device, so as to send the tenant identifier to the $n^{th}$ switching device by using the second switching device; and the $n^{th}$ switching device is configured to: determine the destination end of the data according to the tenant identifier and the characteristic information of the data, and then send the data to the destination end.

According to a second aspect, an embodiment of the present invention further provides a method for implementing data forwarding, where the method is applied to a software-defined networking SDN system, the SDN system includes an SDN control device and n switching devices, a first switching device is a switching device connected to a source end of data, an $n^{th}$ switching device is a switching device connected to a destination end of the data, and $n \geq 3$; where:

the first switching device requests a forwarding rule from the SDN control device, where the request carries characteristic information of the data; receives a first forwarding rule returned by the SDN control device, where the first forwarding rule includes information about a path from the first switching device to the $n^{th}$ switching device; and sends, to a second switching device connected to the first switching device, the data and the information about the path from the first switching device to the $n^{th}$ switching device according to the first forwarding rule; and the second switching device receives the data and the information about the path from the first switching device to the $n^{th}$ switching device that are sent by the first switching device; queries, according to a signpost of a third switching device in the information about the path from the first switching device to the $n^{th}$ switching device, a second forwarding rule stored in the second switching device; obtains a port, on the second switching device, of the third switching device; and forwards the data to the third switching device through the port, on the second switching device, of the third switching device, where the third switching device is a switching device connected to the second switching device.

With reference to the second aspect, in a first possible implementation manner of the second aspect, the information about the path from the first switching device to the $n^{th}$ switching device includes signposts of the third switching device to the $n^{th}$ switching device that are on a data forwarding path; and a match field of the second forwarding rule is the signpost of the third switching device.

With reference to the first possible implementation manner of the second aspect, in a second possible implementation manner of the second aspect, when $n \geq 4$, the second switching device sends, to the third switching device, information about a path from the second switching device to the $n^{th}$ switching device, where the information about the path from the second switching device to the $n^{th}$ switching device includes signposts of a fourth switching device to the $n^{th}$ switching device that are on the data forwarding path, and the fourth switching device is a switching device connected to the third switching device.

With reference to the second possible implementation manner of the second aspect, in a third possible implementation manner of the second aspect, an $i^{th}$ switching device receives the data and information about a path from an $i-1^{th}$ switching device to the $n^{th}$ switching device that are sent by the $i-1^{th}$ switching device, where the information about the path from the $i-1^{th}$ switching device to the $n^{th}$ switching device includes signposts of an $i+1^{th}$ switching device to the $n^{th}$ switching device that are on the data forwarding path, i is an integer greater than or equal to 3, and i is less than n; and the $i^{th}$ switching device queries, according to a signpost of the $i+1^{th}$ switching device, an $i^{th}$ forwarding rule stored in the $i^{th}$ switching device; and according to the $i^{th}$ forwarding rule, determines a port, on the $i^{th}$ switching device, of the $i+1^{th}$ switching device, and forwards the data to the $i+1^{th}$ switching device through the port, on the $i^{th}$ switching device, of the $i+1^{th}$ switching device.

With reference to the third possible implementation manner of the second aspect, in a fourth possible implementation manner of the second aspect, if the $i+1^{th}$ switching device is not the $n^{th}$ switching device, the $i^{th}$ switching device sends, to the $i+1^{th}$ switching device, information about a path from the $i^{th}$ switching device to the $n^{th}$ switching device according to the $i^{th}$ forwarding rule, where the information about the path from the $i^{th}$ switching device to the $n^{th}$ switching device includes signposts of an $i+2^{th}$ switching device to the $n^{th}$ switching device that are on the data forwarding path, and the $i+2^{th}$ switching device is a switching device connected to the $i+1^{th}$ switching device.

With reference to the fourth possible implementation manner of the second aspect, in a fifth possible implementation manner of the second aspect, that the $i^{th}$ switching device sends, to the $i+1^{th}$ switching device, information about a path from the $i^{th}$ switching device to the $n^{th}$ switching device according to the $i^{th}$ forwarding rule specifically includes:

the $i^{th}$ switching device removes the signpost of the $i+1^{th}$ switching device from the information about the path from the $i-1^{th}$ switching device to the $n^{th}$ switching device to obtain signposts of the $i+2^{th}$ switching device to the $n^{th}$ switching device, and sends, to the $i+1^{th}$ switching device, the signposts of the $i+2^{th}$ switching device to the $n^{th}$ switching device, according to the $i^{th}$ forwarding rule.

With reference to any implementation manner of the first to the fifth possible implementation manners of the second aspect, in a sixth possible implementation manner of the second aspect, the first switching device successively pushes the signposts of the $n^{th}$ switching device to the third switching device that are on the data forwarding path into a protocol stack, where a signpost of the $n^{th}$ switching device is pushed into the bottom of the stack, and the signpost of the third switching device is pushed into the top of the stack, so that the protocol stack carries the information about the path from the first switching device to the $n^{th}$ switching device.

With reference to the sixth possible implementation manner of the second aspect, in a seventh possible implementation manner of the second aspect, the protocol stack includes a Multiprotocol Label Switching MPLS stack, and one MPLS header of the MPLS stack carries a signpost of one switching device.

With reference to any implementation manner of the second aspect to the seventh possible implementation manner of the second aspect, in an eighth possible implementation manner of the second aspect, the second switching device identifies, according to the signpost of the third switching device, that a next-hop switching device of the data is the third switching device, where the signpost of the third switching device includes at least one of the following: a device identifier of the third switching device, an identifier of the port, on the second switching device, of the third switching device, or an identifier of a link between the third switching device and the second switching device.

With reference to any implementation manner of the second aspect to the eighth possible implementation manner of the second aspect, in a ninth possible implementation manner of the second aspect, the first switching device further sends, according to the first forwarding rule, a tenant identifier to the second switching device connected to the first switching device, so as to send the tenant identifier to the $n^{th}$ switching device by using the second switching device; and the $n^{th}$ switching device determines the destination end of the data according to the tenant identifier and the characteristic information of the data, and then sends the data to the destination end.

According to a third aspect, an embodiment of the present invention further provides a method for implementing data forwarding, where the method is applied to a software-defined networking SDN system, the SDN system includes an SDN control device and n switching devices, a first switching device is a switching device connected to a source end of data, an $n^{th}$ switching device is a switching device connected to a destination end of the data, and n≥3; where:

the SDN control device receives a request for a forwarding rule from the first switching device, where the request carries characteristic information of the data;

the SDN control device returns a first forwarding rule to the first switching device according to the characteristic information of the data, where the first forwarding rule is used to instruct the first switching device to send, to a second switching device connected to the first switching device, the data and information about a path from the first switching device to the $n^{th}$ switching device according to the first forwarding rule; and the SDN control device further returns an $n^{th}$ forwarding rule to the $n^{th}$ switching device according to the characteristic information of the data, so that the $n^{th}$ switching device forwards the data to the destination end.

With reference to the third aspect, in a first possible implementation manner of the third aspect, the SDN control device delivers a second forwarding rule to the second switching device according to network topology information of the SDN system, where the second forwarding rule is used to instruct the second switching device to: obtain a port, on the second switching device, of a third switching device by using a signpost of the third switching device in the information about the path from the first switching device to the $n^{th}$ switching device, and forward the data to the third switching device through the port, on the second switching device, of the third switching device, where the third switching device is a switching device connected to the second switching device.

With reference to the first possible implementation manner of the third aspect, in a second possible implementation manner of the third aspect, the SDN control device specifically selects a data forwarding path according to the characteristic information of the data and the network topology information of the SDN system, where the information about the path from the first switching device to the $n^{th}$ switching device includes signposts of the third switching device to the $n^{th}$ switching device that are on the data forwarding path; and a match field of the second forwarding rule is the signpost of the third switching device.

With reference to the second possible implementation manner of the third aspect, in a third possible implementation manner of the third aspect, the SDN control device delivers an $i^{th}$ forwarding rule to an $i^{th}$ switching device according to the network topology information of the SDN system, where the $i^{th}$ forwarding rule is used to instruct the $i^{th}$ switching device to: obtain a port, on the $i^{th}$ switching device, of an $i+1^{th}$ switching device by using a signpost of the i+1$^{th}$ switching device in information about a path from an i−1$^{th}$ switching device to the n$^{th}$ switching device, and forward the data to the i+1$^{th}$ switching device through the port, on the i$^{th}$ switching device, of the i+1$^{th}$ switching device, where i is an integer greater than or equal to 3, and i is less than n.

With reference to the third possible implementation manner of the third aspect, in a fourth possible implementation manner of the third aspect, the information about the path from the i−1$^{th}$ switching device to the n$^{th}$ switching device includes signposts of the i+1$^{th}$ switching device to the n$^{th}$ switching device that are on the data forwarding path; and if the i+1$^{th}$ switching device is not the n$^{th}$ switching device, the i$^{th}$ forwarding rule is further used to instruct the i$^{th}$ switching device to: remove the signpost of the i+1$^{th}$ switching device, and send, to the i+1$^{th}$ switching device, information about a path from the i$^{th}$ switching device to the n$^{th}$ switching device, where the information about the path from the i$^{th}$ switching device to the n$^{th}$ switching device includes signposts of an i+2$^{th}$ switching device to the n$^{th}$ switching device that are on the data forwarding path, and the i+2$^{th}$ switching device is a switching device connected to the i+1$^{th}$ switching device.

With reference to any implementation manner of the first to the fourth possible implementation manners of the third aspect, in a fifth possible implementation manner of the third aspect, the signpost of the third switching device includes at least one of the following: a device identifier of the third switching device, an identifier of the port, on the second switching device, of the third switching device, or an identifier of a link between the third switching device and the second switching device.

With reference to any implementation manner of the third aspect to the fifth possible implementation manner of the third aspect, in a sixth possible implementation manner of the third aspect, the first forwarding rule further instructs the first switching device to send a tenant identifier to the second switching device, so as to send the tenant identifier to the n$^{th}$ switching device by using the second switching device; and the i$^{th}$ forwarding rule further instructs the n$^{th}$ switching device to determine the destination end according to the tenant identifier and the characteristic information of the data.

According to a fourth aspect, an embodiment of the present invention further provides a software-defined networking SDN control device, where the SDN control device is applied to an SDN system, the SDN system further includes n switching devices, a first switching device is a switch device connected to a source end of data, an n$^{th}$ switching device is a switching device connected to a destination end of the data, n≥3, and the SDN control device includes a network communications unit and a forwarding rule management unit, where:

the network communications unit is configured to: receive a request for a forwarding rule from the first switching device, where the request carries characteristic information of the data; and send the request to the forwarding rule management unit;

the forwarding rule management unit is configured to determine a first forwarding rule and an n$^{th}$ forwarding rule according to the characteristic information of the data, where the first forwarding rule is used to instruct the first switching device to send, to a second switching device connected to the first switching device, the data and information about a path from the first switching device to the n$^{th}$ switching device according to the first forwarding rule, and the n$^{th}$ forwarding rule is used to instruct the n$^{th}$ switching device to forward the data to the destination end; and the network communications unit is further configured to: return the first forwarding rule to the first switching device, and return the n$^{th}$ forwarding rule to the n$^{th}$ switching device.

With reference to the fourth aspect, in a first possible implementation manner of the fourth aspect, the SDN control device further includes a topology management unit, where:

the topology management unit is configured to: collect network topology information of the SDN system, and send the network topology information to the forwarding rule management unit;

the forwarding rule management unit is further configured to determine a second forwarding rule according to the network topology information, where the second forwarding rule is used to instruct the second switching device to: obtain a port, on the second switching device, of a third switching device by using a signpost of the third switching device in the information about the path from the first switching device to the n$^{th}$ switching device, and forward the data to the third switching device through the port, on the second switching device, of the third switching device, where the third switching device is a switching device connected to the second switching device; and the network communications unit is further configured to return the second forwarding rule to the second switching device.

With reference to the first possible implementation manner of the fourth aspect, in a second possible implementation manner of the fourth aspect, the forwarding rule management unit is further configured to determine an i$^{th}$ forwarding rule according to the network topology information of the SDN system, where the i$^{th}$ forwarding rule is used to instruct an i$^{th}$ switching device to: obtain a port, on the i$^{th}$ switching device, of an i+1$^{th}$ switching device by using a signpost of the i+1$^{th}$ switching device in information about a path from an i−1$^{th}$ switching device to the n$^{th}$ switching device, and forward the data to the i+1$^{th}$ switching device through the port, on the i$^{th}$ switching device, of the i+1$^{th}$ switching device, where i is an integer greater than or equal to 3, and i is less than n.

With reference to the second possible implementation manner of the fourth aspect, in a third possible implementation manner of the fourth aspect, the information about the path from the i−1$^{th}$ switching device to the n$^{th}$ switching device includes signposts of the i+1$^{th}$ switching device to the n$^{th}$ switching device that are on a data forwarding path; and if the i+1$^{th}$ switching device is not the n$^{th}$ switching device, the i$^{th}$ forwarding rule is further used to instruct the i$^{th}$ switching device to: remove the signpost of the i+1$^{th}$ switching device, and send, to the i+1$^{th}$ switching device, information about a path from the i$^{th}$ switching device to the n$^{th}$ switching device, where the information about the path from the i$^{th}$ switching device to the n$^{th}$ switching device includes signposts of an i+2$^{th}$ switching device to the n$^{th}$ switching device that are on the data forwarding path, and the i+2$^{th}$ switching device is a switching device connected to the i+1$^{th}$ switching device; where the network communications unit is further configured to deliver the i$^{th}$ forwarding rule to the i$^{th}$ switching device.

According to a fifth aspect, an embodiment of the present invention further provides a software-defined networking SDN control device, where the SDN control device includes a processor, a memory, and a communications port, where the communications port is configured to communicate with a switching device in an SDN system, the memory is configured to store a program, and the processor is configured to execute the program to implement any implementation manner of the third aspect to the sixth possible implementation manner of the third aspect.

According to the foregoing method, system, and device for implementing data forwarding, after receiving a second forwarding rule (which may also be referred to as a flow entry), a backbone switching device (for example, a second switching device) does not need to acquire a forwarding rule each time data is being forwarded. Accordingly, an SDN control device does not need to deliver a second forwarding rule to the second switching device each time the data is being forwarded, that is, the second forwarding rule may be reused during subsequent data forwarding. This reduces a quantity of forwarding rules delivered by the SDN control device to the second switching device, and accordingly reduces a device resource occupation rate of the SDN control device; and network bandwidth between the SDN control device and the second switching device is also reduced accordingly. In addition, the second switching device does not need to receive a second forwarding rule each time the data is being forwarded, which improves a resource utilization rate of the second switching device.

According to a sixth aspect, an embodiment of the present invention further provides a software-defined networking SDN system for implementing data forwarding, where the SDN system includes an SDN control device and at least two service devices, the at least two service devices include a first service device and a second service device, the first service device is connected to a first switching device, and the second service device is connected to a second switching device; where:

the first switching device is configured to receive data and an identifier of the first service device;

the first switching device is configured to: delete the identifier of the first service device and send the data to the first service device for processing, according to a first forwarding rule received from the SDN control device; and receive the data processed by the first service device; and the first switching device is further configured to execute one of the following according to a second forwarding rule received from the SDN control device:

when the first switching device is connected to the second switching device, the first switching device is configured to send the data processed by the first service device and an identifier of the second service device to the second switching device; or when the first switching device is not connected to the second switching device, the first switching device is configured to send, to a third switching device, the data processed by the first service device, an identifier of the second service device, and information about a path from the first switching device to the second switching device, where the third switching device is a switching device connected to the first switching device.

With reference to the sixth aspect, in a first possible implementation manner of the sixth aspect, when the second service device is a destination service device, the second switching device is configured to delete the identifier of the second service device and forward the data processed by the first service device to the second service device, according to a third forwarding rule; or when the second service device is not a destination service device, the second switching device is configured to: delete the identifier of the second service device and forward the data processed by the first service device to the second service device, according to a third forwarding rule; and receive the data processed by the second service device.

With reference to the sixth aspect or the first possible implementation manner of the sixth aspect, in a second possible implementation manner of the sixth aspect, the information about the path from the first switching device to the second switching device includes signposts of a fourth switching device to the second switching device that are on a forwarding path of the data processed by the first service device, where the fourth switching device is a switching device connected to the third switching device.

With reference to the second possible implementation manner of the sixth aspect, in a third possible implementation manner of the sixth aspect, the third switching device is configured to: query, according to a signpost of the fourth switching device, a fourth forwarding rule stored in the third switching device; and according to the fourth forwarding rule, determine a port, on the third switching device, of the fourth switching device, and forward the data processed by the first service device to the fourth switching device through the port, on the third switching device, of the fourth switching device.

With reference to the third possible implementation manner of the sixth aspect, in a fourth possible implementation manner of the sixth aspect, if the fourth switching device is not the second switching device, the third switching device is further configured to send, to the fourth switching device, information about a path from the third switching device to the second switching device according to the fourth forwarding rule.

With reference to the fourth possible implementation manner of the sixth aspect, in a fifth possible implementation manner of the sixth aspect, that the third switching device is further configured to send, to the fourth switching device, information about a path from the third switching device to the second switching device according to the fourth forwarding rule specifically includes:

the third switching device removes the signpost of the fourth switching device from the information about the path from the first switching device to the second switching device to obtain the information about the path from the third switching device to the second switching device, and sends, to the fourth switching device, the information about the path from the third switching device to the second switching device, according to the fourth forwarding rule.

With reference to any implementation manner of the second to the fifth possible implementation manners of the sixth aspect, in a sixth possible implementation manner of the sixth aspect, the first switching device successively pushes, into a protocol stack, the identifier of the second service device and the signposts of the second switching device to the fourth switching device that are on the forwarding path of the data processed by the first service device, where the identifier of the second service device is pushed into the bottom of the stack, a signpost of the second switching device is pushed into an upper layer of the bottom of the stack, and the signpost of the fourth switching device is pushed into the top of the stack.

With reference to any implementation manner of the second to the sixth possible implementation manners of the sixth aspect, in a seventh possible implementation manner of the sixth aspect, the third switching device is configured to identify, according to the signpost of the fourth switching device, that a next-hop switching device of the data is the fourth switching device, where the signpost of the fourth switching device includes at least one of the following: a device identifier of the fourth switching device, an identifier of the egress port, on the third switching device, of the fourth switching device, or an identifier of a link between the fourth switching device and the third switching device.

According to a seventh aspect, an embodiment of the present invention further provides a method for implementing data forwarding, where the method is applied to a software-defined networking SDN system, the SDN system includes an SDN control device and at least two service devices, the at least two service devices include a first service device and a second service device, the first service device is connected to a first switching device, and the second service device is connected to a second switching device; where:

the first switching device receives data and an identifier of the first service device;

the first switching device deletes the identifier of the first service device and sends the data to the first service device for processing, according to a first forwarding rule received from the SDN control device; and receives the data processed by the first service device; and the first switching device executes one of the following according to a second forwarding rule received from the SDN control device:

when the first switching device is connected to the second switching device, the first switching device sends the data processed by the first service device and an identifier of the second service device to the second switching device; or when the first switching device is not connected to the second switching device, the first switching device sends, to a third switching device, the data processed by the first service device, an identifier of the second service device, and information about a path from the first switching device to the second switching device, where the third switching device is a switching device connected to the first switching device.

With reference to the seventh aspect, in a first possible implementation manner of the seventh aspect, when the second service device is a destination service device, the second switching device deletes the identifier of the second service device and forwards the data processed by the first service device to the second service device, according to a third forwarding rule; or when the second service device is not a destination service device, the second switching device deletes the identifier of the second service device and forwards the data processed by the first service device to the second service device, according to a third forwarding rule; and receives the data processed by the second service device.

With reference to the seventh aspect or the first possible implementation manner of the seventh aspect, in a second possible implementation manner of the seventh aspect, the information about the path from the first switching device to the second switching device includes signposts of a fourth switching device to the second switching device that are on a forwarding path of the data processed by the first service device, where the fourth switching device is a switching device connected to the third switching device.

With reference to the second possible implementation manner of the seventh aspect, in a third possible implementation manner of the seventh aspect, the third switching device queries, according to a signpost of the fourth switching device, a fourth forwarding rule stored in the third switching device; and according to the fourth forwarding rule, determines a port, on the third switching device, of the fourth switching device, and forwards the data processed by the first service device to the fourth switching device through the port, on the third switching device, of the fourth switching device.

With reference to the third possible implementation manner of the seventh aspect, in a fourth possible implementation manner of the seventh aspect, if the fourth switching device is not the second switching device, the third switching device further sends, to the fourth switching device, information about a path from the third switching device to the second switching device according to the fourth forwarding rule.

With reference to the fourth possible implementation manner of the seventh aspect, in a fifth possible implementation manner of the seventh aspect, that the third switching device further sends, to the fourth switching device, information about a path from the third switching device to the second switching device according to the fourth forwarding rule specifically includes:

the third switching device removes the signpost of the fourth switching device from the information about the path from the first switching device to the second switching device to obtain the information about the path from the third switching device to the second switching device, and sends, to the fourth switching device, the information about the path from the third switching device to the second switching device, according to the fourth forwarding rule.

With reference to any implementation manner of the second to the fifth possible implementation manners of the seventh aspect, in a sixth possible implementation manner of the seventh aspect, the first switching device successively pushes, into a protocol stack, the identifier of the second service device and signposts of the second switching device to a fifth switching device that are on the forwarding path of the data processed by the first service device, where the identifier of the second service device is pushed into the bottom of the stack, a signpost of the second switching device is pushed into an upper layer of the bottom of the stack, and a signpost of the fifth switching device is pushed into the top of the stack.

With reference to any implementation manner of the second to the sixth possible implementation manners of the seventh aspect, in a seventh possible implementation manner of the seventh aspect, the third switching device is configured to identify, according to the signpost of the fifth switching device, that a next-hop switching device of the data is the fifth switching device, where the signpost of the fifth switching device includes at least one of the following: a device identifier of the fifth switching device, an identifier of an egress port, on the third switching device, of the fifth switching device, or an identifier of a link between the fifth switching device and the third switching device.

According to an eighth aspect, an embodiment of the present invention further provides a method for implementing data forwarding, where the method is applied to a software-defined networking SDN system, the SDN system includes an SDN control device and at least two service devices, the at least two service devices include a first service device and a second service device, the first service device is connected to a first switching device, and the second service device is connected to a second switching device; where:

the SDN control device is configured to return a first forwarding rule to the first switching device according to network topology information of the SDN system, where the first forwarding rule is used to instruct the first switching device to delete an identifier of the first service device and send data to the first service device for processing; and the SDN control device is configured to: receive a request for a forwarding rule, and return a second forwarding rule to the first switching device according to characteristic information carried in the request, where when the first switching device is connected to the second switching device, the second forwarding rule is used to instruct the first switching device to send the data processed by the first service device and an identifier of the second service device to the second switching device, or when the first switching device is not connected to the second switching device, the second forwarding rule is used to instruct the first switching device to send, to a third switching device, the data processed by the first service device, an identifier of the second service device, and information about a path from the first switching device to the second switching device, where the third switching device is a switching device connected to the first switching device.

With reference to the eighth aspect, in a first possible implementation manner of the eighth aspect, the SDN control device is further configured to return a third forwarding rule to the second switching device according to the network topology information of the SDN system, where:

when the second service device is a destination service device, the third forwarding rule is used to instruct the second switching device to: delete the identifier of the second service device and forward the data processed by the first service device to the second service device, according to the third forwarding rule; or when the second service device is not a destination service device, the third forwarding rule is used to instruct the second switching device to: delete the identifier of the second service device and forward the data processed by the first service device to the second service device, according to the third forwarding rule; and receive the data processed by the second service device.

With reference to the eighth aspect or the first possible implementation manner of the eighth aspect, in a second possible implementation manner of the eighth aspect, the information about the path from the first switching device to the second switching device includes signposts of a fourth switching device to the second switching device that are on a forwarding path of the data processed by the first service device, where the fourth switching device is a switching device connected to the third switching device.

With reference to the second possible implementation manner of the eighth aspect, in a third possible implementation manner of the eighth aspect, the SDN control device is further configured to return a fourth forwarding rule to the third switching device according to the network topology information of the SDN system, where the fourth forwarding rule is used to instruct the third switching device to: determine a port, on the third switching device, of the fourth switching device according to a signpost of the fourth switching device, and forward the data processed by the first service device to the fourth switching device through the port, on the third switching device, of the fourth switching device.

With reference to the third possible implementation manner of the eighth aspect, in a fourth possible implementation manner of the eighth aspect, if the fourth switching device is not the second switching device, the fourth forwarding rule is further used to instruct the third switching device to send, to the fourth switching device, information about a path from the third switching device to the second switching device.

With reference to the fourth possible implementation manner of the eighth aspect, in a fifth possible implementation manner of the eighth aspect, the fourth forwarding rule specifically instructs the third switching device to: remove the signpost of the fourth switching device from the information about the path from the first switching device to the second switching device to obtain the information about the path from the third switching device to the second switching device, and send, to the fourth switching device, the information about the path from the third switching device to the second switching device.

With reference to any implementation manner of the second to the fifth possible implementation manners of the eighth aspect, in a sixth possible implementation manner of the eighth aspect, the signpost of the fourth switching device includes at least one of the following: a device identifier of the fourth switching device, an identifier of the egress port, on the third switching device, of the fourth switching device, or an identifier of a link between the fourth switching device and the third switching device.

According to a ninth aspect, an embodiment of the present invention further provides a software-defined networking SDN control device, where the SDN control device is applied to an SDN system, the SDN system further includes at least two service devices, the at least two service devices include a first service device and a second service device, the first service device is connected to a first switching device, the second service device is connected to a second switching device, and the SDN control device includes a network communications unit, a forwarding rule management unit, and a topology management unit, where:

the topology management unit is configured to: collect network topology information of the SDN system, and send the network topology information to the forwarding rule management unit;

the network communications unit is configured to: receive a request for a forwarding rule, where the request carries characteristic information; and send the request to the forwarding rule management unit;

the forwarding rule management unit is configured to determine a first forwarding rule according to the network topology information of the SDN system, where the first forwarding rule is used to instruct the first switching device to delete an identifier of the first service device and send data to the first service device;

the forwarding rule management unit is further configured to determine a second forwarding rule according to the characteristic information carried in the request, where when the first switching device is connected to the second switching device, the second forwarding rule is used to instruct the first switching device to send the data processed by the first service device and an identifier of the second service device to the second switching device; or when the first switching device is not connected to the second switching device, the second forwarding rule is used to instruct the first switching device to send, to a third switching device, the data processed by the first service device, an identifier of the second service device, and information about a path from the first switching device to the second switching device, where the third switching device is a switching device connected to the first switching device; and the network communications unit is further configured to return the first forwarding rule and the second forwarding rule to the first switching device.

With reference to the ninth aspect, in a first possible implementation manner of the ninth aspect, the forwarding rule management unit is further configured to determine a third forwarding rule according to the network topology information of the SDN system, where when the second service device is a destination service device, the third forwarding rule is used to instruct the second switching device to: delete the identifier of the second service device and forward the data processed by the first service device to the second service device, according to the third forwarding rule; or when the second service device is not a destination service device, the third forwarding rule is used to instruct the second switching device to: delete the identifier of the second service device and forward the data processed by the first service device to the second service device, according to the third forwarding rule; and receive the data processed by the second service device; and the network communications unit is further configured to return the third forwarding rule to the second switching device.

With reference to the first possible implementation manner of the ninth aspect, in a second possible implementation manner of the ninth aspect, the forwarding rule management unit is further configured to determine a fourth forwarding rule according to the network topology information of the SDN system, where the fourth forwarding rule is used to instruct the third switching device to: determine a port, on the third switching device, of a fourth switching device according to a signpost of the fourth switching device, and forward the data processed by the first service device to the fourth switching device through the port, on the third switching device, of the fourth switching device; and the network communications unit is further configured to return the fourth forwarding rule to the third switching device.

With reference to the second possible implementation manner of the ninth aspect, in a third possible implementation manner of the ninth aspect, if the fourth switching device is not the second switching device, the fourth forwarding rule is further used to instruct the third switching device to send, to the fourth switching device, information about a path from the third switching device to the second switching device.

With reference to the third possible implementation manner of the ninth aspect, in a fourth possible implementation manner of the ninth aspect, the fourth forwarding rule specifically instructs the third switching device to: remove the signpost of the fourth switching device from the information about the path from the first switching device to the second switching device to obtain the information about the path from the third switching device to the second switching device, and send, to the fourth switching device, the information about the path from the third switching device to the second switching device.

According to a tenth aspect, an embodiment of the present invention further provides a software-defined networking SDN control device, where the SDN control device includes a processor, a memory, and a communications port, where the communications port is configured to communicate with a switching device in an SDN system, the memory is configured to store a program, and the processor is configured to execute the program to implement any implementation manner of the eighth aspect to the sixth possible implementation manner of the eighth aspect.

According to the foregoing method, system, and device for implementing data forwarding, after receiving a first forwarding rule (which may also be referred to as a proactive flow entry), a first switching device does not need to acquire a first forwarding rule each time data is being forwarded. Accordingly, an SDN control device does not need to deliver a first forwarding rule to the first switching device each time the data is being forwarded, that is, the first forwarding rule may be reused during subsequent data forwarding. This reduces a quantity of first forwarding rules delivered by the SDN control device to the first switching device, and accordingly reduces a device resource occupation rate of the SDN control device; and network bandwidth between the SDN control device and the first switching device is also reduced accordingly. In addition, the first switching device does not need to receive a first forwarding rule each time the data is being forwarded, which improves a resource utilization rate of the first switching device.

According to an eleventh aspect, an embodiment of the present invention further provides a software-defined networking SDN system for implementing data forwarding, where the SDN system includes an SDN control device and a first switching device, a source end of the data and multiple destination ends of the data form a multicast group, from the source end to a destination end, the data passes through the first switching device, and the first switching device represents a switching device on which a rendezvous point in the multicast group is located; where the first switching device is configured to receive the data and a multicast group identifier; and the first switching device is configured to execute one of the following according to a forwarding rule received from the SDN control device in the SDN system:

when the first switching device is connected to the destination end, the first switching device is configured to: delete the multicast group identifier, and forward the data to the destination end;

when the first switching device is connected to a second switching device, the first switching device is configured to forward the data and the multicast group identifier to the second switching device, where the second switching device is a switching device connected to the destination end or a switching device on which another rendezvous point in the multicast group is located; or when the first switching device is not connected to the destination end or the second switching device, the first switching device is configured to send, to a third switching device, the data, the multicast group identifier, and information about a path from the first switching device to the second switching device, where the second switching device is a switching device connected to the destination end or a switching device on which another rendezvous point in the multicast group is located, and the third switching device is a switching device connected to the first switching device.

With reference to the eleventh aspect, in a first possible implementation manner of the eleventh aspect, the information about the path from the first switching device to the second switching device includes signposts of a fourth switching device to the second switching device that are on the data forwarding path, where the fourth switching device is a switching device, on the data forwarding path, connected to the third switching device.

With reference to the first possible implementation manner of the eleventh aspect, in a second possible implementation manner of the eleventh aspect, the first switching device is configured to successively push the multicast group identifier and the signposts of the second switching device to the fourth switching device that are on the data forwarding path into a protocol stack, where the multicast group identifier is pushed into the bottom of the stack, a signpost of the second switching device is pushed into an upper layer of the bottom of the stack, and a signpost of the fourth switching device is pushed into the top of the stack, so that the protocol stack carries the path information and the multicast group identifier.

With reference to the first or the second possible implementation manner of the eleventh aspect, in a third possible implementation manner of the eleventh aspect, the third switching device is configured to identify, according to the signpost of the fourth switching device, that a next-hop switching device of the data is the fourth switching device, where the signpost of the fourth switching device includes at least one of the following: a device identifier of the fourth switching device, an identifier of an egress port, on the third switching device, of the fourth switching device, or an identifier of a link between the fourth switching device and the third switching device.

With reference to any implementation manner of the eleventh aspect to the third possible implementation manner of the eleventh aspect, in a fourth possible implementation manner of the eleventh aspect, the first switching device is further configured to copy the data according to the forwarding rule; and when the first switching device is not connected to the another destination end or a fifth switching device, the first switching device sends, to a sixth switching device, the data, the multicast group identifier, and information about a path from the first switching device to the fifth switching device, where the sixth switching device is connected to the first switching device, and the fifth switching device is a switching device connected to the another destination end or a switching device on which another rendezvous point is located.

According to the foregoing SDN system for implementing data forwarding, after receiving a forwarding rule (which may also be referred to as a flow entry), a switching device (for example, a first switching device) on which a rendezvous point is located does not need to acquire a forwarding rule each time data is being forwarded. Accordingly, an SDN control device does not need to deliver a forwarding rule to the first switching device each time the data is being forwarded, that is, the forwarding rule may be reused during subsequent data forwarding. This reduces a quantity of forwarding rules delivered by the SDN control device to the first switching device, and accordingly reduces a device resource occupation rate of the SDN control device; and network bandwidth between the SDN control device and the first switching device is also reduced accordingly. In addition, the first switching device does not need to receive a forwarding rule each time the data is being forwarded, which improves a resource utilization rate of the first switching device.

BRIEF DESCRIPTION OF DRAWINGS

To describe the technical solutions in the embodiments of the present invention more clearly, the following briefly introduces the accompanying drawings required for describing the embodiments or the prior art.

FIG. 6' is a schematic diagram of a forwarding path from a source end to a destination end according to an embodiment of the present invention;

FIG. 7A and FIG. 7B are schematic flowcharts of data forwarding according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention.

To resolve a problem that performance of devices in SDN is affected because a switching device in a backbone network (which may also be referred to as a switching device at a backbone layer, or may be referred to as a backbone switching device) has too many flow entries that occupy resources of a control device in software-defined networking (Software Defined Networking, SDN) and the switching device at the backbone layer in the SDN, a data forwarding method, device, and system in SDN are provided in the embodiments of the present invention.

SDN System 1

Figure 1:
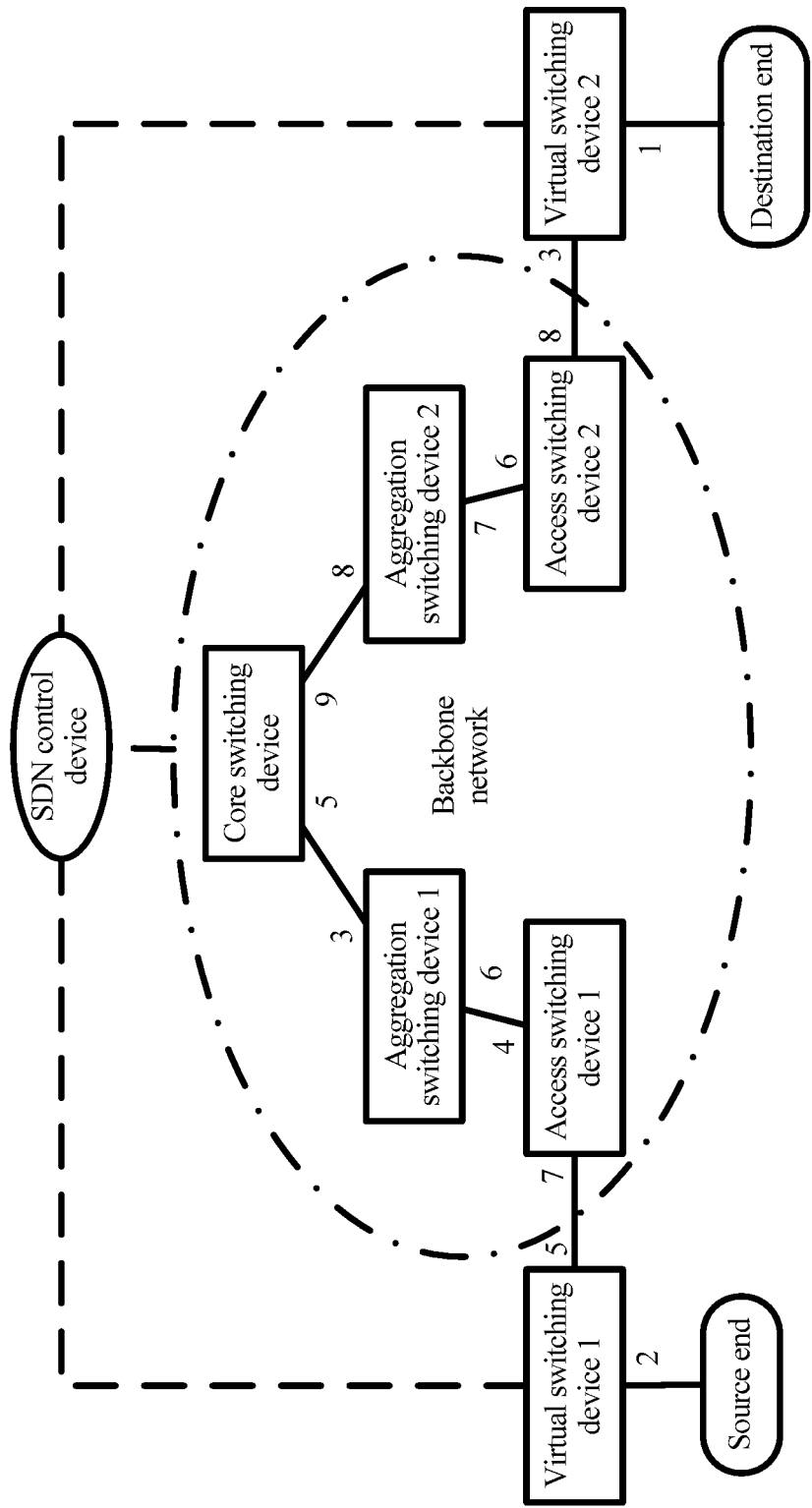
FIG. 1 is a schematic diagram of an SDN system for implementing data forwarding according to an embodiment of the present invention.

According to functions of a switching device, a backbone network of a data center (Data Center, DC) may be divided into three layers: an access layer, an aggregation layer, and a core layer. A virtual layer is applied to a network edge after a DC resource is virtualized. FIG. 1 shows an SDN system for implementing data (which may also be referred to as a packet) forwarding according to an embodiment of the present invention. FIG. 1 is merely exemplary. As shown in FIG. 1, the backbone network includes access switching devices, aggregation switching devices, and a core switching device. An edge network is a virtual layer, includes virtual switching devices, and communicates with the backbone network by using the access switching devices.

A source end virtual host (source end for short) is mounted on a virtual switching device 1, a destination end virtual host (destination end for short) is mounted on a virtual switching device 2, and the two hosts communicate with each other by using the backbone network of the DC. There is a data channel between the source end and the destination end: the virtual switching device 1—an access switching device 1—an aggregation switching device 1—the core switching device—an aggregation switching device 2—an access switching device 2—the virtual switching device 2. A packet is sent from the source end, enters the virtual switching device 1 through a port 2 of the virtual switching device 1, and goes out through a port 5 of the virtual switching device 1; enters the access switching device 1 through a port 7 of the access switching device 1, and goes out through a port 4 of the access switching device 1; enters the aggregation switching device 1 through a port 6 of the aggregation switching device 1, and goes out through a port 3 of the aggregation switching device 1; enters the core switching device through a port 5 of the core switching device, and goes out through a port 9 of the core switching device; enters the aggregation switching device 2 through a port 8 of the aggregation switching device 2, and goes out through a port 7 of the aggregation switching device 2; enters the access switching device 2 through a port 6 of the access switching device 2, and goes out through a port 8 of the access switching device 2; enters the virtual switching device 2 through a port 3 of the virtual switching device 2, and goes out through a port 1 of the virtual switching device 2; and finally reaches the destination end, so as to implement transmission of the data packet.

The source end or the destination end may be a device such as a mobile terminal (which includes but is not limited to a laptop, a mobile phone, a tablet, a palmtop computer, a POS, an MP3, and a navigator), a fixed terminal (which includes but is not limited to a desktop computer, a printer, a fax machine, a digital projector, and a digital television), or a wireless access terminal. The virtual switching device 1, the access switching device 1, the aggregation switching device 1, the core switching device, the aggregation switching device 2, the access switching device 2, and the virtual switching device 2 are all switching devices in SDN.

In the prior art, the packet sent from the source end enters the virtual switching device 1; and if no matched flow entry exists, the virtual switching device 1 reports a PacketIn packet (which may also be referred to as a PacketIn event) to a control device. The control device analyzes source information and destination information of the packet, selects a proper forwarding path according to a current network topology, and customizes a flow entry and delivers the flow entry to each switching device on the path. It should be noted that, multiple flow tables can be configured for one switching device, and multiple flow entries can be configured for each flow table. Therefore, with an increase of packets, flow entries of a switching device in the backbone network continuously multiply. A large number of flow entries occupy resources of a control device in the SDN and the switching device at a backbone layer in the SDN, and affect performance of devices in the SDN.

An SDN control device (which may be also referred to as an SDN control device) in this embodiment of the present invention delivers a part of flow entries (flow entry) according to network topology information, where this part of flow entries may be referred to as proactive flow entries (proactive flow entry). The proactive flow entries are unrelated to a service, but only related to the network topology information. After being delivered, the proactive flow entries may be reused during data forwarding (which may also be referred to as sending). After the packet is received, if no matched flow entry exists, the SDN control device delivers another part of flow entries to some switching devices, where this part of flow entries may be referred to as reactive flow entries (reactive flow entry). The reactive flow entries are related to the service, but are delivered only to partial switching devices. In a case of one-to-one communication, the SDN control device may deliver a reactive flow entry only to a virtual switching device in an edge network, and does not need to deliver a reactive flow entry to a switching device in a backbone network. The virtual switching device encapsulates a forwarding path to a destination end for a packet, and a switching device at a backbone layer executes a forwarding operation according to the forwarding path carried in the packet. Therefore, flow entries delivered by the SDN control device to a switching device in the backbone network are reduced, so that occupation of resources of the SDN control device and the switching device at the backbone layer by flow entries is reduced. Details are described in the following.

Data Forwarding Method 1

1. Proactive Flow Entry

Before delivering a proactive flow entry according to network topology information, an SDN control device collects the network topology information. For example, the SDN control device monitors statuses of all switching devices, and collects the network topology information according to a connection relationship between the switching devices.

During a process of collecting the network topology information, the SDN control device needs to allocate signposts to the switching devices. A signpost of a switching device is used by a previous-hop switching device to uniquely identify the switching device, and is also used by the SDN control device to uniquely identify the switching device. It is assumed that the switching device is a first switching device, a previous-hop switching device of the switching device is a second switching device, and a next-hop switching device of the switching device is a third switching device. The second switching device identifies, according to a signpost of the first switching device, that a next-hop switching device of data is the first switching device; similarly, the first switching device identifies, according to a signpost of the third switching device, that a next-hop switching device of the data is the third switching device. No limitation is imposed on a specific implementation form of a signpost in the present invention. The signpost of the first switching device may include but is not limited to: a device identifier of the first switching device, an identifier (that is, a port number) of a port, on the second switching device, of the first switching device, or an identifier of a link between the first switching device and the second switching device. Similarly, the signpost of the third switching device may include but is not limited to: a device identifier of the third switching device, an identifier of a port, on the first switching device, of the third switching device, or an identifier of a link between the third switching device and the first switching device.

Figure 2:
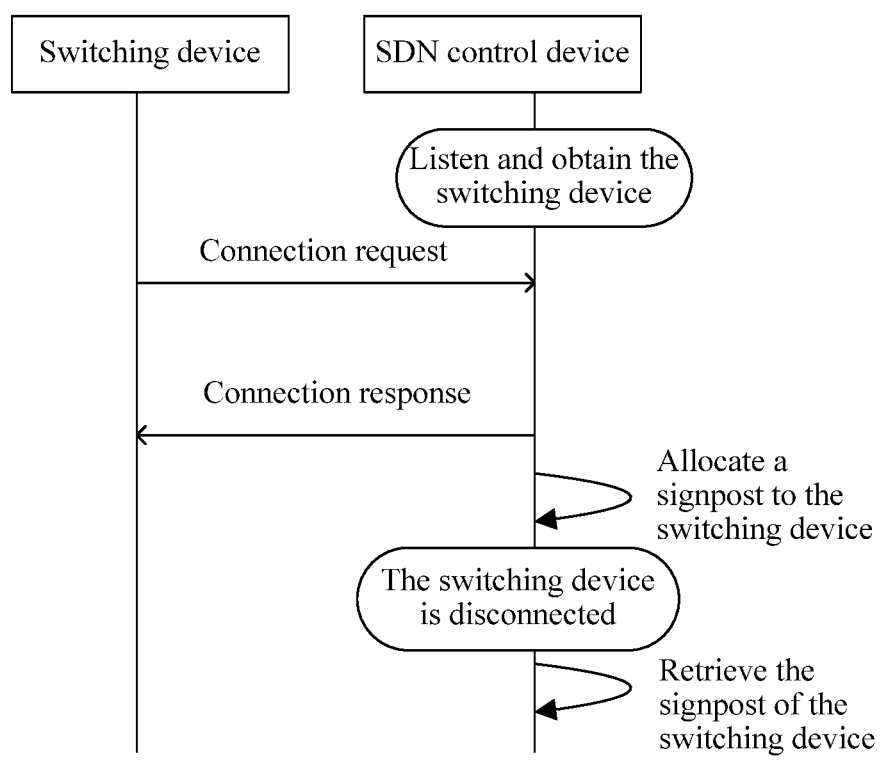
FIG. 2 is a schematic flowchart of allocating a signpost to a switching device by an SDN control device according to an embodiment of the present invention.

Specifically, as shown in FIG. 2, FIG. 2 is a schematic flowchart of allocating a signpost to a switching device by an SDN control device according to an embodiment of the present invention. The SDN control device monitors a switching device; the switching device initiates a connection request to the SDN control device; the SDN control device makes a connection response to the switching device, and a control channel between the switching device and the control device is established; and the SDN control device allocates a signpost to the switching device.

For the SDN system shown in FIG. 1, that a signpost of a switching device is a device identifier of the switching device is used as an example. The signposts allocated by the SDN control device to all the switching devices are listed in Table 1. Table 1 is merely exemplary.

TABLE 1

| Switching devices | Device identifiers |
|---|---|
| Virtual switching device 1 | 1 |
| Access switching device 1 | 11 |
| Aggregation switching device 1 | 21 |
| Core switching device | 3 |
| Aggregation switching device 2 | 22 |
| Access switching device 2 | 12 |
| Virtual switching device 2 | 2 |

The device identifiers allocated by the SDN control device to all the switching devices (which may also be referred to as forwarding devices, or referred to as switches) in a DC network are listed in Table 1. The virtual switching device 1 obtains the device identifier 1, the access switching device 1 obtains the device identifier 11, the aggregation switching device 1 obtains the device identifier 21, the core switching device obtains the device identifier 3, the aggregation switching device 2 obtains the device identifier 22, the access switching device 2 obtains the device identifier 12, and the virtual switching device 2 obtains the device identifier 2.

Optionally, as shown in FIG. 2, when the SDN control device listens and obtains that a switching device is disconnected because of various reasons, the SDN control device may retrieve the signpost that has been allocated to the switching device. The retrieved signpost of the switching device may be reallocated to another switching device or another type of object that can have a signpost.

Figure 3:
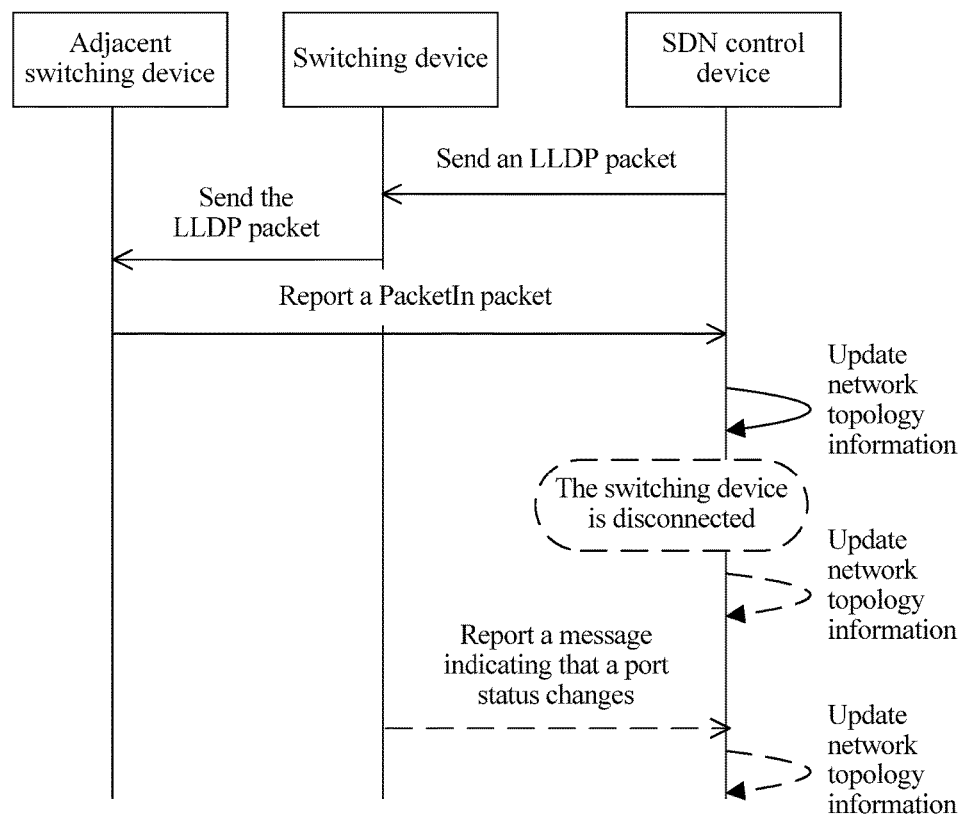
FIG. 3 is a schematic flowchart of collecting network topology information by an SDN control device according to an embodiment of the present invention.

A procedure in which the SDN control device collects the network topology information by using a signpost allocated to a switching device is shown in FIG. 3. After allocating the signpost to the switching device, the SDN control device sends a Link Layer Discovery Protocol (Link Layer Discovery Protocol, LLDP) packet to the switching device, for example, a PacketOut packet (which may also be referred to as a PacketOut event); the switching device that receives the LLDP packet sends the LLDP packet to all ports (which means all egress ports herein) of the switching device; after an adjacent switching device receives the LLDP packet, the adjacent switching device generates a PacketIn packet if no matched flow entry exists, and notifies the SDN control device; the SDN control device analyzes a characteristic of the LLDP packet, and determines a network topology of the switching device, that is, the adjacent switching device of the switching device and a port of the switching device.

In the SDN system shown in FIG. 1, the LLDP packet is sent to all the switching devices; the network topology information collected by the SDN control device is listed in Table 2. Table 2 is merely exemplary.

TABLE 2

| Switching devices | Adjacent switching devices | Ports |
|---|---|---|
| Virtual switching device 1 | Access switching device 1 | 5 |
| Access switching device 1 | Virtual switching device 1 | 7 |
|  | Aggregation switching device 1 | 4 |
| Aggregation switching device 1 | Access switching device 1 | 6 |
|  | Core switching device | 3 |
| Core switching device | Aggregation switching device 1 | 5 |
|  | Aggregation switching device 2 | 9 |
| Aggregation switching device 2 | Core switching device | 8 |
|  | Access switching device 2 | 7 |
| Access switching device 2 | Aggregation switching device 2 | 6 |
|  | Virtual switching device 2 | 8 |
| Virtual switching device 2 | Access switching device 2 | 3 |

Specifically, the virtual switching device 1 is connected (which may also be referred to as connected, or may be referred to as adjacent) to the access switching device 1 on the port 5. The access switching device 1 is connected to the virtual switching device 1 and the aggregation switching device 1 respectively on the ports 7 and 4. The aggregation switching device 1 is connected to the access switching device 1 and the core switching device respectively on the ports 6 and 3. The core switching device is connected to the aggregation switching devices 1 and 2 respectively on the ports 5 and 9. The aggregation switching device 2 is connected to the core switching device and the access switching device 2 respectively on the ports 8 and 7. The access switching device 2 is connected to the aggregation switching device 2 and the virtual switching device 2 respectively on the ports 6 and 8. The virtual switching device 2 is connected to the access switching device 2 on the port 3.

When the SDN control device listens and obtains that a switching device is disconnected because of various reasons, the SDN control device may retrieve a signpost that has been allocated to the switching device as shown in FIG. 2, and may further update the collected network topology information as shown in FIG. 3.

In addition, as shown in FIG. 3, a switching device whose port status changes reports, to the SDN control device, a message indicating that the port status changes, and the SDN control device updates the collected network topology information according to the message indicating that the port status changes. Alternatively, the SDN control device may actively check whether a port status of a switching device changes. No limitation is imposed in this embodiment of the present invention. A change in a port status means that a port changes from UP to DOWN or changes from DOWN to UP. The change in the port status causes the SDN control device to update the network topology information.

Certainly, when a new switching device accesses the SDN system, the SDN control device also updates the network topology information.

After the SDN control device allocates the signposts to all the switching devices, and learns the network topology information in FIG. 2 and FIG. 3, the SDN control device may deliver proactive flow entries to all the switching devices in a backbone network.

The proactive flow entries are flow entries that are actively delivered by the SDN control device according to the collected network topology information and are unrelated to a service. As described above, the proactive flow entries are unrelated to a service, but only related to the network topology information. After being delivered, the proactive flow entries may be reused during packet forwarding.

For the SDN system shown in FIG. 1, that a signpost of a switching device is a device identifier of the switching device is used as an example. The proactive flow entries (flow entry) delivered, according to the signposts allocated to all the switching devices and the collected network topology information, by the SDN control device to all the switching devices in the backbone network are listed in Table 3. Table 3 is merely exemplary.

TABLE 3

| Switching devices | Proactive flow entries |
| --- | --- |
| Access switching device 1 | Match condition: signpost of the virtual switching device 1; execution action: removing the signpost of the virtual switching device 1 and sending the packet to the port 7<br>Match condition: signpost of the aggregation switching device 1; execution action: removing the signpost of the aggregation switching device 1 and sending the packet to the port 4 |
| Aggregation switching device 1 | Match condition: signpost of the access switching device 1; execution action: removing the signpost of the access switching device 1 and sending the packet to the port 6<br>Match condition: signpost of the core switching device; executionaction: removing the signpost of the core switching device and sending the packet to the port 3 |
| Core switching device | Match condition: signpost of the aggregation switching device 1; execution action: removing the signpost of the aggregation switching device 1 and sending the packet to the port 5<br>Match condition: signpost of the aggregation switching device 2; execution action: removing the signpost of the aggregation switching device 2 and sending the packet to the port 9 |
| Aggregation switching device 2 | Match condition: signpost of the core switching device; execution action: removing the signpost of the core switching device and sending the packet to the port 8<br>Match condition: signpost of the access switching device 2; execution action: removing the signpost of the access switching device 2 and sending the packet to the port 7 |
| Access switching device 2 | Match condition: signpost of the aggregation switching device 2; execution action: removing the signpost of the aggregation switching device 2 and sending the packet to the port 6<br>Match condition: signpost of the virtual switching device 2; execution action: removing the signpost of the virtual switching device 2 and sending the packet to the port 8 |

It can be learned from Table 3 that, a proactive flow entry includes two parts, where one part is a match condition (which is also referred to as a match field, and is described as a match field in English), and the other part is an execution action (which is also referred to as an action field, and is described as an action in English). The proactive flow entry delivered by the SDN control device meets the following characteristics:

a match condition: a signpost of an adjacent switching device; and an execution action: removing the signpost of the adjacent switching device, and sending the packet to a port of the adjacent switching device.

"Adjacent" in this embodiment of the present invention may also be described as "connected" or "connected in an adjacent manner". For the system architecture diagram shown in FIG. 1, adjacent switching devices of the access switching device 1 are the virtual switching device 1 and the aggregation switching device 1. Similarly, adjacent switching devices of the aggregation switching device 1 are the access switching device 1 and the core switching device; adjacent switching devices of the core switching device are the aggregation switching device 1 and the aggregation switching device 2; adjacent switching devices of the aggregation switching device 2 are the core switching device and the access switching device 2; adjacent switching devices of the access switching device 2 are the virtual switching device 2 and the virtual switching device 2. In this case, the control device delivers, to the access switching device 1, proactive flow entries that point to the adjacent virtual switching device 1 and the adjacent aggregation switching device 1; delivers, to the aggregation switching device 1, proactive flow entries that point to the adjacent access switching device 1 and the adjacent core switching device; delivers, to the core switching device, proactive flow entries that point to the adjacent aggregation switching devices 1 and 2; delivers, to the aggregation switching device 2, proactive flow entries that point to the adjacent core switching device and the adjacent access switching device 2; and delivers, to the access switching device 2, proactive flow entries that point to the adjacent aggregation switching device 2 and the adjacent virtual switching device 2.

The proactive flow entries delivered by the SDN control device to all the switching devices in the backbone network are complete proactive flow entries. A packet can be sent from a source end to a destination end by using a part of the flow entries.

The SDN system in FIG. 1 is used as an example. If a host connected to the virtual switching device 1 is the source end, and a host connected to the virtual switching device 2 is the destination end, proactive flow entries that need to be used for the packet sent from the source end to the destination end are listed in Table 4. Table 4 is a part of Table 3.

TABLE 4

| Switching devices | Proactive flow entries |
| --- | --- |
| Access switching device 1 | Match condition: signpost of the aggregation switching device 1; execution action: removing the signpost of the aggregation switching device 1 and sending the packet to the port 4 |
| Aggregation switching device 1 | Match condition: signpost of the core switching device; execution action: removing the signpost of the core switching device and sending the packet to the port 3 |

TABLE 4-continued

| Switching devices | Proactive flow entries |
|---|---|
| Core switching device | Match condition: signpost of the aggregation switching device 2; execution action: removing the signpost of the aggregation switching device 2 and sending the packet to the port 9 |
| Aggregation switching device 2 | Match condition: signpost of the access switching device 2; execution action: removing the signpost of the access switching device 2 and sending the packet to the port 7 |
| Access switching device 2 | Match condition: signpost of the virtual switching device 2; execution action: removing the signpost of the virtual switching device 2 and sending the packet to the port 8 |

On the contrary, if a host connected to the virtual switching device 1 is the destination end, and a host connected to the virtual switching device 2 is the source end, proactive flow entries that need to be used for the packet sent from the source end to the destination end are listed in Table 5. Table 5 is a part of Table 3.

TABLE 5

| Switching devices | Proactive flow entries |
|---|---|
| Access switching device 1 | Match condition: signpost of the virtual switching device 1; execution action: removing the signpost of the virtual switching device 1 and sending the packet to the port 7 |
| Aggregation switching device 1 | Match condition: signpost of the access switching device 1; execution action: removing the signpost of the access switching device 1 and sending the packet to the port 6 |
| Core switching device | Match condition: signpost of the aggregation switching device 1; execution action: removing the signpost of the aggregation switching device 1 and sending the packet to the port 5 |
| Aggregation switching device 2 | Match condition: signpost of the core switching device; execution action: removing the signpost of the core switching device and sending the packet to the port 8 |
| Access switching device 2 | Match condition: signpost of the aggregation switching device 2; execution action: removing the signpost of the aggregation switching device 2 and sending the packet to the port 6 |

According to the foregoing description, generally, the SDN control device actively delivers a proactive flow entry to a switching device. The proactive flow entry is used to indicate a match condition and an action of the switching device. Table 3 is used as an example. The proactive flow entry delivered by the SDN control device to the access switching device 1 has two items, where: a match condition in one item of the two items is the signpost of the virtual switching device 1, and an execution action is to remove the signpost of the virtual switching device 1 and send the packet to the port 7; a match condition in the other item is the signpost of the aggregation switching device 1, and an execution action is to remove the signpost of the aggregation switching device 1 and send the packet to the port 4. Similarly, the proactive flow entry delivered by the SDN control device to the aggregation switching device 1 has two items, where: a match condition in one item of the two items is the signpost of the access switching device 1, and an execution action is to remove the signpost of the access switching device 1 and send the packet to the port 6; a match condition in the other item is the signpost of the core switching device, and an execution action is to remove the signpost of the core switching device and send the packet to the port 3. The proactive flow entry delivered by the SDN control device to the core switching device has two items, where: a match condition in one item of the two items is the signpost of the aggregation switching device 1, and an execution action is to remove the signpost of the aggregation switching device 1 and send the packet to the port 5; a match condition in the other item is the signpost of the aggregation switching device 2, and an execution action is to remove the signpost of the aggregation switching device 2 and send the packet to the port 9. The proactive flow entry delivered by the SDN control device to the aggregation switching device 2 has two items, where: a match condition in one item of the two items is the signpost of the core switching device, and an execution action is to remove the signpost of the core switching device and send the packet to the port 8; a match condition in the other item is the signpost of the access switching device 2, and an execution action is to remove the signpost of the access switching device 2 and send the packet to the port 7. The proactive flow entry delivered by the SDN control device to the access switching device 2 also has two items, where: a match condition in one item of the two items is the signpost of the aggregation switching device 2, and an execution action is to remove the signpost of the aggregation switching device 2 and send the packet to the port 6; a match condition in the other item is the signpost of the virtual switching device 2, and an execution action is to remove the signpost of the virtual switching device 2 and send the packet to the port 8.

In some cases, if the SDN control device receives a PacketIn packet sent by a switching device, the SDN control device checks whether the SDN control device has delivered, to the switching device, a proactive flow entry that arrives at an adjacent switching device. If the SDN control device has not delivered the proactive flow entry to the switching device, the SDN control device delivers, to the switching device, a proactive flow entry that arrives at the adjacent switching device; if the proactive flow entry has been delivered, the SDN control device ignores the PacketIn packet.

Figure 4:
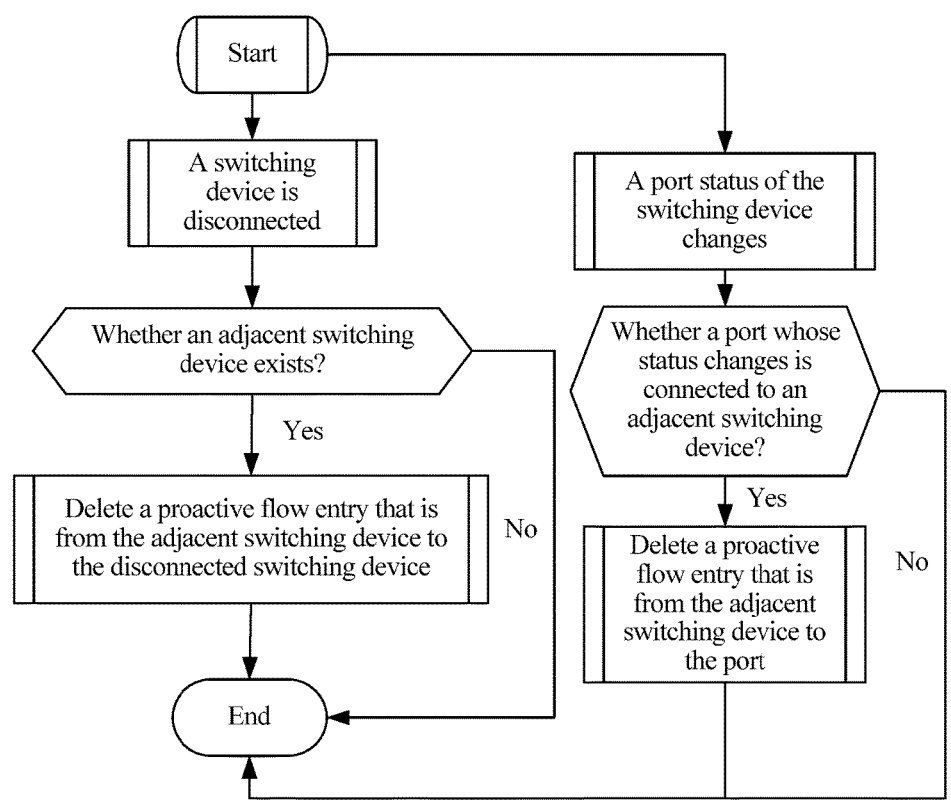
FIG. 4 is a schematic flowchart of updating a proactive flow entry by an SDN control device according to an embodiment of the present invention.

In addition, similar to FIG. 3, when a switching device is disconnected, or a port status of a switching device changes (for example, a port becomes abnormal, or the port status changes from UP to DOWN), or a new switching device accesses the SDN, the SDN control device updates the network topology information. After the network topology information is updated, accordingly, the SDN control device delivers updated proactive flow entries to all the switching devices in the backbone network, which is specifically shown in FIG. 4.

When a switching device is disconnected, the SDN control device finds that the switching device is disconnected; the SDN control device checks whether the disconnected switching device has an adjacent switching device; if the disconnected switching device has an adjacent switching device, the SDN control device deletes a proactive flow entry that is from the adjacent switching device to the disconnected switching device, as listed in Table 3; or if the disconnected switching device does not have an adjacent switching device, the procedure ends.

When a port status of a switching device changes, the SDN control device finds that the port status of the switching device changes (for example, a port becomes abnormal); the SDN control device checks whether the port whose status changes is connected to an adjacent switching device; and if the port whose status changes is connected to an adjacent switching device, the SDN control device deletes a proactive flow entry that is from the adjacent switching device to the port whose status changes; or if the port whose status changes is not connected to an adjacent switching device, the procedure ends. Specifically, the SDN control device may update Table 2 and Table 3. Details are not described again.

2. Reactive Flow Entry

Figure 5:
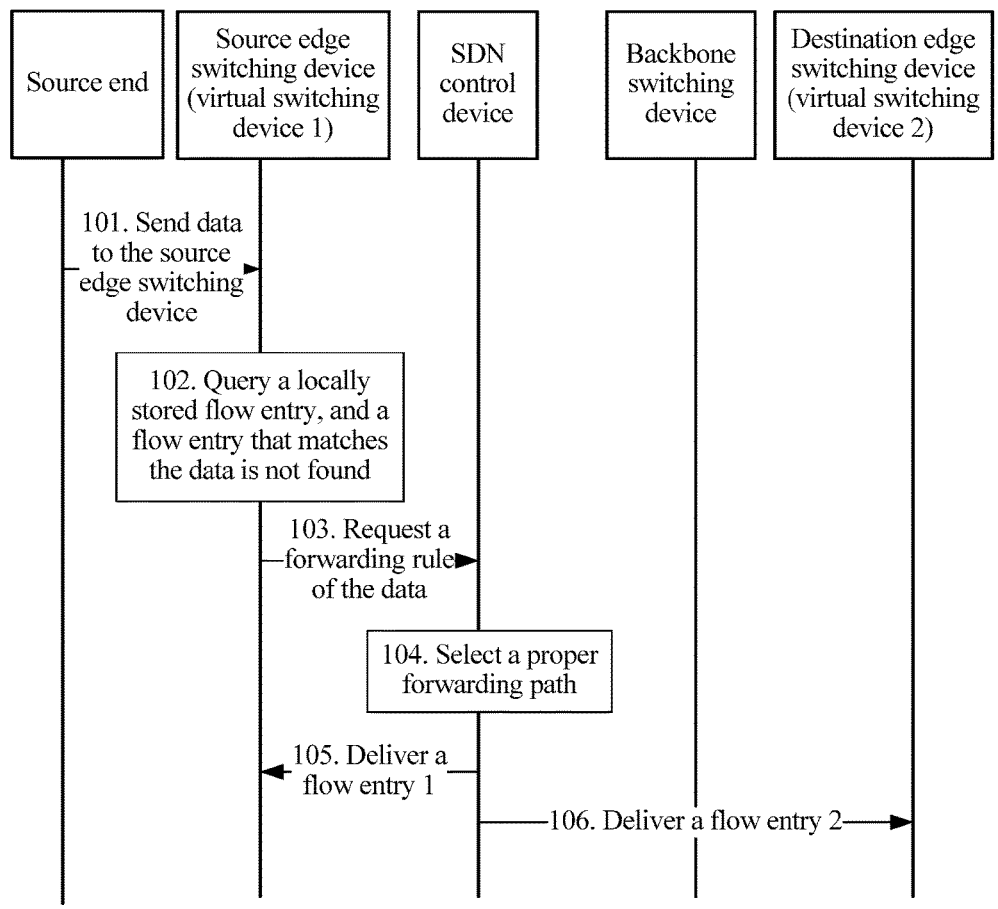
FIG. 5 is a schematic flowchart of delivering reactive flow entries according to an embodiment of the present invention.

As shown in FIG. 5, the system architecture shown in FIG. 1 is used as an example for description.

101. A source end sends data (which may also be referred to as a packet) to a source edge switching device (for example, the virtual switching device 1) connected to the source end.

102-103. The virtual switching device 1 queries a locally stored flow entry, and if a flow entry that matches the data is not found, the virtual switching device 1 requests a forwarding rule of the data from an SDN control device, where the request carries characteristic information of the data.

It should be noted that, the virtual switching device 1 may send the entire data to the SDN control device, or may send only the characteristic information of the data provided that the request carries the characteristic information of the data. The characteristic information of the data may be any field in a data packet format, and includes but is not limited to at least one of the following: a source IP address, a destination IP address, source MAC, or destination MAC of the data, or a protocol type.

104-105. The SDN control device selects a proper forwarding path according to the characteristic information of the data and current network topology information. The SDN control device may select an optimal forwarding path from multiple forwarding paths; for example, the SDN control device may select a shortest forwarding path or a forwarding path that has a lowest traffic weight.

Figure 6:
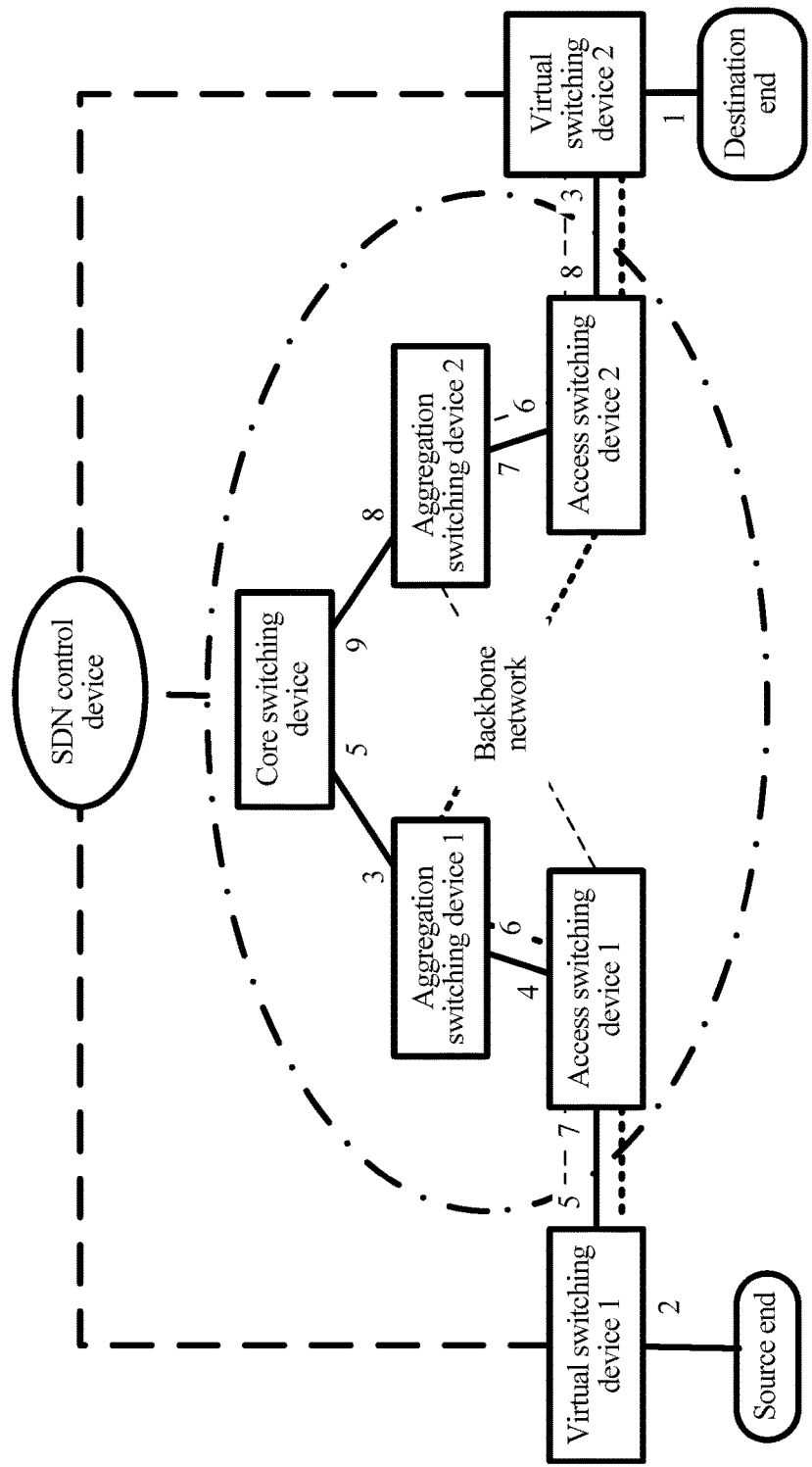
FIG. 6 is a schematic diagram of another SDN system for implementing data forwarding according to an embodiment of the present invention.
Figure 6:
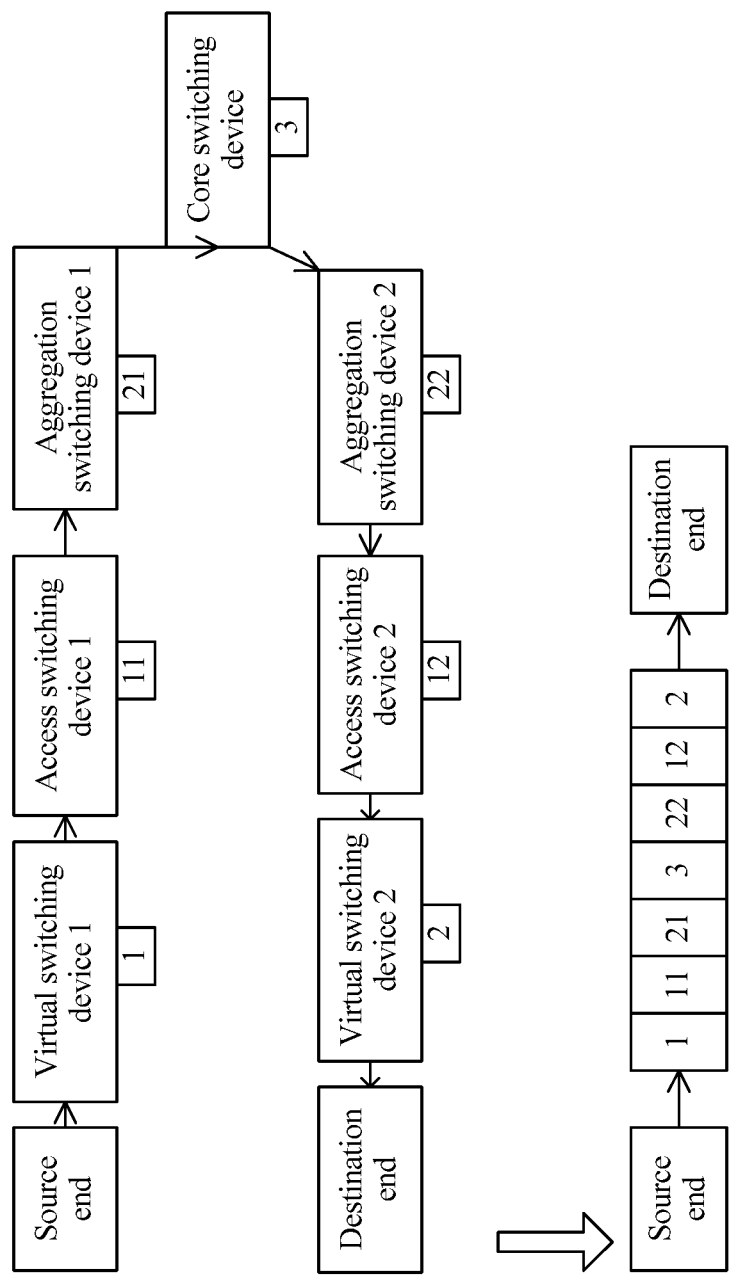

As shown in FIG. 6, it is assumed that there are three paths from the source end to a destination end. The solid line represents a first forwarding path (the virtual switching device 1, the access switching device 1, the aggregation switching device 1, the core switching device, the aggregation switching device 2, the access switching device 2, and the virtual switching device 2 are successively passed through from the source end to the destination end); the black dashed line represents a second forwarding path (the virtual switching device 1, the access switching device 1, the aggregation switching device 1, the access switching device 2, and the virtual switching device 2 are successively passed through from the source end to the destination end); the dashed line represents a third forwarding path (the virtual switching device 1, the access switching device 1, the aggregation switching device 2, the access switching device 2, and the virtual switching device 2 are successively passed through from the source end to the destination end).

As shown in FIG. 6', it is assumed that a forwarding path selected by the SDN control device according to a specific policy is: the virtual switching device 1, the access switching device 1, the aggregation switching device 1, the core switching device, the aggregation switching device 2, the access switching device 2, and the virtual switching device 2 are successively passed through from the source end to the destination end. Signposts (that the signposts are device identifiers is used as an example) that are respectively corresponding to the switching devices are 1, 11, 21, 3, 22, 12, and 2. In this case, the forwarding path on which the packet is sent from the source end to the destination end may be represented as 1-11-21-3-22-12-2. Therefore, a sequence of signposts may uniquely identify a forwarding path. The foregoing process may also be referred to as determining of a forwarding path or anchoring of a forwarding path.

The SDN control device returns the forwarding rule (that is, a reactive flow entry 1) of the data to the virtual switching device 1 according to the selected forwarding path, as listed in Table 6.

TABLE 6

| Switching device | Reactive flow entry |
| --- | --- |
| Virtual switching device 1 | Match condition: characteristic information of the data<br>Execution action: encapsulating information about a path from the virtual switching device 1 to the virtual switching device 2 and sending, to the port 5, the data in which the path information is encapsulated |

Similar to a proactive flow entry, a reactive flow entry also includes two parts, where one part is a match condition (which is also referred to as a match field, and is described as a match field in English), and the other part is an execution action (which is also referred to as an action field, and is described as an action in English). The reactive flow entry is also used to indicate a match condition and an action of a switching device.

Specifically, the reactive flow entry 1 includes the following information:

a match condition: the characteristic information of the data; and an execution action: encapsulating the information about the path from the virtual switching device 1 to the virtual switching device 2 and sending, to the port 5, the data in which the path information is encapsulated. The virtual switching device 2 is a switching device connected to the destination end of the data.

Preferably, the information about the path from the virtual switching device 1 to the virtual switching device 2 includes signposts of the aggregation switching device 1 to the virtual switching device 2. An encapsulation process is described in detail in FIG. 7A and FIG. 7B.

106. In addition, the SDN control device further sends the forwarding rule of the data to the virtual switching device 2, that is, delivers a reactive flow entry 2 to the virtual switching device 2, as listed in Table 7.

TABLE 7

| Switching device | Reactive flow entry |
| --- | --- |
| Virtual switching device 2 | Match condition: characteristic information of the data<br>Execution action: sending the data to the port 1 |

The reactive flow entry 2 includes the following information:

a match condition: the characteristic information of the data; and an execution action: sending the packet to the port 1, that is, a port connected to the destination end.

It should be noted that there is no order between 105 and 106.

After the foregoing process, backbone switching devices receive proactive flow entries from the SDN control device; after an edge switching device receives the data, the edge switching device requests a reactive flow entry from the SDN control device. For details about how to transmit the data from the source end to the destination end according to the proactive flow entries and the reactive flow entry, refer to FIG. 7A and FIG. 7B.

3. Data Forwarding

Figure 7B:
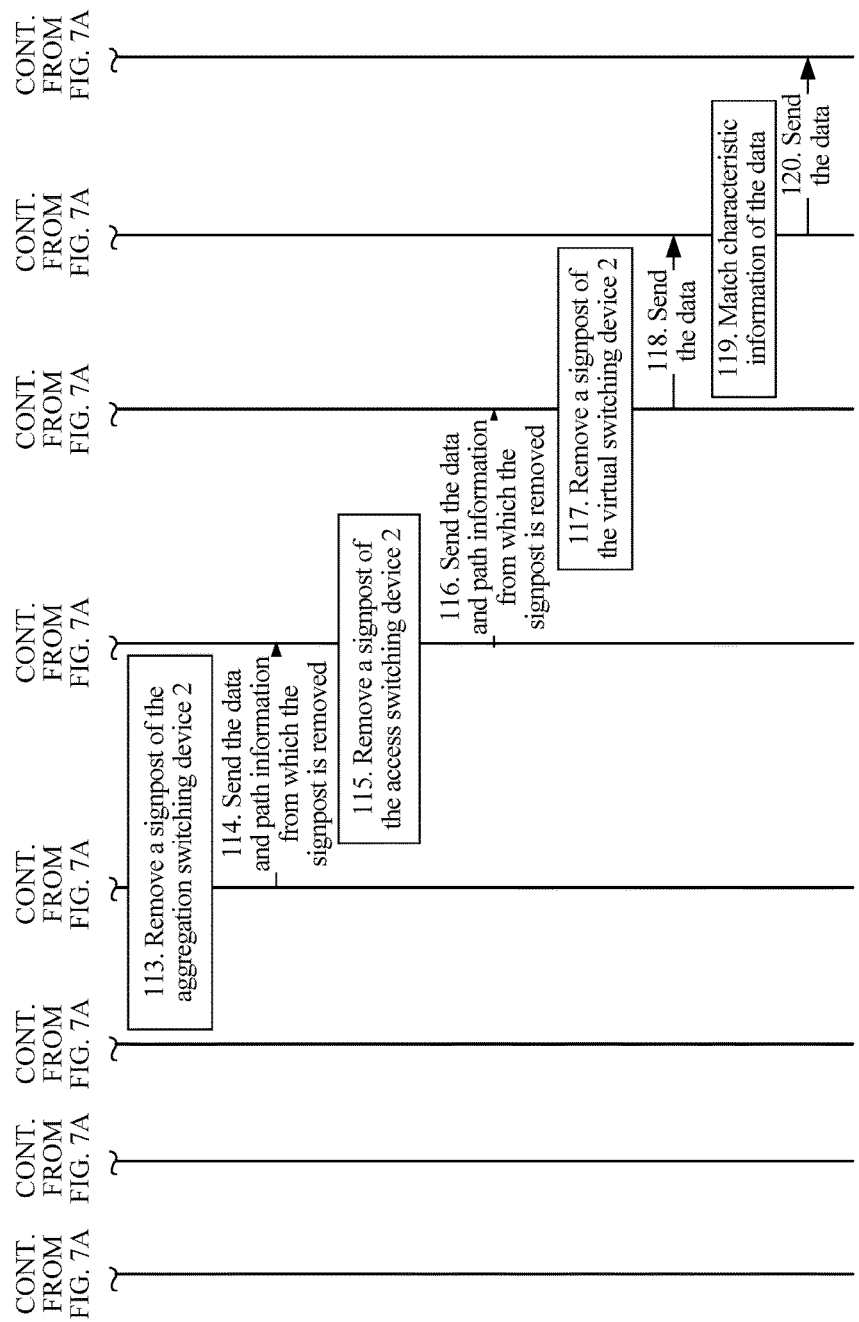

FIG. 7A and FIG. 7B are schematic flowcharts of data forwarding according to an embodiment of the present invention.

107-108. According to the reactive flow entry 1, the virtual switching device 1 matches the characteristic information of the data, encapsulates the data and the information about the path from the virtual switching device 1 to the virtual switching device 2, and then sends the data and the path information to the access switching device 1 through a port 5 indicated by the reactive flow entry 1.

Specifically, the virtual switching device 1 may carry the information about the path from the virtual switching device 1 to the virtual switching device 2 by using a protocol stack. The following uses an example in which the protocol stack is a Multiprotocol Label Switching (Multiple Protocol Label Switching, MPLS) stack for description.

Figure 8:
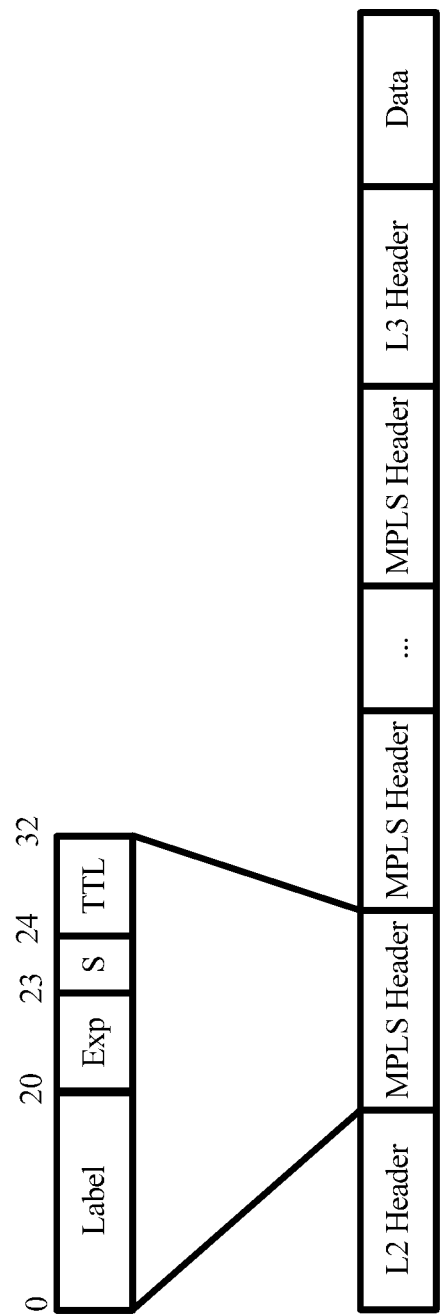
FIG. 8 is a schematic diagram of an MPLS stack according to an embodiment of the present invention.

A format of the MPLS protocol is shown in FIG. 8. An MPLS label (which refers to a Label field in an MPLS Header) is between headers of a layer 2 and a layer 3 of the packet, that is, between an L2 Header and an L3 Header, and supports multilayer nesting. One MPLS Header occupies 32 bits, where: a Label field occupies 20 bits, and is used to mark a signpost of a switching device and indicate a next-hop switching device of a packet; an Exp field occupies 3 bits, and is used to mark QoS and implement DC large layer-2 network Differentiated Services; an S field occupies 1 bit, is a label at the bottom of the stack and identifies the last hop; and a TTL field occupies 8 bits, and is used to mark a label life cycle. In this embodiment of the present invention, because a label identifies only a next hop of a packet, TTL may be set to 1.

One MPLS Header (MPLS header) carries a signpost of one switching device. Multiple MPLS headers are nested sequentially and carry a group of signposts, so as to form a forwarding path. The virtual switching device 1 pushes the information about the path from the virtual switching device 1 to the virtual switching device 2 into the MPLS stack according to the forwarding path selected by the SDN control device. The information about the path from the virtual switching device 1 to the virtual switching device 2 includes the signposts of the aggregation switching device 1 to the virtual switching device 2. The virtual switching device 1 shifts the signpost of the virtual switching device 2 into the bottom of the stack, and shifts the signpost of the aggregation switching device 1 into the top of the stack. The MPLS stack in which the information about the path from the virtual switching device 1 to the virtual switching device 2 is encapsulated is shown in FIG. 9.

Figure 9:
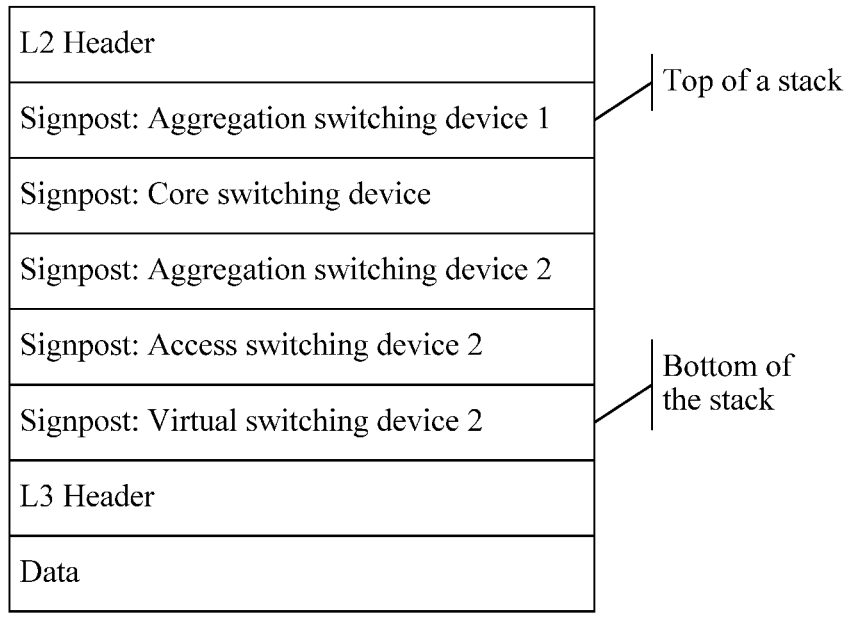
FIG. 9 shows an MPLS stack in which information about a path from a virtual switching device 1 to a virtual switching device 2 is encapsulated.

As shown in FIG. 9, the virtual switching device 2 is a last-hop switching device of the packet, and the signpost of the virtual switching device 2 is first pushed into the packet and is located at the bottom of the stack of an MPLS nested label. Because an encapsulation operation for a forwarding path is executed on the virtual switching device 1, and the virtual switching device 1 learns, according to the reactive flow entry 1, that a next-hop switching device of the packet is the access switching device 1, a first hop on the forwarding path is a next-hop switching device of the access switching device 1, that is, the aggregation switching device 1, and the signpost of the aggregation switching device 1 is shifted into the top of the stack. According to sequencing order, signposts of other switching devices are successively the signpost of the access switching device 2, the signpost of the aggregation switching device 2, and the signpost of the core switching device.

109-110. The access switching device 1 receives the data and the information about the path from the virtual switching device 1 to the virtual switching device 2 (the information about the path from the virtual switching device 1 to the virtual switching device 2 includes signposts of the aggregation switching device 1 to the virtual switching device 2) that are sent by the virtual switching device 1.

A proactive flow entry (the foregoing proactive flow entry of the access switching device 1 in Table 3) locally stored in the access switching device 1 is queried according to the signpost of the aggregation switching device 1 in the information about the path from the virtual switching device 1 to the virtual switching device 2. If the signpost of the aggregation switching device 1 is matched, actions are executed: removing the signpost of the aggregation switching device 1 and sending, to the port 4, the data and path information from which the signpost is removed. The access switching device 1 forwards, to the aggregation switching device 1 through the port 4, the data and the path information from which the signpost (that is, the signpost of the aggregation switching device 1) is removed.

Figure 10:
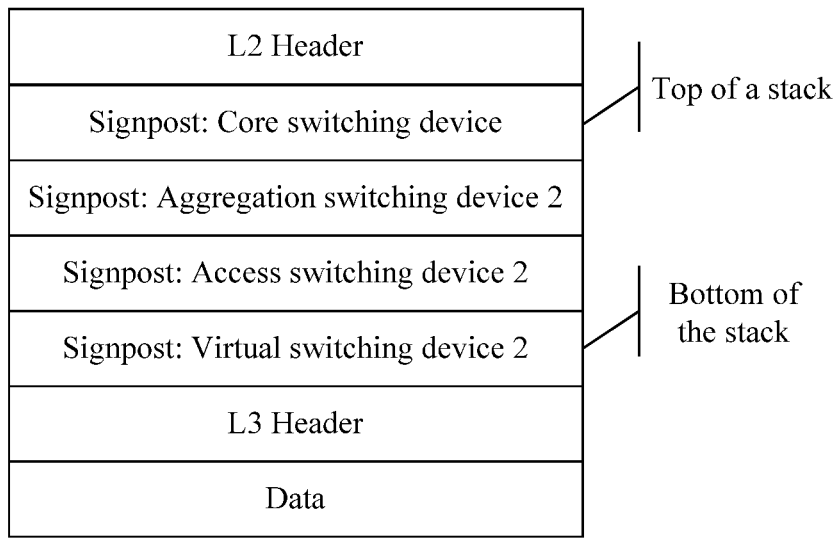
FIG. 10 shows an MPLS stack that includes information about a path from an access switching device 1 to a virtual switching device 2.

The path information from which the signpost (that is, the signpost of the aggregation switching device 1) is removed is shown in FIG. 10.

111-112. The aggregation switching device 1 receives the data and information about a path from the access switching device 1 to the virtual switching device 2 (the information about the path from the access switching device 1 to the virtual switching device 2 includes signposts of the core switching device to the virtual switching device 2) that are sent by the access switching device 1.

A proactive flow entry (the foregoing proactive flow entry of the aggregation switching device 1 in Table 3) locally stored in the aggregation switching device 1 is queried according to the signpost of the core switching device in the information about the path from the access switching device 1 to the virtual switching device 2. If the signpost of the core switching device is matched, actions are executed: removing the signpost of the core switching device and sending, to the port 3, the data and path information from which the signpost is removed. The aggregation switching device 1 forwards, to the core switching device through the port 3, the data and the path information from which the signpost (that is, the signpost of the core switching device) is removed.

Figure 11:
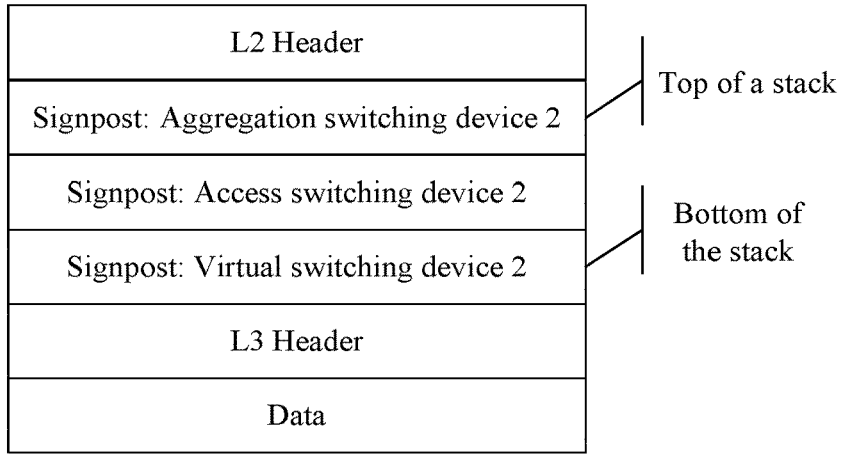
FIG. 11 shows an MPLS stack that includes information about a path from an aggregation switching device 1 to a virtual switching device 2.

The path information from which the signpost (that is, the signpost of the core switching device) is removed is shown in FIG. 11.

113-114. The core switching device receives the data and information about a path from the aggregation switching device 1 to the virtual switching device 2 (the information about the path from the aggregation switching device 1 to the virtual switching device 2 includes signposts of the aggregation switching device 2 to the virtual switching device 2) that are sent by the aggregation switching device 1.

A proactive flow entry (the foregoing proactive flow entry of the core switching device in Table 3) locally stored in the core switching device is queried according to the signpost of the aggregation switching device 2 in the information about the path from the aggregation switching device 1 to the virtual switching device 2. If the signpost of the aggregation switching device 2 is matched, actions are executed: removing the signpost of the aggregation switching device 2 and sending, to the port 9, the data and path information from which the signpost is removed. The core switching device forwards, to the aggregation switching device 2 through the port 9, the data and the path information from which the signpost (that is, the signpost of the aggregation switching device 2) is removed.

Figure 12:
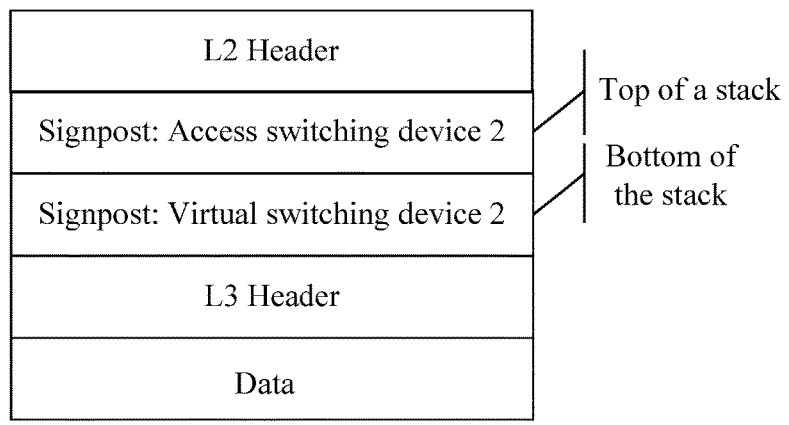
FIG. 12 shows an MPLS stack that includes information about a path from a core switching device to a virtual switching device 2.

The path information from which the signpost (that is, the signpost of the aggregation switching device 2) is removed is shown in FIG. 12.

115-116. The aggregation switching device 2 receives the data and information about a path from the core switching device to the virtual switching device 2 (the information about the path from the core switching device to the virtual switching device 2 includes signposts of the access switching device 2 to the virtual switching device 2) that are sent by the core switching device.

A proactive flow entry (the foregoing proactive flow entry of the aggregation switching device 2 in Table 3) locally stored in the aggregation switching device 2 is queried according to the signpost of the access switching device 2 in the information about the path from the core switching device to the virtual switching device 2. If the signpost of the access switching device 2 is matched, actions are executed: removing the signpost of the access switching device 2 and sending, to the port 7, the data and path information from which the signpost is removed. The aggregation switching device 2 forwards, to the access switching device 2 through the port 7, the data and the path information from which the signpost (that is, the signpost of the access switching device 2) is removed.

Figure 13:
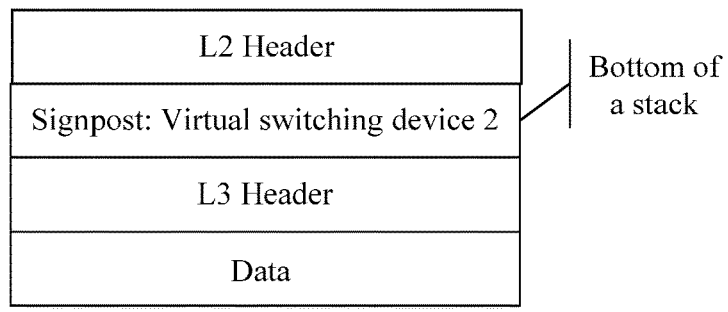
FIG. 13 shows an MPLS stack that includes information about a path from an aggregation switching device 2 to a virtual switching device 2.

The path information from which the signpost (that is, the signpost of the access switching device 2) is removed is shown in FIG. 13.

117-118. The access switching device 2 receives the data and information about a path from the aggregation switching device 2 to the virtual switching device 2 (the information about the path from the aggregation switching device 2 to the virtual switching device 2 includes the signpost of the virtual switching device 2) that are sent by the aggregation switching device 2.

A proactive flow entry (the foregoing proactive flow entry of the access switching device 2 in Table 3) locally stored in the access switching device 2 is queried according to the signpost of the virtual switching device 2 in the information about the path from the aggregation switching device 2 to the virtual switching device 2. If the signpost of the virtual switching device 2 is matched, actions are executed: removing the signpost of the virtual switching device 2 and sending the data to the port 8. The access switching device 2 sends the data to the virtual switching device 2 through the port 8.

119-120. The SDN control device delivers the reactive flow entry 2 listed in Table 7 to the virtual switching device 2 according to step 106 in FIG. 5; if the received data matches the characteristic information of the data, an action of sending the data to the port 1 is executed; and then the virtual switching device 2 sends the data to the destination end through the port 1.

In this case, the virtual switching devices and the backbone switching devices (for example, the access switching device 1, the aggregation switching device 1, the core switching device, the aggregation switching device 2, and the access switching device 2) transmit the data from the source end to the destination end by using the reactive flow entries and the proactive flow entries respectively.

In this embodiment of the present invention, an SDN control device delivers a part of flow entries according to network topology information, where this part of flow entries may be referred to as proactive flow entries. The proactive flow entries are unrelated to a service, but only related to the network topology information. After being delivered, the proactive flow entries may be reused during packet forwarding. After a packet is received, if no matched flow entry exists, the SDN control device delivers another part of flow entries to some switching devices, where this part of flow entries may be referred to as reactive flow entries. The reactive flow entries are related to the service, but are delivered only to some switching devices. In a case of one-to-one communication, the SDN control device may deliver a reactive flow entry only to a virtual switching device in an edge network, and does not need to deliver a reactive flow entry to a switching device in a backbone network. The virtual switching device encapsulates a forwarding path to a destination end for a packet, and a switching device at a backbone layer executes a corresponding operation according to a proactive flow entry. Therefore, flow entries delivered by the SDN control device to a switching device in the backbone network are reduced, so that occupation of resources of the SDN control device and the backbone switching device by flow entries is reduced.

Figure 14:
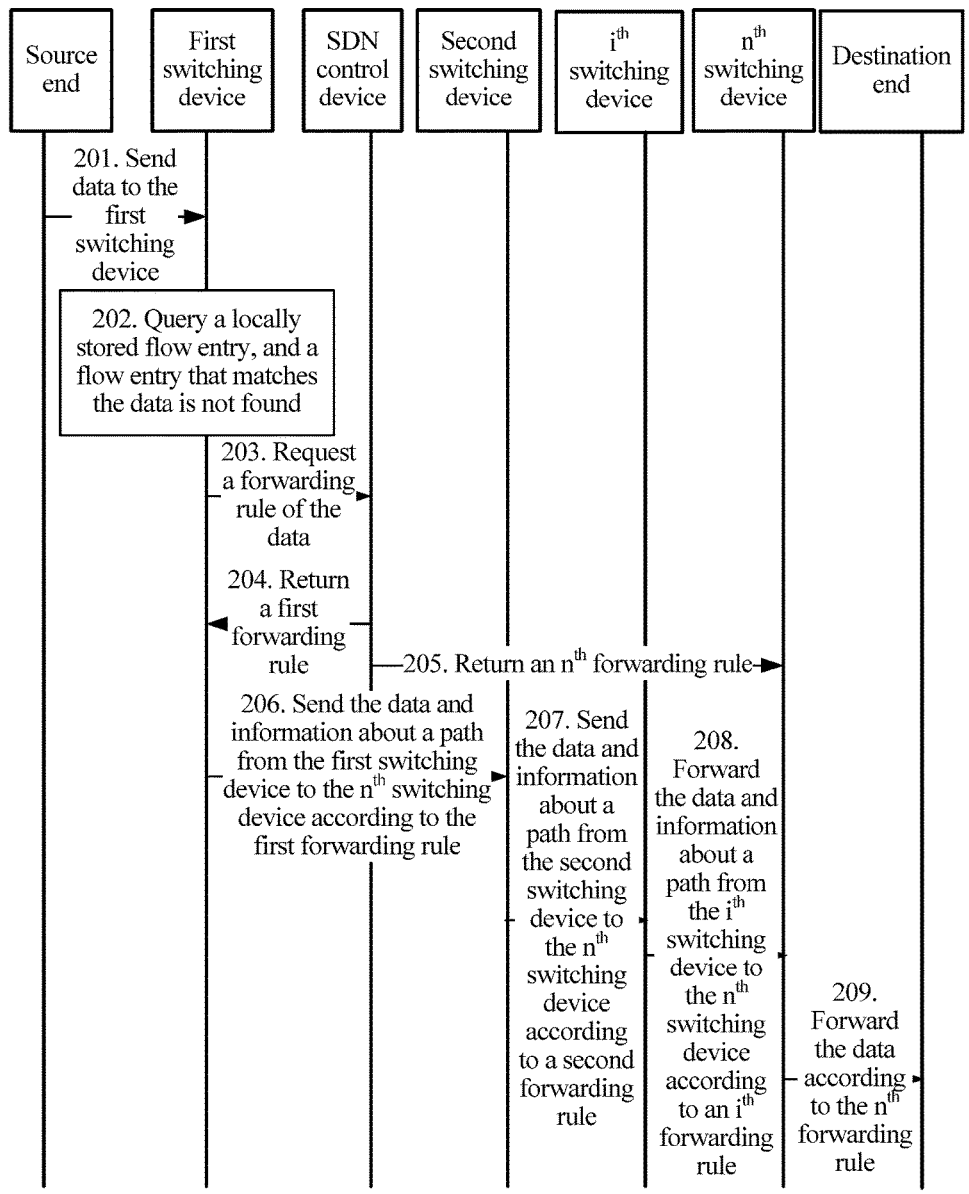
FIG. 14 is another schematic flowchart of data forwarding according to an embodiment of the present invention.

The foregoing description is given by using an example of an SDN system that has seven switching devices. This embodiment of the present invention may be applicable to an SDN system that has n switching devices. The SDN system includes an SDN control device and n switching devices. A first switching device (for example, the virtual switching device 1 in FIG. 1) is a switching device connected to a source end of the data. An $n^{th}$ switching device (for example, the virtual switching device 2 in FIG. 1) is a switching device connected to a destination end of the data. In such a system architecture, for a procedure for implementing data forwarding, refer to FIG. 14.

201. The source end sends data to the first switching device, where the first switching device is an edge switching device of the source end.

202-203. The first switching device receives the data sent by the source end, and queries a locally stored flow entry; and if a flow entry that matches the data is not found, the first switching device requests a forwarding rule of the data from an SDN control device, where the request carries characteristic information of the data.

Similar to 102-103 in FIG. 5, the first switching device may send the entire data to the SDN control device, or may send only the characteristic information of the data provided that the request carries the characteristic information of the data. The characteristic information of the data may be any field in a data packet format, and includes but is not limited to at least one of the following: a source IP address, a destination IP address, source MAC, or destination MAC of the data, or a protocol type.

204. The SDN control device returns a first forwarding rule (for example, the reactive flow entry 1 in the foregoing embodiment) of the data to the first switching device according to the characteristic information of the data, where the first forwarding rule includes information about a path from the first switching device to the $n^{th}$ switching device.

Specifically, the SDN control device selects a proper forwarding path according to the characteristic information of the data and current network topology information. The SDN control device returns the first forwarding rule (for example, the reactive flow entry 1 in the foregoing embodiment) of the data to the first switching device according to the selected forwarding path. When n≥3, the first forwarding rule needs to include the information about the path from the first switching device to the $n^{th}$ switching device; when n<3, the data is directly sent from the source end to the destination end by using two edge switching devices without passing through a backbone switching device, and in this case, there is no need to carry the path information.

Preferably, the information about the path from the first switching device to the $n^{th}$ switching device includes signposts of a third switching device to the $n^{th}$ switching device that are on the data forwarding path. A second switching device (for example, the access switching device 1 in FIG. 1) is a switching device connected to the first switching device on the data forwarding path. The third switching device (for example, the aggregation switching device 1 in FIG. 1) is a switching device connected to the second switching device on the data forwarding path. The signposts of the third switching device to the $n^{th}$ switching device include a signpost sequence that includes n−2 signposts.

Particularly, if n=3, the information about the path from the first switching device to the $n^{th}$ switching device includes only a signpost of the third switching device. Signposts of the third switching device to the $n^{th}$ switching device include only the signpost of the third switching device.

For details, refer to steps 104 and 105 in FIG. 5.

205. The SDN control device further returns an $n^{th}$ forwarding rule (for example, the reactive flow entry 2 in the foregoing embodiment) of the data to the $n^{th}$ switching device according to the characteristic information of the data.

The $n^{th}$ forwarding rule is used to instruct the $n^{th}$ switching device to forward the data to the destination end.

For details, refer to steps 104 and 106 in FIG. 5. In addition, it should be noted that there is no order between 204 and 205.

206. The first switching device receives the first forwarding rule (for example, the reactive flow entry 1 in the foregoing embodiment) returned by the SDN control device, and sends, to a second switching device connected to the first switching device, the data and the information about the path from the first switching device to the $n^{th}$ switching device according to the first forwarding rule.

Specifically, according to the first forwarding rule, the first switching device matches the characteristic information of the data, encapsulates the data and the information about the path from the first switching device to the $n^{th}$ virtual switching device, and then sends, through the port indicated by the first forwarding rule, the data and the path information to the second switching device connected to the first switching device.

The information about the path from the first switching device to the $n^{th}$ virtual switching device includes the signposts of the third switching device to the $n^{th}$ switching device that are on the data forwarding path. The first switching device successively pushes the signposts of the $n^{th}$ switching device to the third switching device into a protocol stack, where a signpost of the $n^{th}$ switching device is shifted into the bottom of the stack, and the signpost of the third switching device is shifted into the top of the stack, so that the protocol stack carries the information about the path from the first switching device to the $n^{th}$ switching device.

The protocol stack includes but is not limited to an MPLS stack.

A signpost of a switching device is similar to that in the foregoing embodiment. For example, the second switching device is configured to identify, according to the signpost of the third switching device, that a next-hop switching device of the data is the third switching device, where the signpost of the third switching device includes but is not limited to at least one of the following: a device identifier of the third switching device, an identifier of a port, on the second switching device, of the third switching device, or an identifier of a link between the third switching device and the second switching device.

For details, refer to step 107-108 in FIG. 7A.

207. The second switching device receives the data and the information about the path from the first switching device to the $n^{th}$ switching device that are sent by the first switching device; queries, according to a signpost of a third switching device in the information about the path from the first switching device to the $n^{th}$ switching device, a second forwarding rule (the proactive flow entry of the access switching device 1 in Table 3) stored in the second switching device; and according to the second forwarding rule, obtains a port, on the second switching device, of the third switching device, and forwards the data to the third switching device through the port, on the second switching device, of the third switching device, where the third switching device is a switching device connected to the second switching device.

The second forwarding rule is a proactive flow entry, and is unrelated to the data, but is only related to the network topology information. Therefore, a match field of the second forwarding rule includes the signpost of the third switching device rather than the characteristic information of the data. An action field of the second forwarding rule is: removing the signpost of the third switching device and sending, to the port, on the second switching device, of the third switching device, the data from which the signpost is removed.

If n≥4, the second switching device further sends, to the third switching device, information about a path from the second switching device to the $n^{th}$ switching device, where the information about the path from the second switching device to the $n^{th}$ switching device includes signposts of the fourth switching device to the $n^{th}$ switching device that are on the data forwarding path, and the fourth switching device (for example, the core switching device in FIG. 1) is a switching device connected to the third switching device. The second switching device removes the signpost of the third switching device from the information about the path from the first switching device to the $n^{th}$ switching device according to the action field of the second forwarding rule to obtain the information about the path from the second switching device to the $n^{th}$ switching device.

Particularly, if n=4, the information about the path from the second switching device to the $n^{th}$ switching device includes only a signpost of the fourth switching device. Signposts of the fourth switching device to the $n^{th}$ switching device include only the signpost of the fourth switching device.

For details, refer to step 109-110 in FIG. 7A.

According to the foregoing method, information about a path from a first switching device to an $n^{th}$ switching device is determined, the first switching device encapsulates the information about the path from the first switching device to the $n^{th}$ switching device and sends the information to a second switching device, and the second switching device forwards the data according to the information about the path from the first switching device to the $n^{th}$ switching device and a second forwarding rule, where the second forwarding rule is only related to network topology information, but unrelated to the data (or packet). Therefore, the second switching device does not need to acquire a forwarding rule each time after receiving data, that is, there is no need to acquire, each time after receiving data, a flow entry from an SDN control device to perform data forwarding, which reduces consumption of resources used by the SDN control device to deliver a flow entry, and improves utilization of a device.

In an optional implementation manner, the second forwarding rule is generated when the second switching device establishes a topology relationship with a switching device connected to the second switching device or when a topology relationship changes. When the topology relationship between the second switching device and the switching device connected to the second switching device changes, a forwarding rule between the second switching device and the switching device connected to the second switching device changes accordingly. In this case, when the second switching device establishes a topology relationship with a switching device connected to the second switching device or when a topology relationship changes, the SDN control device generates the second forwarding rule and sends the second forwarding rule to the second switching device, so that the second switching device can perform forwarding according to a latest network topology when performing data forwarding according to the second forwarding rule, which reduces resource consumption of a device and improves accuracy of data forwarding.

208. An $i^{th}$ switching device receives the data and information about a path from an $i-1^{th}$ switching device to the $n^{th}$ switching device that are sent by the $i-1^{th}$ switching device, where the information about the path from the $i-1^{th}$ switching device to the $n^{th}$ switching device includes signposts of an $i+1^{th}$ switching device to the $n^{th}$ switching device that are on the data forwarding path, i is an integer greater than or equal to 3, and i is less than n.

The $i^{th}$ switching device queries, according to a signpost of the $i+1^{th}$ switching device, an $i^{th}$ forwarding rule (for example, a proactive flow entry in Table 3) stored in the $i^{th}$ switching device; and according to the $i^{th}$ forwarding rule, determines a port, on the $i^{th}$ switching device, of the $i+1^{th}$ switching device, and forwards the data to the $i+1^{th}$ switching device through the port.

If the $i+1^{th}$ switching device is not the last switching device on the data forwarding path, that is, not the $n^{th}$ switching device, the $i^{th}$ switching device further sends, to the $i+1^{th}$ switching device, information about a path from the $i^{th}$ switching device to the $n^{th}$ switching device according to the $i^{th}$ forwarding rule (for example, the proactive flow entry in Table 3), where the information about the path from the $i^{th}$ switching device to the $n^{th}$ switching device includes signposts of an $i+2^{th}$ switching device to the $n^{th}$ switching device that are on the data forwarding path, and the $i+2^{th}$ switching device is a switching device connected to the $i+1^{th}$ switching device.

Specifically, that the $i^{th}$ switching device sends, to the $i+1^{th}$ switching device, information about a path from the $i^{th}$ switching device to the $n^{th}$ switching device according to the $i^{th}$ forwarding rule (for example, the proactive flow entry in Table 3) specifically includes: the $i^{th}$ switching device removes the signpost of the $i+1^{th}$ switching device from the information about the path from the $i-1^{th}$ switching device to the $n^{th}$ switching device according to the $i^{th}$ forwarding rule to obtain the signposts of the $i+2^{th}$ switching device to the $n^{th}$ switching device, and sends, to the $i+1^{th}$ switching device, the signposts of the $i+2^{th}$ switching device to the $n^{th}$ switching device. In addition, the $i^{th}$ switching device further sends, to the $i+1^{th}$ switching device, the information about the path from the $i^{th}$ switching device to the $n^{th}$ switching device according to the port, on the $i^{th}$ switching device, of the $i+1^{th}$ switching device.

The $i^{th}$ switching device is, for example, the aggregation switching device 1, the core switching device, the aggregation switching device 2, or the access switching device 2 in FIG. 1.

Step 208 is repeatedly executed until the data is transmitted to the $n^{th}$ switching device.

For details, refer to steps 111 to 118 in FIG. 7A and FIG. 7B.

209. The $n^{th}$ switching device forwards, if the data received from an $n-1^{th}$ switching device matches a match field of the $n^{th}$ forwarding rule, the data to the destination end according to the $n^{th}$ forwarding rule received from the SDN control device.

For details, refer to step 119-120 in FIG. 7B.

According to the foregoing method for implementing data forwarding, after receiving a forwarding rule (for example, a proactive flow entry in the foregoing embodiment), a backbone switching device does not need to acquire a forwarding rule each time data is being forwarded, which reduces resource overheads of a control device and a switching device, and improves a utilization rate of resources in an SDN system. For example, after receiving a second forwarding rule (which may also be referred to as a flow entry), the backbone switching device (for example, a second switching device) does not need to acquire a forwarding rule each time data is being forwarded. Accordingly, an SDN control device does not need to deliver a second forwarding rule to the second switching device each time the data is being forwarded, that is, the second forwarding rule may be reused during subsequent data forwarding. This reduces a quantity of forwarding rules delivered by the SDN control device to the second switching device, and accordingly reduces a device resource occupation rate of the SDN control device; and network bandwidth between the SDN control device and the second switching device is also reduced accordingly. In addition, the second switching device does not need to receive a second forwarding rule each time the data is being forwarded, which improves a resource utilization rate of the second switching device.

After a backbone switching device in a DC network receives a proactive flow entry delivered by the SDN control device and an edge switching device receives a reactive flow entry delivered by the SDN control device, packet forwarding can be implemented. Because the backbone switching device receives the proactive flow entry, and there is no need to deliver a flow entry to the backbone switching device each time the data is being forwarded, that is, the proactive flow entry may be reused in subsequent data forwarding, a quantity of flow entries delivered to the backbone switching device is reduced, a device resource occupation rate of the SDN control device is reduced accordingly, and network bandwidth between the SDN control device and the backbone switching device is also reduced accordingly. In addition, the backbone switching device does not need to receive a flow entry each time the data is being forwarded, which improves a resource utilization rate of the backbone switching device.

In the foregoing data forwarding method 1, there is one source end and one destination end, and the method may be referred to as a unicast solution. The foregoing data forwarding method may be applied to various scenarios, for example, network security, a service, multicast, or broadcast (a scenario of multiple destination ends). Descriptions are given separately as follows:

SDN System 2

A tenant may lease a computing resource, a storage resource, or a network resource from a data center (DC) supplier. A user may use the resource leased by the tenant. Therefore, the tenant may deploy various services on a host, in the DC, to which the tenant belongs, and open the services to the user of the tenant.

Figure 15:
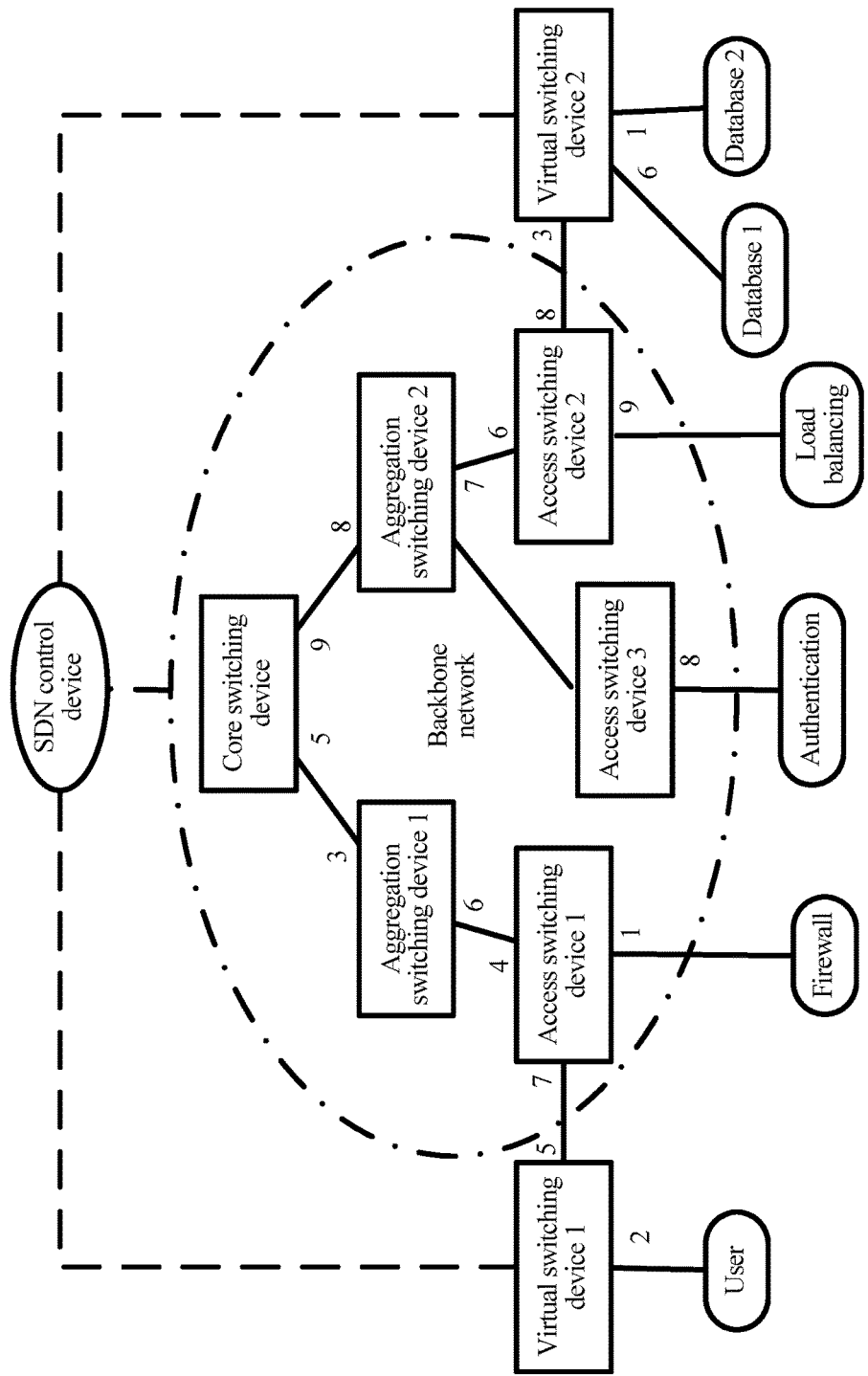
FIG. 15 is a schematic diagram of another SDN system for implementing data forwarding according to an embodiment of the present invention.
Figure 16:
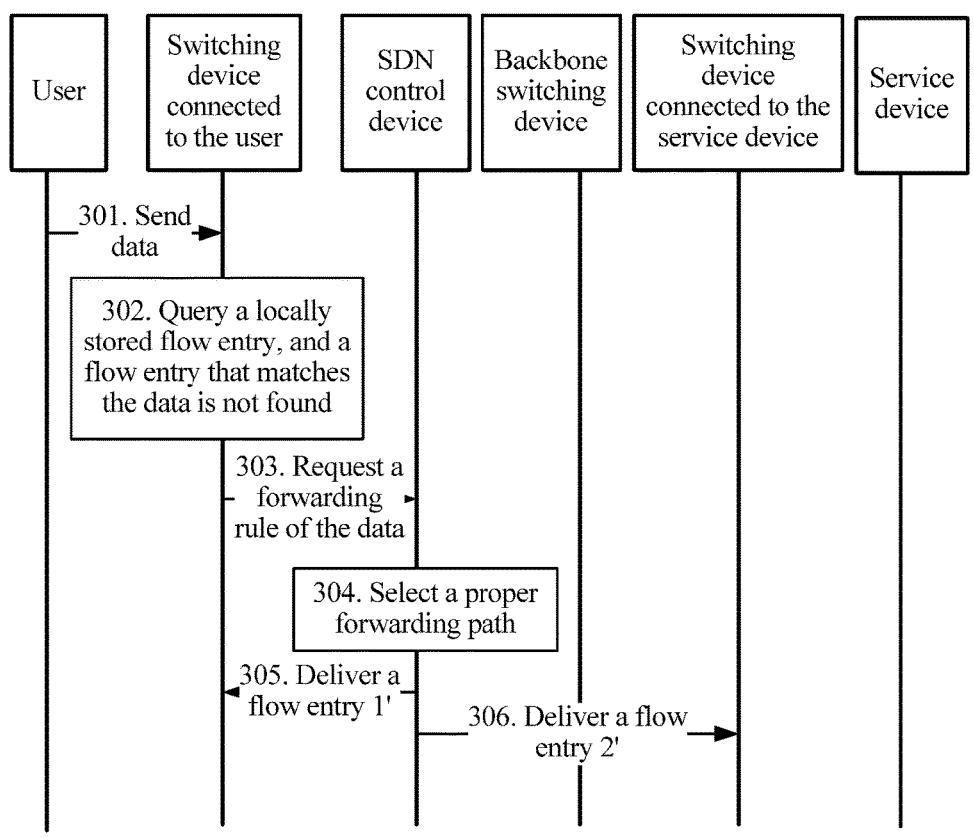
FIG. 16 is another schematic flowchart of delivering reactive flow entries according to an embodiment of the present invention.

The DC allows the tenant to customize a policy to instruct data to shuttle between different services. FIG. 15 is a schematic diagram of another SDN system for implementing data forwarding according to an embodiment of the present invention. The SDN system shown in FIG. 15 may be understood as the SDN system, shown in FIG. 1, to which services are added.

As shown in FIG. 15, the tenant deploys a firewall service, an authentication service, a load balancing service, and a database service inside the DC. A host on which the firewall service locates accesses a DC network by using an access switching device 1, a host on which the authentication service locates accesses the DC network by using an access switching device 3, a host on which the load balancing service locates accesses the DC network by using an access switching device 2, and a host on which the database service locates accesses the DC network by using a virtual switching device 2. The database service of the tenant is opened to the user of the tenant. In consideration of security, the tenant expects that before the user accesses a database, a firewall needs to be passed through, and authentication processing needs to be performed on the user; in addition, considering performance and availability of the database service, timely scheduling and allocation of a data source need to be performed in the load balancing service. When accessing the database, the user may query data in the database, or modify data in the database, or add data to the database, which is not limited in the present invention.

A host that provides various services (or a host on which a service is deployed by the tenant) may be referred to as a service device. As shown in FIG. 15, service devices include but are not limited to: the host on which the firewall service locates, the host on which the authentication service locates, the host on which the load balancing service locates, and the host on which the database service locates. A host is a server that can provide a specific service (for example, a firewall), and may be a physical server or may be a virtual server. In an optional implementation manner, the host may also be the foregoing device such as the mobile terminal, the fixed terminal, or the wireless access terminal. No limitation is imposed on a specific implementation manner in this embodiment of the present invention.

The tenant provides a related service by using a host on which the related service is deployed. For example, a host on which a firewall is deployed provides a firewall service, where the host that provides the firewall service is a service device. The following describes a data forwarding method in which the services are added to the SDN system.

Data Forwarding Method 2

1. Proactive Flow Entry

Similar to the proactive flow entries in the data forwarding method 1, an SDN control device needs to deliver proactive flow entries to all backbone switching devices according to network topology information. For details, refer to the description in the data forwarding method 1, and details are not described again.

In FIG. 15, in the SDN system to which service devices are added, in addition to delivering the proactive flow entries in the data forwarding method 1 to all the backbone switching devices, the SDN control device further needs to deliver another proactive flow entry to a switching device connected to a service device. Details are described as follows:

A tenant may request, by using a UI (User Interface, user interface), the SDN control device to add or delete a service device. The tenant initiates, to the SDN control device by using the UI, a request of creating a service device; the SDN control device creates service devices, and the SDN control device allocates identifiers of the service devices to the service devices (refer to Table 8). An identifier of a service device is unique, and is used to distinguish from another service device in a DC network or another type of object that can have a device identifier; the identifier may be independent, or may be combined with another device identifier. An identifier of a service device is used to determine a data forwarding path. The SDN control device makes, by using the UI, a response to the request of creating a service device.

For the SDN system in FIG. 15, it is assumed that the identifiers of the service devices that are allocated by the SDN control device to all the service devices are listed in Table 8:

TABLE 8

| Service devices | Identifiers of the service devices |
| --- | --- |
| Host on which a firewall locates | 5 |
| Host on which an authentication service locates | 6 |
| Host on which a load balancing service locates | 7 |
| Host on which a database 1 locates | 8 |
| Host on which a database 2 locates | 9 |

The host on which a firewall locates (which may also be referred to as a firewall service device) obtains an identifier 5; the host on which an authentication service locates (which may also be referred to as an authentication service device) obtains an identifier 6; the host on which a load balancing service locates (which may also be referred to as a load balancing service device) obtains an identifier 7; the host on which a database 1 locates (which may also be referred to as a database 1 service device) obtains an identifier 8; the host on which a database 2 locates (which may also be referred to as a database 2 service device) obtains an identifier 9.

When the tenant needs to delete a service device, the tenant initiates, to the SDN control device by using the UI, a request of deleting a service device; the SDN control device deletes the service device, and then retrieves an identifier that has been allocated to the service device. The retrieved identifier of the service device may be reallocated to another service device or another type of object that can have a device identifier. The SDN control device makes, by using the UI, a response to the request of deleting a service device.

The tenant may set a service for a user of the tenant, for example, only the firewall is passed through, or only authentication is performed. Certainly, alternatively, the tenant may set multiple services for the user of the tenant, where there is order between these services. A service sequence that includes multiple services may also be referred to as a service chain. Order, specified by the tenant, of the multiple services indicates a policy on providing a service to the outside by the tenant. A DC allows the tenant to customize different service chains, and then leads data to different service devices according to characteristic information of the data of the user, so as to traverse all service devices on the service chains.

An operation of adding a service chain by the tenant is also implemented by using the UI. A specific process is as follows: The tenant initiates, to the SDN control device by using the UI, a request of creating a service chain; the SDN control device creates service chains (as listed in Table 9); and the SDN control device returns, to the tenant by using the UI, a result of creating the service chains.

The service chains created by the SDN control device are listed in Table 9. Certainly, Table 9 is merely exemplary.

TABLE 9

| Service chains | Order of services | Identifier sequences of service nodes |
|---|---|---|
| 1 | Firewall—Authentication—Database 1 | 5-6-8 |
| 2 | Firewall—Authentication—Database 2 | 5-6-9 |
| 3 | Firewall—Authentication—Load balancing | 5-6-7 |

The tenant specifies the database 1 as a data source for the user by using the first service chain; data passes through the firewall, then is authenticated, and finally arrives at the database 1; an identifier sequence of corresponding service devices is 5-6-8. The tenant specifies the database 2 as a data source for the user by using the second service chain; data passes through the firewall, then is authenticated, and finally arrives at the database 2; an identifier sequence of corresponding service devices is 5-6-9. A load balancing service specifies a data source for the user by using the third service chain; data passes through the firewall, then is authenticated, scheduled by the load balancing service, and finally arrives at a database specified by the load balancing service; an identifier sequence of corresponding service devices is 5-6-7.

After allocating the identifiers of the service devices and the service chains, the SDN control device needs to deliver proactive flow entries to switching devices connected to the service devices. The proactive flow entries delivered to the switching devices connected to the service devices meet the following characteristics:

a match condition: an identifier of a service device; and an execution action: removing the identifier of the service device and sending the data to a service device port.

TABLE 10

| Switching devices | Proactive flow entries |
|---|---|
| Access switching device 1 | Match condition: identifier of the firewall service device; execution action: removing the identifier of the firewall service device and sending an original packet to a port 1 |
| Access switching device 3 | Match condition: identifier of the authentication service device; execution action: removing the identifier of the authentication service device and sending an original packet to a port 8 |
| Access switching device 2 | Match condition: identifier of the load balancing service device; execution action: removing the identifier of the load balancing service device and sending an original packet to a port 9 |
| Virtual switching device 2 | Match condition: identifier of the database 1 service device; execution action: removing the identifier of the database 1 service device and sending an original packet to a port 6 Match condition: identifier of the database 2 service device; execution action: removing the identifier of the database 2 service device and sending an original packet to a port 1 |

The proactive flow entries delivered by the SDN control device to the switching devices connected to the service devices are listed in Table 10. The SDN control device instructs the access switching device 1 to: match a packet that carries the identifier of the firewall service device, remove the identifier of the firewall service device from the packet, and send the original packet to the port 1; instructs the access switching device 3 to: match a packet that carries the identifier of the authentication service device, remove the identifier of the authentication service device from the packet, and send the original packet to the port 8; instructs the access switching device 2 to: match a packet that carries the identifier of the load balancing service device, remove the identifier of the load balancing service device from the packet, and send the original packet to the port 9; instructs the virtual switching device 2 to: match a packet that carries an identifier of a database service device, remove the identifier of the database service device from the packet, and send the original packet to a corresponding port (if the database service device is the database 1 service device, the original packet is sent to the port 6; if the database service device is the database 2 service device, the original packet is sent to the port 1).

Certainly, the tenant may also delete a service chain. A specific process is as follows: The tenant initiates, to the SDN control device by using the UI, a request of deleting a service chain; the SDN control device deletes the service chain; and the SDN control device returns, to the tenant by using the UI, a result of deleting the service chain. In addition, the SDN control device further needs to delete a proactive flow entry of a switching device connected to a service device.

2. Reactive Flow Entry

301. A user sends data (which may also be referred to as a packet, or a data flow, or a user flow) to a switching device (for example, a virtual switching device 1) connected to the user.

302-303. The switching device (for example, the virtual switching device 1) connected to the user queries a locally stored flow entry, and if a flow entry that matches the data is not found, the virtual switching device 1 requests a forwarding rule of the data from an SDN control device, where the request carries characteristic information of the data.

It should be noted that, the virtual switching device 1 may send the entire data to the SDN control device, or may send only the characteristic information of the data provided that the request carries the characteristic information of the data. The characteristic information of the data may be any field in a data packet format, and includes but is not limited to at least one of the following: a source IP address, a destination IP address, source MAC, or destination MAC of the data, or a protocol type.

304-305. The SDN control device selects a proper forwarding path according to the characteristic information of the data and current network topology information and a service policy of a tenant. The SDN control device may select an optimal forwarding path from multiple forwarding paths; for example, the SDN control device may select a shortest forwarding path or a forwarding path that has a lowest traffic weight.

Reference may be specifically made to the description in FIG. 6 and FIG. 6', and details are not described again.

The SDN control device delivers, according to the selected forwarding path, the forwarding rule (that is, a reactive flow entry 1') of the data to the switching device connected to the user, as listed in Table 11.

TABLE 11

| Switching device | Reactive flow entry |
|---|---|
| Virtual switching device 1 | Match condition: characteristic information of the data; execution action: encapsulating the identifier of the firewall service device and sending the packet in which the identifier is encapsulated to a port 5 |

Similar to a proactive flow entry, a reactive flow entry (flow entry) also includes two parts, where one part is a match condition (which is also referred to as a match field, and is described as a match field in English), and the other part is an execution action (which is also referred to as an action field, and is described as an action in English).

Specifically, the reactive flow entry includes the following information:

a match condition: the characteristic information of the data; and an execution action: encapsulating the identifier of the firewall service device, and sending the packet in which the identifier is encapsulated to the port 5.

Because the virtual switching device 1 is connected to the access switching device 1, and the access switching device 1 is connected to the firewall service device, only the identifier of the firewall service device is encapsulated into the packet sent by the virtual switching device 1 to the access switching device 1, and there is no need to encapsulate information about a path to the access switching device 1.

306. In addition, the SDN control device further needs to deliver forwarding rules (that is, reactive flow entries 2') of the data to switching devices connected to service devices, as listed in Table 12.

TABLE 12

| Switching devices | Reactive flow entries |
|---|---|
| Access switching device 1 | Match condition: characteristic information of the processed data; execution action: encapsulating the identifier of the authentication service device and information about a path from the access switching device 1 to a switching device connected to the authentication service device, and sending the data in which the identifier and the path information are encapsulated to a port 4 |
| Access switching device 3 | Match condition: characteristic information of the processed data; execution action: encapsulating the identifier of the load balancing service device and information about a path from the access switching device 3 to a switching device connected to the load balancing service device, and sending the data in which the identifier and the path information are encapsulated to a port 5 |
| Access switching device 2 | Match condition: characteristic information of the processed data; execution action: encapsulating the identifier of the database service device, and sending the data in which the identifier is encapsulated to a port 8 |

An identifier of a next-hop service device is encapsulated for the data according to locations of the service devices on a service chain; in some cases, information about a path to a next-hop service device needs to be further encapsulated, and then the data in which the identifier and the path information are encapsulated is sent to an egress port of a switching device.

The reactive flow entries 2' delivered by the SDN control device to the switching devices connected to the service devices are listed in Table 12. The reactive flow entries 2' instruct the access switching device 1 to: match the characteristic information of the processed data, encapsulate the identifier of the authentication service device and the information about the path from the access switching device 1 to the switching device connected to the authentication service device, and then send the data in which the identifier and the path information are encapsulated to the port 4; instruct the access switching device 3 to: match the characteristic information of the processed data, encapsulate the identifier of the load balancing service device and the information about the path from the access switching device 3 to the switching device connected to the load balancing service device, and then send the data in which the identifier and the path information are encapsulated to the port 5; and instruct the access switching device 2 to: match the characteristic information of the processed data, encapsulate the identifier of the database service device, and then send the data in which the identifier is encapsulated to the port 8.

It should be noted that, because the database is a last-hop service on the service chain, the SDN control device does not need to deliver a reactive flow entry to the virtual switching device 2 connected to the database, and only need to deliver the proactive flow entries listed in Table 10. There is no order between 305 and 306.

After the foregoing process, the backbone switching devices receive the proactive flow entries from the SDN control device, and the switching devices connected to the service devices receive other proactive flow entries; after the data is received, the switching device connected to the user requests a reactive flow entry from the SDN control device, and the switching devices connected to the service devices also receive other reactive flow entries. For details about how to transmit the data from the user to the database according to the proactive flow entries and the reactive flow entries, refer to FIG. 17A to FIG. 17C.

In the foregoing embodiment, a proactive flow entry and a reactive flow entry are delivered in a scenario in which different service devices exist, which implements that a flow entry does not need to be repeatedly delivered when a tenant-customized policy is met to implement flexible shuttling of data or a service flow between different services. Therefore, device resource occupation rates of an SDN control device and a switching device are reduced, and performance and efficiency of the SDN control device and the switching device are also improved accordingly.

3. Data Forwarding

It should be noted that, because data that enters a service device needs to be original data, when delivering a forwarding path, an SDN control device cannot customize a forwarding path of an entire service chain at a time, and needs to divide the path into multiple segments according to each service device. A start of each segment is a previous service device, an end is a next service device, and a path delivery manner of each segment is similar to an implementation manner shown in the data forwarding method 1. Details are described in the following with reference to FIG. 17A to FIG. 17C.

Figure 17A:
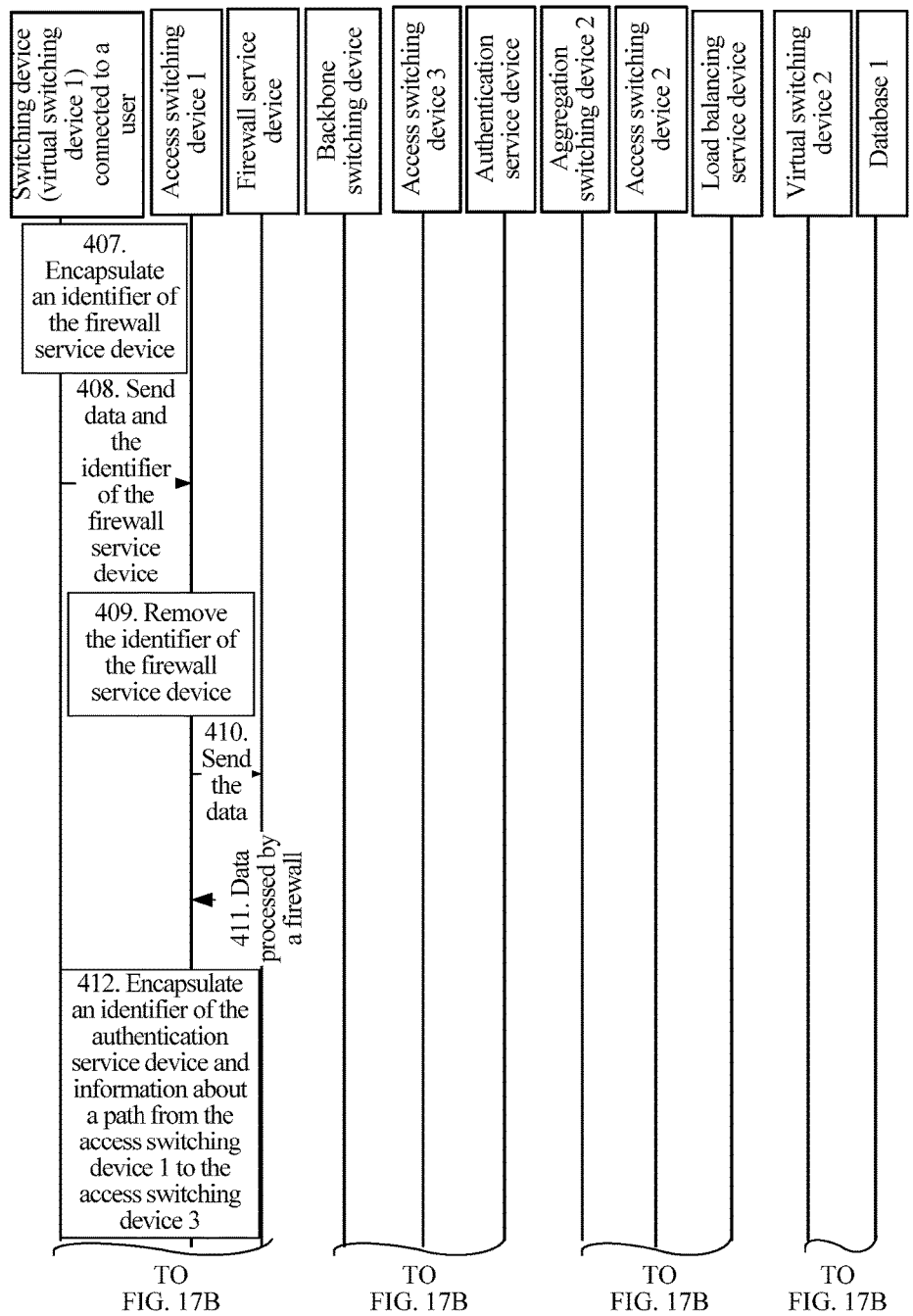
FIG. 17A to FIG. 17C are other schematic flowcharts of data forwarding according to an embodiment of the present invention.
Figure 17B:
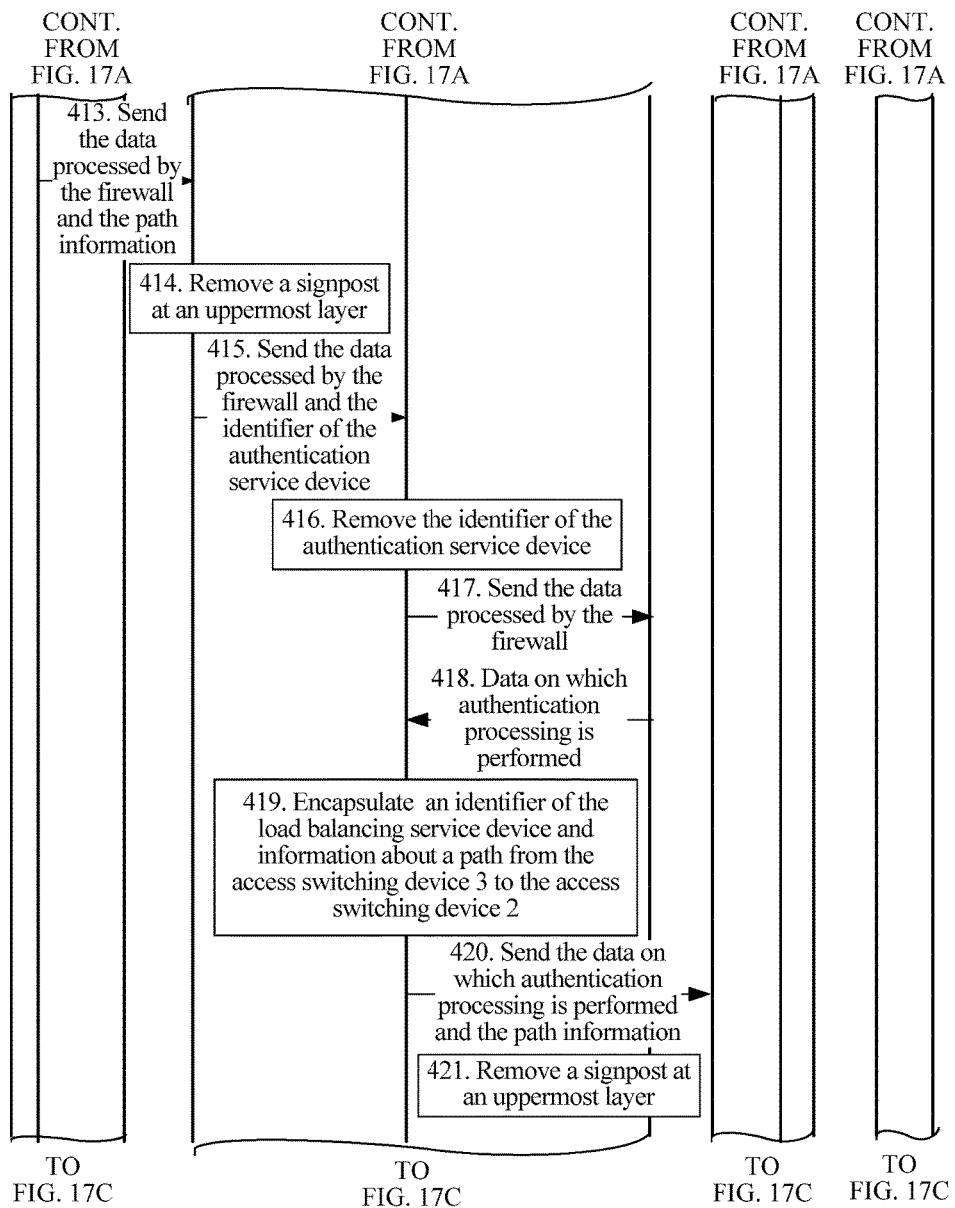
Figure 17C:
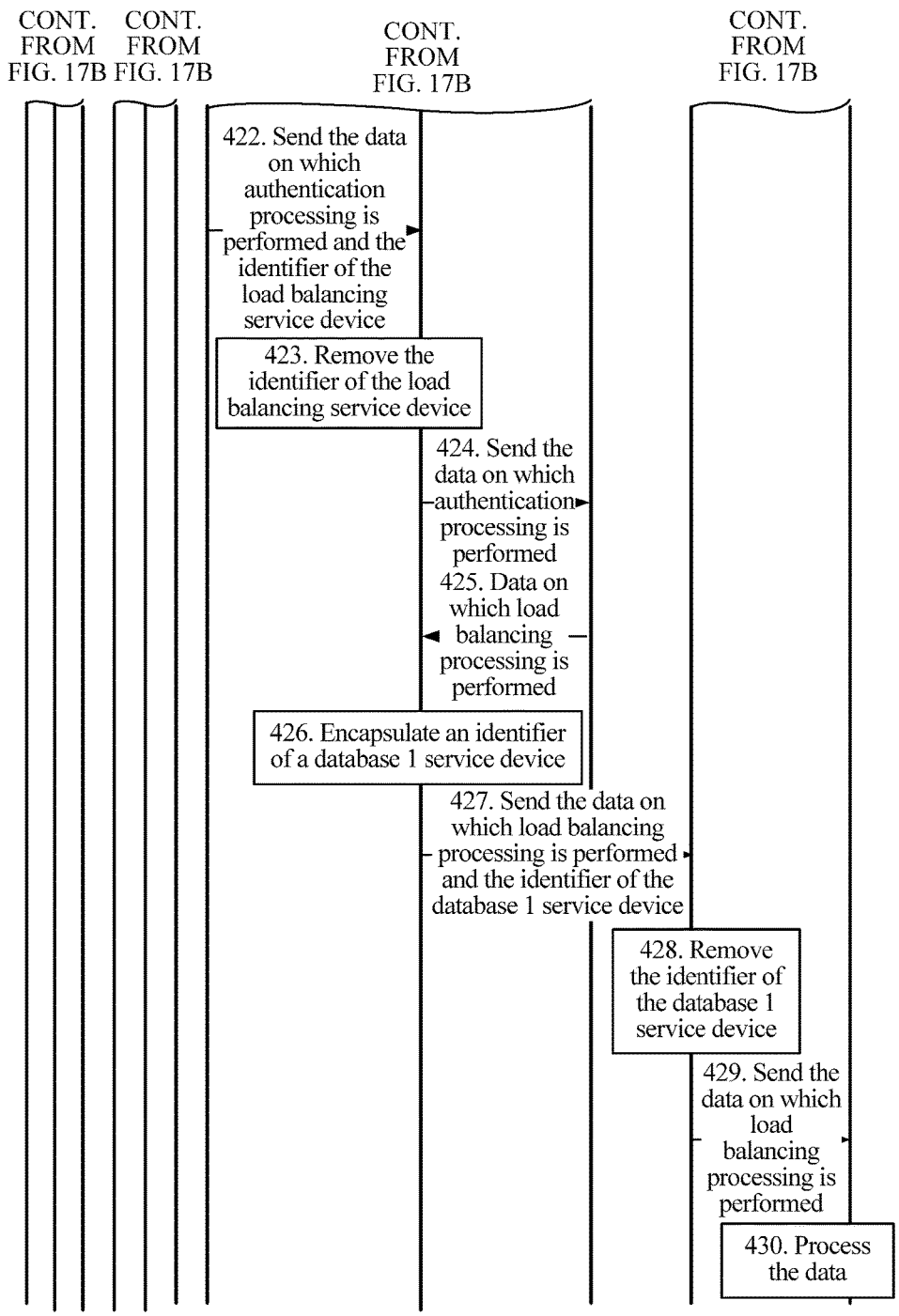

FIG. 17A to FIG. 17C are schematic flowcharts of data forwarding according to an embodiment of the present invention. In the schematic flowcharts shown in FIG. 17A to FIG. 17C, a firewall service, an authentication service, a load balancing service, and a database 1 service are successively passed through. Because the database 1 service is a last-hop service on a service chain, the database 1 service may also be referred to as a destination service, and a database 1 service device may also be referred to as a destination service device.

407-408. According to the reactive flow entry 1' in Table 11, a switching device connected to the user (for example, the virtual switching device 1) matches the characteristic information of the data, encapsulates an identifier of a firewall service device, and then sends the data and the identifier of the firewall service device to the access switching device 1 through a port 5 indicated by the reactive flow entry 1'.

409-410. The access switching device 1 receives the identifier of the firewall service device sent by the virtual switching device 1. According to the proactive flow entry of the access switching device 1 in Table 10, the access switching device 1 matches the identifier of the firewall service device, and then executes actions of removing the identifier of the firewall service device and sending the data to a port 1, where the data arrives at the firewall service device through the port 1, and removing may also be understood as deleting.

411-413. The access switching device 1 receives, though the port 1, data processed by a firewall, where the data processed by the firewall is also referred to as data processed by the firewall service device. If the data processed by the firewall matches characteristic information of the processed data, the access switching device 1 executes, according to the reactive flow entry 2' of the access switching device 1 indicated in Table 12, actions of encapsulating an identifier of a next service device (for example, an identifier of an authentication service device) and information about a path from the access switching device 1 to a switching device (for example, the access switching device 3) connected to the authentication service device and sending, to an aggregation switching device 1 through a port 4, data in which the identifier and the path information are encapsulated.

The information about the path from the access switching device 1 to the access switching device 3 is similar to the path information in the data forwarding method 1. It is only needed to treat the user as the source end, treat the access switching device 1 as the switching device connected to the source end in the data forwarding method 1, treat the authentication service device as the destination end, and treat the access switching device 3 as the switching device connected to the destination end in the data forwarding method 1. In the SDN system 2, an encapsulation action of the access switching device 1 is similar to that of the virtual switching device 1 in the data forwarding method 1.

Specifically, the information about the path from the access switching device 1 to the switching device connected to the authentication service device includes signposts of a core switching device to the access switching device 3. The access switching device 1 may carry, by using a protocol stack, the information about the path from the access switching device 1 to the switching device connected to the authentication service device. The following uses an example in which the protocol stack is a Multiprotocol Label Switching (Multiple Protocol Label Switching, MPLS) stack for description. Similar to the data forwarding method 1, one MPLS Header (MPLS header) carries a signpost of one switching device. Multiple MPLS headers are nested sequentially and carry a group of signposts, so as to form a forwarding path. The access switching device 1 pushes the information about the path from the access switching device 1 to the switching device connected to the authentication service device into the MPLS stack according to the forwarding path selected by the SDN control device.

The information about the path from the access switching device 1 to the switching device connected to the authentication service device includes the signposts of the core switching device to the access switching device 3. The access switching device 1 shifts the identifier of the authentication service device into the bottom of the stack, shifts a signpost of the access switching device 3 into an upper layer of the bottom of the stack, and shifts a signpost of the core switching device into the top of the stack. An MPLS stack in which the identifier of the authentication service device and the information about the path from the access switching device 1 to the switching device connected to the authentication service device are encapsulated is shown in FIG. 18.

Figure 18:
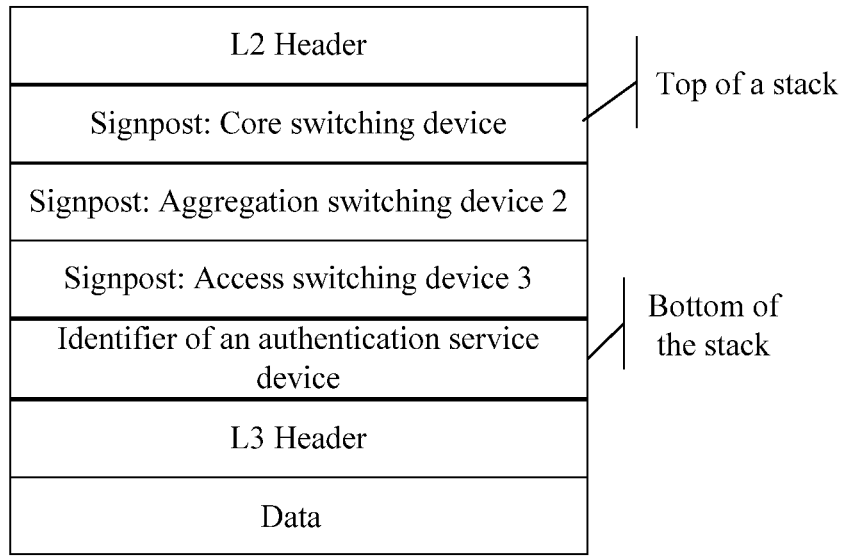
FIG. 18 shows an MPLS stack that includes information about a path from an access switching device 1 to an access switching device 3 and an identifier of a service device.

As shown in FIG. 18, the authentication service device is the last hop on the path, and the identifier of the authentication service device is first pushed into the packet, and is located at the bottom of the stack of an MPLS nested label. Because an encapsulation operation for a forwarding path is executed on the access switching device 1, and the access switching device 1 learns, according to the reactive flow entry 2' listed in Table 12, that a next-hop switching device of the packet is the aggregation switching device 1, a first hop on the forwarding path is a next-hop switching device of the aggregation switching device 1, that is, the core switching device, and the signpost of the core switching device is shifted into the top of the stack. According to sequencing order, signposts of other switching devices are successively the signpost of the access switching device 3 and a signpost of an aggregation switching device 2.

414-415. All backbone switching devices (for example, the aggregation switching device 1, the core switching device, and the aggregation switching device 2) receive the data processed by the firewall service device and the path information, and execute, according to the proactive flow entries listed in Table 3, actions of removing a signpost at an uppermost layer and sending the data to a next-hop switching device. For details, refer to the description in the data forwarding method 1, and details are not described again.

416-417. The access switching device 3 receives the data processed by the firewall and the identifier of the authentication service device. According to the proactive flow entry of the access switching device 3 in Table 10, the access switching device 3 matches the identifier of the authentication service device, and then executes actions of removing the identifier of the authentication service device and sending the data to a port 8. The data arrives at the authentication service device through the port 8.

418-420. The access switching device 3 receives, though the port 8, data on which authentication processing is performed, where the data on which authentication processing is performed is also referred to as data processed by the authentication service device. If the data on which authentication processing is performed matches characteristic information of the processed data, the access switching device 3 executes, according to the reactive flow entry 2' of the access switching device 3 listed in Table 12, actions of encapsulating an identifier of a next-hop service device (for example, an identifier of a load balancing service device) and information about a path from the access switching device 3 to a switching device (for example, the access switching device 2) connected to the load balancing service device and sending, to the aggregation switching device 2 through the port 5, data in which the identifier and the path information are encapsulated.

The information about the path from the access switching device 3 to the switching device (for example, the access switching device 2) connected to the load balancing service device is similar to that in the data forwarding method 1. It is only needed to treat the access switching device 3 as the switching device connected to the source end in the data forwarding method 1, treat the load balancing service device as the destination end, and treat the access switching device 2 as the switching device connected to the destination end. In the SDN system 2, an encapsulation action of the access switching device 3 is similar to that of the virtual switching device 1 in the data forwarding method 1.

Specifically, the information about the path from the access switching device 3 to the switching device (for example, the access switching device 2) connected to the load balancing service device includes a signpost of the access switching device 2. The access switching device 3 may carry, by using a protocol stack, the information about the path from the access switching device 3 to the switching device (for example, the access switching device 2) connected to the load balancing service device. The access switching device 3 pushes the information about the path from the access switching device 3 to the switching device (for example, the access switching device 2) connected to the load balancing service device into the MPLS stack according to the forwarding path selected by the SDN control device.

The information about the path from the access switching device 3 to the switching device (for example, the access switching device 2) connected to the load balancing service device includes the signpost of the access switching device 2. The access switching device 3 shifts the identifier of the load balancing service device into the bottom of the stack, shifts the signpost of the access switching device 2 into an upper layer of the bottom of the stack. An MPLS stack in which the identifier of the load balancing service device and the information about the path from the access switching device 3 to the access switching device 2 are encapsulated is shown in FIG. 19.

Figure 19:
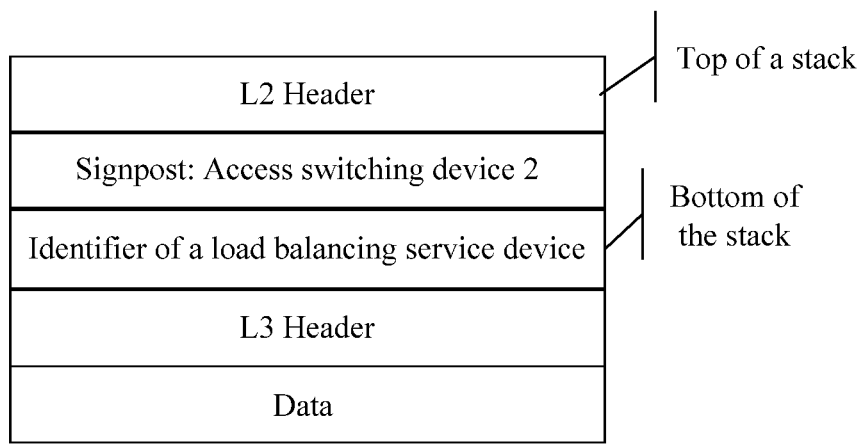
FIG. 19 shows an MPLS stack that includes information about a path from an access switching device 3 to an access switching device 2 and an identifier of a service device.

As shown in FIG. 19, the load balancing service device is the last hop on the path, and the identifier of the load balancing service device is first pushed into the packet, and is located at the bottom of the stack of an MPLS nested label. Because an encapsulation operation for a forwarding path is executed on the access switching device 3, and the access switching device 3 learns, according to the reactive flow entry 2' listed in Table 12, that a next-hop switching device of the packet is the aggregation switching device 2, a first hop on the forwarding path is a next-hop switching device of the aggregation switching device 2, that is, the access switching device 2, and the signpost of the access switching device 2 is shifted to the top of the stack.

421-422. A backbone switching device (for example, the aggregation switching device 2) executes, according to a proactive flow entry listed in Table 3, actions of removing a signpost at an uppermost layer and sending the data to a next-hop switching device. For details, refer to the description in the data forwarding method 1, and details are not described again.

423-424. The access switching device 2 receives the data and the identifier of the load balancing service device. According to the proactive flow entry of the access switching device 2 in Table 10, the access switching device 2 matches the identifier of the load balancing service device, and then executes actions of removing the identifier of the load balancing service device and sending the data to a port 9. The data processed by the authentication service device arrives at the load balancing service device through the port 9. It is assumed that the load balancing service device selects, according to a preset policy, a database 1 to perform data processing.

425-427. The access switching device 2 receives, though the port 9, data on which load balancing processing is performed, where the data on which load balancing processing is performed is also referred to as data processed by the load balancing service device. If the data processed by the load balancing service device matches characteristic information of the processed data, the access switching device 2 executes, according to the reactive flow entry 2' of the access switching device 2 listed in Table 12, actions of encapsulating an identifier of a next-hop service device (for example, an identifier of a database 1 service device) and sending, to the virtual switching device 2 through the port 8, data in which the identifier is encapsulated.

Because an encapsulation operation for a forwarding path is executed on the access switching device 2, the access switching device 2 learns, according to the reactive flow entry 2' listed in Table 12, that a next-hop switching device of the packet is the virtual switching device 2, and the virtual switching device 2 is a switching device connected to the database service device; path information does not need to be encapsulated.

428-429. The virtual switching device 2 receives the data on which load balancing is performed and the identifier of the database 1 service device. According to the proactive flow entry of the virtual switching device 2 in Table 10, the virtual switching device 2 matches the identifier of the database 1 service device, and then executes actions of removing the identifier of the database 1 service device and sending the data to a port 6. The data arrives at the database 1 through the port 6.

430. The database 1 processes the data, for example, performing querying, deleting, and adding on the data. Because the database 1 is the last-hop service on the entire service chain, the database 1 may also be referred to as a destination service, and a host on which the database 1 locates may also be referred to as a destination service device.

When being returned to the user, the data processed by the database 1 does not need to pass through all the service devices, and may be returned to the user only by using an edge switching device and a backbone switching device, which is similar to the data forwarding method 1.

In this embodiment of the present invention, an SDN control device delivers a part of flow entries according to network topology information, where this part of flow entries may be referred to as proactive flow entries. The proactive flow entries are unrelated to a service, but only related to the network topology information. After being delivered, the proactive flow entries may be reused during packet forwarding. After a packet is received, if no matched flow entry exists, the SDN control device delivers another part of flow entries to some switching devices, where this part of flow entries may be referred to as reactive flow entries. The reactive flow entries are related to the service, but are delivered only to some switching devices. In a case of a service chain, the SDN control device may deliver reactive flow entries only to a switching device connected to a user and a switching device connected to a service device, and does not need to deliver a reactive flow entry to another switching device in a backbone network. The switching device connected to the user and the switching device connected to the service device encapsulate forwarding paths to switching devices connected to next-hop service devices, and a switching device at a backbone layer executes a corresponding operation according to a proactive flow entry. Therefore, flow entries delivered by the SDN control device to a switching device in the backbone network are reduced, so that occupation of resources of the SDN control device and the backbone switching device by flow entries is reduced.

The foregoing description is given by using an example of an SDN system that has seven switching devices and four service devices. This embodiment of the present invention may be applicable to an SDN system that has any quantity of switching devices and any quantity of service devices.

If there is only one service device, the switching device connected to the user encapsulates an identifier of the service device, and other steps are similar to that in the data forwarding method 1. In addition to path information, the identifier of the service device further needs to be transmitted. After receiving the identifier of the service device and data, a switching device connected to the service device deletes the identifier of the service device and sends the data to the service device for processing.

That there are at least two service devices is used as an example for description in the following. An SDN system includes an SDN control device and at least two service devices. The at least two service devices include a first service device and a second service device. The first service device is connected to a first switching device, and the second service device is connected to a second switching device. For a specific data forwarding procedure, refer to FIG. 20A and FIG. 20B.

500. The SDN control device delivers, according to network topology information of the SDN system, a first forwarding rule (for example, a proactive flow entry listed in Table 10) to the first switching device connected to the first service device.

Delivery may also be described as returning, or may be described as sending.

501. The SDN control device delivers, according to the network topology information of the SDN system, a third forwarding rule (for example, a proactive flow entry listed in Table 10) to the second switching device connected to the second service device.

502. If the first switching device is not connected to the second switching device, that is, there is another backbone switching device between the first switching device and the second switching device, according to the network topology information of the SDN system, the SDN control device further delivers a fourth forwarding rule (for example, a proactive flow entry listed in Table 5) to a third switching device, and delivers an i+1$^{th}$ forwarding rule (for example, a proactive flow entry listed in Table 5) to an i$^{th}$ switching device, where i is a natural number greater than or equal to 4.

503. After receiving data sent by a user, if a switching device connected to the user does not find a matched flow entry locally, the switching device connected to the user requests a forwarding rule of the data from the SDN control device. The SDN control device delivers a reactive flow entry (as listed in Table 11) to the switching device connected to the user, and delivers a reactive flow entry (as listed in Table 12) to a switching device connected to a service device. It is assumed that a reactive flow entry delivered to the first switching device is referred to as a second forwarding rule.

601-602. The first switching device receives the data and an identifier of the first service device; and according to the first forwarding rule received from the SDN control device, deletes the identifier of the first service device and sends the data to the first service device for processing.

If the data does not pass through a service device before passing through the first switching device, the data is original data sent by the switching device connected to the user; if the data passes through at least one service device before passing through the first switching device, the data is data processed by a previous-hop service device.

603. Receive the data processed by the first service device.

When the first switching device is connected to the second switching device, step 604a is executed.

When the first switching device is not connected to the second switching device, steps 604b to 608b are executed.

604a. The first switching device sends, according to the second forwarding rule received from the SDN control device, the data processed by the first service device and an identifier of the second service device to the second switching device.

604b. The first switching device sends, to the third switching device according to the second forwarding rule received from the SDN control device, the data processed by the first service device, an identifier of the second service device, and information about a path from the first switching device to the second switching device, where the third switching device is a switching device connected to the first switching device.

Specifically, the information about the path from the first switching device to the second switching device includes signposts of a fourth switching device to the second switching device that are on a forwarding path of the data processed by the first service device, where the fourth switching device is a switching device connected to the third switching device.

The first switching device successively pushes, into a protocol stack, the identifier of the second service device and the signposts of the second switching device to the fourth switching device that are on the forwarding path of the data processed by the first service device, where the identifier of the second service device is shifted to the bottom of the stack, a signpost of the second switching device is shifted into an upper layer of the bottom of the stack, and a signpost of the fourth switching device is shifted to the top of the stack. Encapsulation of the path information by the first switching device is similar to that by the virtual switching device 1 in the data forwarding method 1. For details, refer to the description in the data forwarding method 1, and it is only needed to encapsulate the identifier of the second service device into the bottom of the stack.

605b-606b. The third switching device is configured to: query, according to a signpost of the fourth switching device, a fourth forwarding rule stored in the third switching device; and according to the fourth forwarding rule, determine a port, on the third switching device, of the fourth switching device, and forward the data processed by the first service device to the fourth switching device through the port, on the third switching device, of the fourth switching device.

If the fourth switching device is not the second switching device, the third switching device is further configured to: remove the signpost of the fourth switching device from the information about the path from the first switching device to the second switching device to obtain information about a path from the third switching device to the second switching device, and send, to the fourth switching device, the information about the path from the third switching device to the second switching device, according to the fourth forwarding rule.

The third switching device is configured to identify, according to the signpost of the fourth switching device, that a next-hop switching device of the data is the fourth switching device, where the signpost of the fourth switching device includes at least one of the following: a device identifier of the fourth switching device, an identifier of an egress port, on the third switching device, of the fourth switching device, or an identifier of a link between the fourth switching device and the third switching device.

607b-608b. Similar to actions of the third switching device in FIG. 20A and FIG. 20B and the backbone switching device in the data forwarding method 1, actions of the i$^{th}$ switching device are to delete a signpost of a switching device at an uppermost layer and send, to a next-hop switching device, the data processed by the first service device and path information from which the signpost at the uppermost layer is deleted. The actions are repeatedly executed until the data processed by the first service device is transmitted to the second switching device. For a specific process, details are not described again.

i is a natural number, and i is greater than or equal to 4.

When the second service device is a destination service device, step 610-611 is executed.

When the second service device is not a destination service device, steps 610 to 615 are executed.

610-611. The second switching device deletes the identifier of the second service device and sends the data processed by the first service device to the second service device, according to the third forwarding rule.

612-613. The second switching device receives the data processed by the second service device, and sends the data processed by the second service device and an identifier of a third service device to a next-hop switching device of the second service device according to a fifth forwarding rule (for example, a reactive flow entry in Table 12) received from the SDN control device. The second switching device may further send path information to the next-hop switching device according to the fifth forwarding rule received from the SDN control device.

Figure 20A:
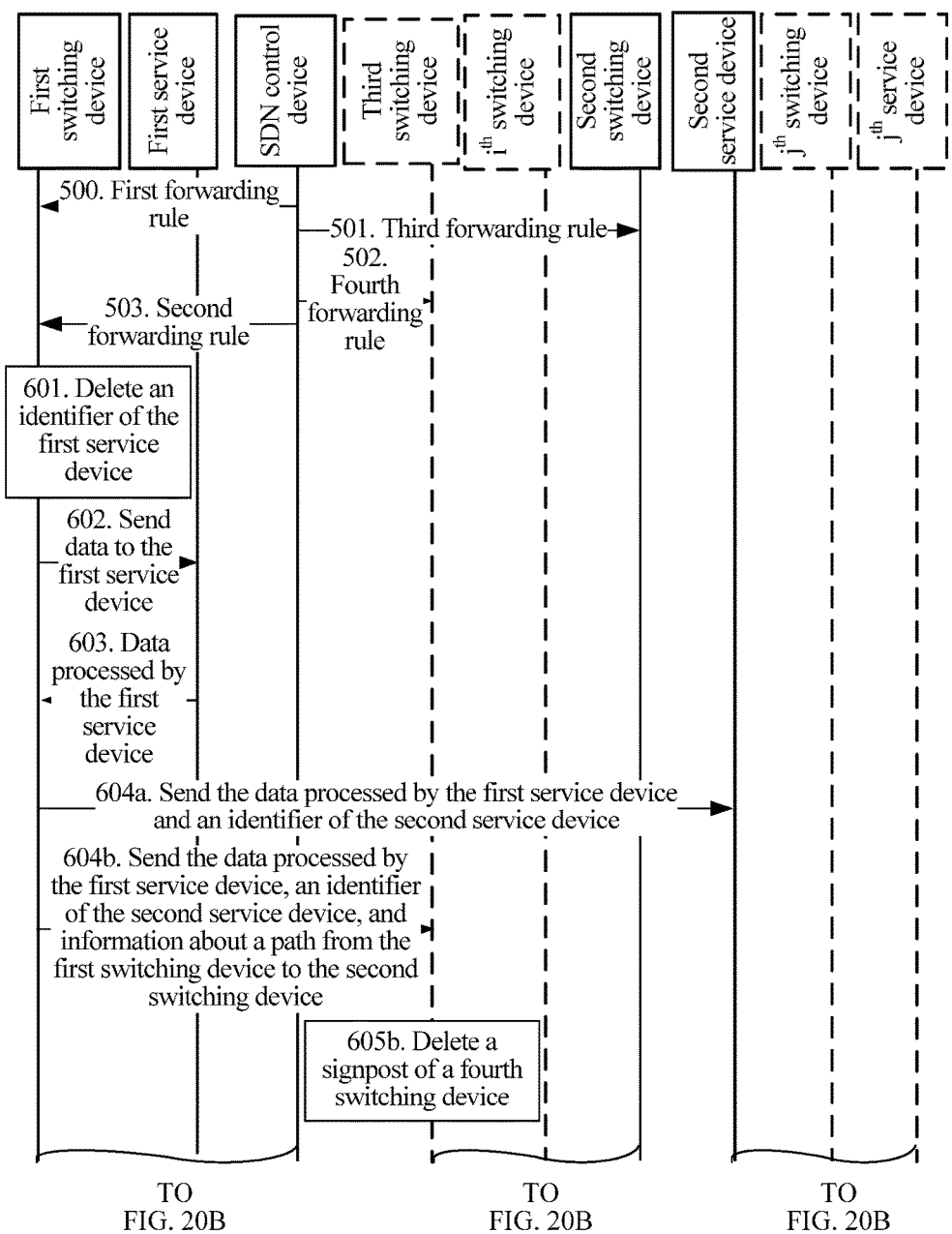
FIG. 20A and FIG. 20B are other schematic flowcharts of data forwarding according to an embodiment of the present invention.

An action of the second switching device is similar to the action of the first switching device in FIG. 20A, and details are not described again.

614-615. It is assumed that there are j service devices, and a $j^{th}$ service device is connected to a $j^{th}$ switching device, where j is a natural number, and j is greater than or equal to 3.

The $j^{th}$ switching device receives the data processed by a previous-hop $(j-1^{th})$ service device and an identifier of the $j^{th}$ service device; and according to an indication of a forwarding rule of the SDN control device, deletes the identifier of the $j^{th}$ service device and sends the data processed by the $j-1^{th}$ service device to the $j^{th}$ service device.

An action of the $j^{th}$ switching device is similar to that of the first switching device. Details are not described again.

Step 614-615 is repeatedly executed according to a network topology status until the data is transmitted to a last-hop service device (that is, a destination service device).

An example of one SDN control device is used for description in the foregoing embodiment. The present invention is also applicable to a cluster that includes multiple SDN control devices.

In a scenario in which a service needs to be implemented, the method provided in this embodiment of the present invention can also achieve an effect of improving a resource utilization rate of a device in SDN. After receiving a first forwarding rule (which may also be referred to as a proactive flow entry), a first switching device does not need to acquire a first forwarding rule each time data is being forwarded. Accordingly, an SDN control device does not need to deliver a first forwarding rule to the first switching device each time the data is being forwarded, that is, the first forwarding rule may be reused during subsequent data forwarding. This reduces a quantity of first forwarding rules delivered by the SDN control device to the first switching device, and accordingly reduces a device resource occupation rate of the SDN control device; and network bandwidth between the SDN control device and the first switching device is also reduced accordingly. In addition, the first switching device does not need to receive a first forwarding rule each time the data is being forwarded, which improves a resource utilization rate of the first switching device.

In addition, when different service devices need to be passed through during data forwarding, data forwarding is implemented according to order of all the service devices on a service chain. During a data forwarding process, if a switching device (for example, the aggregation switching device 1, the core switching device, or the aggregation switching device 2 in FIG. 15) on a forwarding path is not a switching device connected to a service device, the switching device can forward data according to a forwarding rule in the data forwarding method 1, and does not need to acquire a forwarding rule each time data is received, which reduces resource overheads of a control device, and improves a resource utilization rate of a device in SDN when the service is implemented. In addition, order of all the service devices through which the data passed can be properly arranged according to a requirement of a user.

Figure 21:
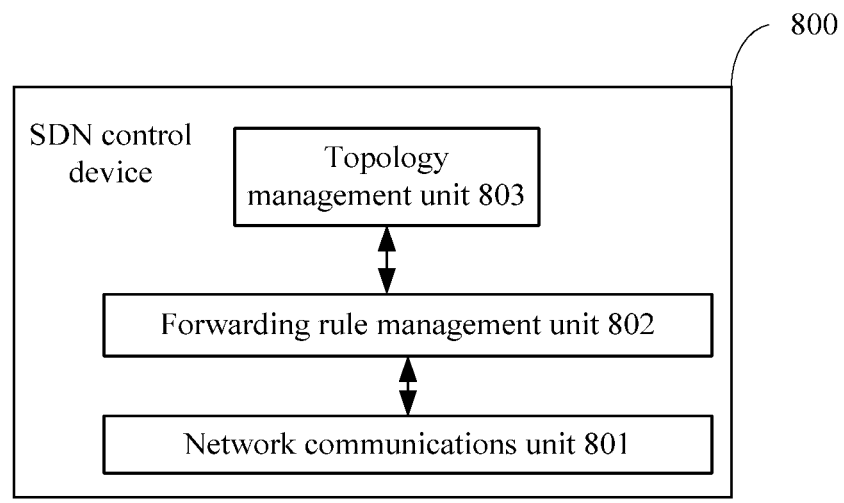
FIG. 21 is a schematic composition diagram of an SDN control device according to an embodiment of the present invention.

Referring to FIG. 21, FIG. 21 is a schematic composition diagram of an SDN control device 800 according to an embodiment of the present invention. The SDN control device 800 is applied to an SDN system. In addition to the SDN control device 800, the SDN system further includes n switching devices, where a first switching device is a switching device connected to a source end of data, an $n^{th}$ switching device is a switching device connected to a destination end of the data, and n≥3. The SDN control device includes a network communications unit 801 and a forwarding rule management unit 802.

The network communications unit 801 is configured to: receive a request for a forwarding rule from the first switching device, where the request carries characteristic information of the data; and send the request to the forwarding rule management unit 802.

The forwarding rule management unit 802 is configured to determine a first forwarding rule and an $n^{th}$ forwarding rule according to the characteristic information of the data, where the first forwarding rule is used to instruct the first switching device to send, to a second switching device connected to the first switching device, the data and information about a path from the first switching device to the $n^{th}$ switching device according to the first forwarding rule, and the $n^{th}$ forwarding rule is used to instruct the $n^{th}$ switching device to forward the data to the destination end.

The network communications unit 801 is further configured to: return the first forwarding rule to the first switching device, and return the $n^{th}$ forwarding rule to the $n^{th}$ switching device.

The SDN control device 800 may further include a topology management unit 803, which is configured to: collect network topology information of the SDN system, and send the network topology information to the forwarding rule management unit 802.

The forwarding rule management unit 802 is further configured to determine a second forwarding rule according to the network topology information, where the second forwarding rule is used to instruct the second switching device to: obtain a port, on the second switching device, of a third switching device by using a signpost of the third switching device in the information about the path from the first switching device to the $n^{th}$ switching device, and forward the data to the third switching device through the port, on the second switching device, of the third switching device, where the third switching device is a switching device connected to the second switching device. A match condition of the second forwarding rule is the signpost of the third switching device. An execution action of the second forwarding rule is to forward the data to the third switching device through the port, on the second switching device, of the third switching device. The port, on the second switching device, of the third switching device is obtained by using the signpost of the third switching device. The network communications unit 801 is further configured to deliver the second forwarding rule to the second switching device.

The forwarding rule management unit 802 is further configured to determine an $i^{th}$ forwarding rule according to the network topology information of the SDN system, where the $i^{th}$ forwarding rule is used to instruct an $i^{th}$ switching device to: obtain a port, on the $i^{th}$ switching device, of an $i+1^{th}$ switching device by using a signpost of the $i+1^{th}$ switching device in information about a path from an $i-1^{th}$ switching device to the $n^{th}$ switching device, and forward the data to the $i+1^{th}$ switching device through the port, on the $i^{th}$ switching device, of the $i+1^{th}$ switching device. The information about the path from the $i-1^{th}$ switching device to the $n^{th}$ switching device includes signposts of the $i+1^{th}$ switching device to the $n^{th}$ switching device that are on a data forwarding path. If the $i+1^{th}$ switching device is not the $n^{th}$ switching device, the $i^{th}$ forwarding rule is further used to instruct the $i^{th}$ switching device to: remove the signpost of the $i+1^{th}$ switching device, and send, to the $i+1^{th}$ switching device, information about a path from the $i^{th}$ switching device to the $n^{th}$ switching device, where the information about the path from the $i^{th}$ switching device to the $n^{th}$ switching device includes signposts of an $i+2^{th}$ switching device to the $n^{th}$ switching device that are on the data forwarding path, the $i+2^{th}$ switching device is a switching device connected to the $i+1^{th}$ switching device, i is an integer greater than or equal to 3, and i is less than n. The network communications unit 801 is further configured to deliver the $i^{th}$ forwarding rule to the $i^{th}$ switching device.

The forwarding rule management unit 802 is specifically configured to select the data forwarding path according to the characteristic information of the data and the network topology information of the SDN system, where the information about the path from the first switching device to the $n^{th}$ switching device includes signposts of the third switching device to the $n^{th}$ switching device that are on the data forwarding path.

The signpost of the third switching device includes at least one of the following: a device identifier of the third switching device, an identifier of the port, on the second switching device, of the third switching device, or an identifier of a link between the third switching device and the second switching device.

For a function of the SDN control device 800, specifically refer to related descriptions of the SDN control device in the data forwarding method 1. Details are not described herein again.

Because a second switching device and an $i^{th}$ switching device (backbone switching devices) receive proactive flow entries, and there is no need to deliver a flow entry to a backbone switching device each time data is being forwarded, that is, the proactive flow entries may be reused during subsequent data forwarding, a quantity of flow entries delivered to the backbone switching device is reduced, a device resource occupation rate of an SDN control device is reduced accordingly, and network bandwidth between the SDN control device and the backbone switching device is also reduced accordingly.

Figure 22:
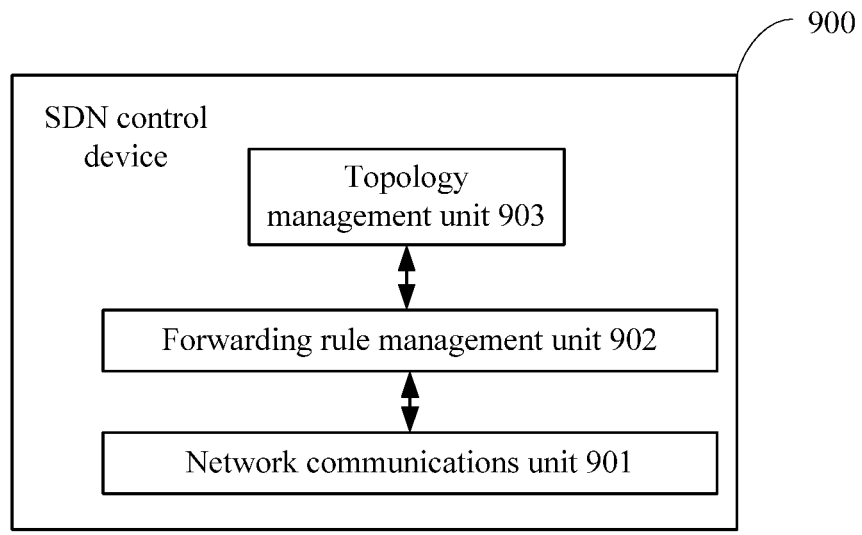
FIG. 22 is a schematic composition diagram of another SDN control device according to an embodiment of the present invention.

Referring to FIG. 22, FIG. 22 is a schematic composition diagram of an SDN control device 900 according to an embodiment of the present invention. The SDN control device 900 is applied to an SDN system. In addition to the SDN control device 900, the SDN system further includes at least two service devices. The at least two service devices include a first service device and a second service device. The first service device is connected to a first switching device, and the second service device is connected to a second switching device. The SDN control device includes a network communications unit 901, a forwarding rule management unit 902, and a topology management unit 903.

The topology management unit 903 is configured to: collect network topology information of the SDN system, and send the network topology information to the forwarding rule management unit 902.

The forwarding rule management unit 902 is configured to determine a first forwarding rule according to the network topology information of the SDN system, where the first forwarding rule is used to instruct the first switching device to delete an identifier of the first service device and send data to the first service device for processing.

The network communications unit 901 is configured to: receive a request for a forwarding rule, where the request carries characteristic information; and send the request to the forwarding rule management unit 902.

The forwarding rule management unit 902 is further configured to determine a second forwarding rule according to the characteristic information carried in the request, where when the first switching device is connected to the second switching device, the second forwarding rule is used to instruct the first switching device to send the data processed by the first service device and an identifier of the second service device to the second switching device; or when the first switching device is not connected to the second switching device, the second forwarding rule is used to instruct the first switching device to send, to a third switching device, the data processed by the first service device, an identifier of the second service device, and information about a path from the first switching device to the second switching device, where the third switching device is a switching device connected to the first switching device.

The network communications unit 901 is further configured to return the first forwarding rule and the second forwarding rule to the first switching device.

The forwarding rule management unit 902 is further configured to determine a third forwarding rule according to the network topology information of the SDN system, where when the second service device is a destination service device, the third forwarding rule is used to instruct the second switching device to: delete the identifier of the second service device and forward the data processed by the first service device to the second service device, according to the third forwarding rule; or when the second service device is not a destination service device, the third forwarding rule is used to instruct the second switching device to: delete the identifier of the second service device and forward the data processed by the first service device to the second service device, according to the third forwarding rule; and receive the data processed by the second service device. The network communications unit 901 is further configured to return the third forwarding rule to the second switching device.

The forwarding rule management unit 902 is further configured to determine a fourth forwarding rule according to the network topology information of the SDN system, where the fourth forwarding rule is used to instruct the third switching device to: determine a port, on the third switching device, of a fourth switching device according to a signpost of the fourth switching device, and forward the data processed by the first service device to the fourth switching device through the port, on the third switching device, of the fourth switching device.

If the fourth switching device is not the second switching device, the fourth forwarding rule is further used to instruct the third switching device to send, to the fourth switching device, information about a path from the third switching device to the second switching device. The fourth forwarding rule specifically instructs the third switching device to: remove the signpost of the fourth switching device from the information about the path from the first switching device to the second switching device to obtain the information about the path from the third switching device to the second switching device, and send, to the fourth switching device, the information about the path from the third switching device to the second switching device.

The network communications unit 901 is further configured to return the fourth forwarding rule to the third switching device.

For a function of the SDN control device 900, specifically refer to related descriptions of the SDN control device in the data forwarding method 2. Details are not described herein again.

After receiving a first forwarding rule (which may also be referred to as a proactive flow entry), a first switching device does not need to acquire a first forwarding rule each time data is being forwarded. Accordingly, an SDN control device does not need to deliver a first forwarding rule to the first switching device each time the data is being forwarded, that is, the first forwarding rule may be reused during subsequent data forwarding. This reduces a quantity of first forwarding rules delivered by the SDN control device to the first switching device, and accordingly reduces a device resource occupation rate of the SDN control device; and network bandwidth between the SDN control device and the first switching device is also reduced accordingly. In addition, the first switching device does not need to receive a first forwarding rule each time the data is being forwarded, which improves a resource utilization rate of the first switching device.

In addition, when different service devices need to be passed through during data forwarding, data forwarding is implemented according to order of all the service devices on a service chain. During a data forwarding process, the SDN control device delivers a proactive flow entry to a switching device (for example, the aggregation switching device 1, the core switching device, or the aggregation switching device 2 in FIG. 15) on a forwarding path according to network topology information, and does not need to deliver a forwarding rule each time data is received, which reduces resource overheads of the SDN control device, and improves a resource utilization rate of a device in SDN when a service is implemented. In addition, order of all the service devices through which the data passed can be properly arranged according to a requirement of a user.

SDN System 3

In the foregoing data forwarding method 1, there is one source end and one destination end, and the method may be referred to as a unicast solution. A data forwarding method in which one source end and multiple destination end exist may be referred to as a multicast or broadcast solution. Multicast is used as an example for detailed description in the following.

Multiple members may form a multicast group. Data (or a service packet) sent by a member in a multicast group can be received only by a member in the multicast group. A member in a multicast group may be a device such as a mobile terminal (which includes but is not limited to a laptop, a mobile phone, a tablet, a palmtop computer, a POS, an MP3, and a navigator), a fixed terminal (which includes but is not limited to a desktop computer, a printer, a fax machine, a digital projector, and a digital television), or a wireless access terminal.

Figure 23:
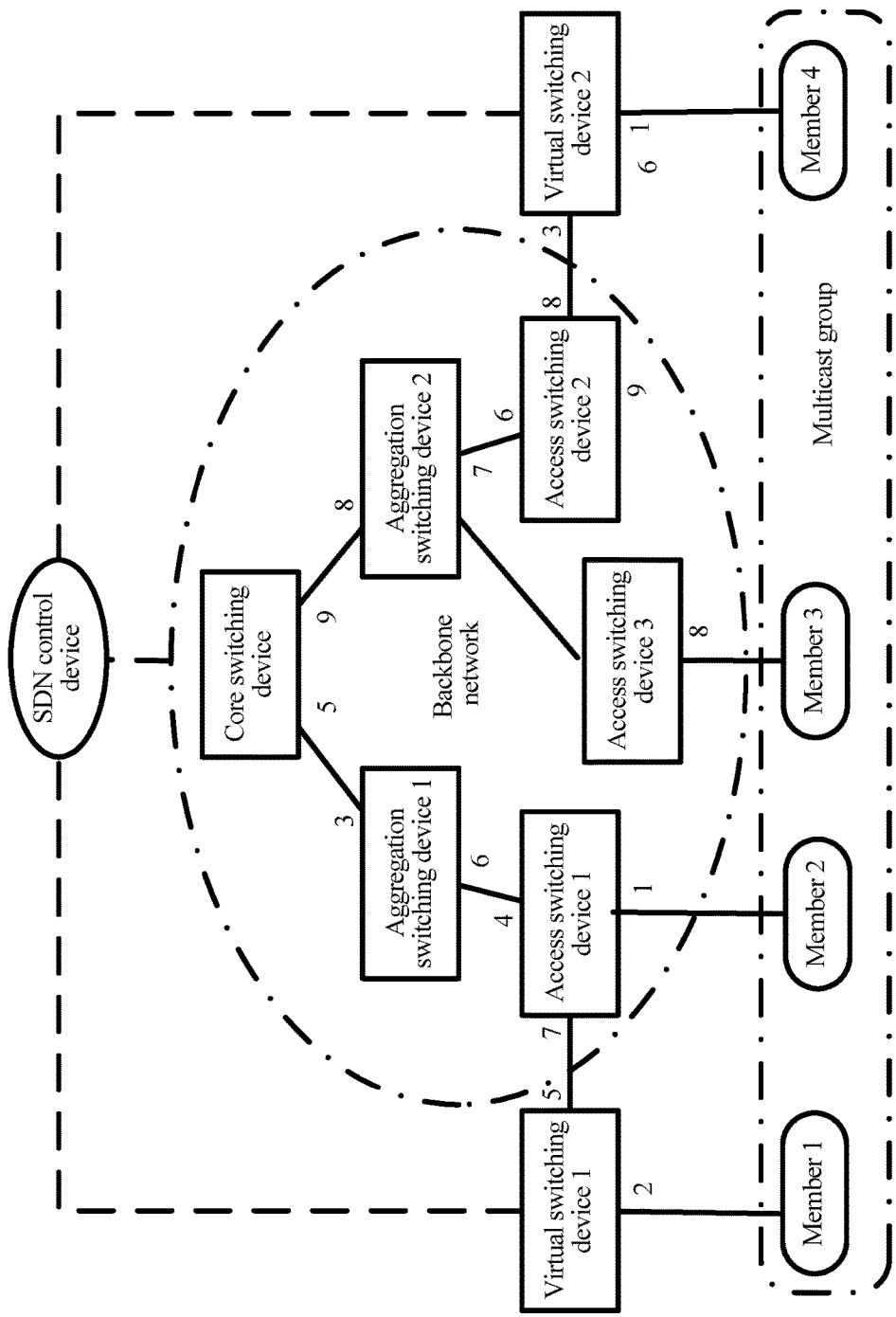
FIG. 23 is a schematic diagram of another SDN system for implementing data forwarding according to an embodiment of the present invention.

A manner of implementing the data forwarding method in a multicast group according to this embodiment of the present invention is described by using an example in which the multicast group has four members, where the four members are connected to different switching devices and implement data forwarding by using a backbone switching device in a DC network. As shown in FIG. 23, FIG. 23 is a network architecture diagram of a manner of implementing data or service packet forwarding in a multicast group according to an embodiment of the present invention.

In FIG. 23, the multicast group has four members: members 1, 2, 3, and 4, which respectively access the DC network by using a virtual switching device 1, an access switching device 1, an access switching device 3, and a virtual switching device 2. A multicast group member receives and sends a multicast packet across a DC backbone network.

The multicast group member 1 sends multicast packets to other members, where: a multicast packet sent to the member 2 passes through the virtual switching device 1 from a port 2, goes out from a port 5, passes through the access switching device 1 from a port 7, and goes out from a port 1; a multicast packet sent to the member 3 passes through the virtual switching device 1 from the port 2, goes out from the port 5, passes through the access switching device 1 from the port 7, goes out from a port 4, passes through an aggregation switching device 1 from a port 6, goes out from a port 3, passes through a core switching device from a port 5, goes out from a port 9, passes through an aggregation switching device 2 from a port 8, goes out from a port 4, passes through the access switching device 3 from a port 5, and goes out from a port 8; a multicast packet sent to the member 4 passes through the virtual switching device 1 from the port 2, goes out from the port 5, passes through the access switching device 1 from the port 7, goes out from the port 4, passes through the aggregation switching device 1 from the port 6, goes out from the port 3, passes through the core switching device from the port 5, goes out from the port 9, passes through the aggregation switching device 2 from the port 8, goes out from a port 7, passes through an access switching device 2 from a port 6, goes out from a port 8, passes through the virtual switching device 2 from a port 3, and goes out from a port 1.

The multicast group member 2 sends multicast packets to other members, where: a multicast packet sent to the member 1 passes through the access switching device 1 from the port 1, goes out from the port 7, passes through the virtual switching device 1 from the port 5, and goes out from the port 2; a multicast packet sent to the member 3 passes through the access switching device 1 from the port 1, goes out from the port 4, passes through the aggregation switching device 1 from the port 6, goes out from the port 3, passes through the core switching device from the port 5, goes out from the port 9, passes through the aggregation switching device 2 from the port 8, goes out from the port 4, passes through the access switching device 3 from the port 5, and goes out from the port 8; a multicast packet sent to the member 4 passes through the access switching device 1 from the port 1, goes out from the port 4, passes through the aggregation switching device 1 from the port 6, goes out from the port 3, passes through the core switching device from the port 5, goes out from the port 9, passes through the aggregation switching device 2 from the port 8, goes out from the port 7, passes through the access switching device 2 from the port 6, goes out from the port 8, passes through the virtual switching device 2 from the port 3, and goes out from the port 1.

The multicast group member 3 sends multicast packets to other members, where: a multicast packet sent to the member 1 passes through the access switching device 3 from the port 8, goes out from the port 5, passes through the aggregation switching device 2 from the port 4, goes out from the port 8, passes through the core switching device from the port 9, goes out from the port 5, passes through the aggregation switching device 1 from the port 3, goes out from the port 6, passes through the access switching device 1 from the port 4, goes out from the port 7, passes through the virtual switching device 1 from the port 5, and goes out from the port 2; a multicast packet sent to the member 2 passes through the access switching device 3 from the port 8, goes out from the port 5, passes through the aggregation switching device 2 from the port 4, goes out from the port 8, passes through the core switching device from the port 9, goes out from the port 5, passes through the aggregation switching device 1 from the port 3, goes out from the port 6, passes through the access switching device 1 from the port 4, and goes out from the port 1; a multicast packet sent to the member 4 passes through the access switching device 3 from the port 8, goes out from the port 5, passes through the aggregation switching device 2 from the port 4, goes out from the port 7, passes through the access switching device 2 from the port 6, goes out from the port 8, passes through the virtual switching device 2 from the port 3, and goes out from the port 1.

The multicast group member 4 sends multicast packets to other members, where: a multicast packet sent to the member 1 passes through the virtual switching device 2 from the port 1, goes out from the port 3, passes through the access switching device 2 from the port 8, goes out from the port 6, passes through the aggregation switching device 2 from the port 7, goes out from the port 8, passes through the core switching device from the port 9, goes out from the port 5, passes through the aggregation switching device 1 from the port 3, goes out from the port 6, passes through the access switching device 1 from the port 4, goes out from the port 7, passes through the virtual switching device 1 from the port 5, and goes out from the port 2; a multicast packet sent to the member 2 passes through the virtual switching device 2 from the port 1, goes out from the port 3, passes through the access switching device 2 from the port 8, goes out from the port 6, passes through the aggregation switching device 2 from the port 7, goes out from the port 8, passes through the core switching device from the port 9, goes out from the port 5, passes through the aggregation switching device 1 from the port 3, goes out from the port 6, passes through the access switching device 1 from the port 4, and goes out from the port 1; a multicast packet sent to the member 3 passes through the virtual switching device 2 from the port 1, goes out from the port 3, passes through the access switching device 2 from the port 8, goes out from the port 6, passes through the aggregation switching device 2 from the port 7, goes out from the port 4, passes through the access switching device 3 from the port 5, and goes out from the port 8.

Data Forwarding Method 3

1. Proactive Flow Entry

To implement data forwarding in a multicast manner, an SDN control device needs to collect or update multicast group information, which is similar to collecting or updating network topology information. The following describes three cases:

When a new member is to join a multicast group, a process of triggering updating of the multicast group information is as follows: The new multicast group member sends, to a multicast router, a request for joining the multicast group; because a switching device that receives the request for joining the multicast group has no flow entry delivered by the SDN control device, the switching device reports a PacketIn packet to the SDN control device; the SDN control device simulates the multicast router, analyzes the request for joining the multicast group from the multicast group member, and then updates the multicast group information; the SDN control device sends, to the switching device, a response to the joining of the multicast group; and the switching device that reports the PacketIn packet sends, to the member that is to join the multicast group, the response to the joining of the multicast group.

When a multicast group member is to exit from a multicast group, a process of triggering updating of the multicast group information is as follows: The member that needs to exit from the multicast group sends, to a multicast router, a request for exiting from the multicast group; because a switching device that receives the request for exiting from the multicast group has no matched flow entry, the switching device reports a PacketIn packet to the SDN control device; the SDN control device simulates the multicast router, analyzes the request, from the multicast group member, for exiting from the multicast group, and then updates the multicast group information; the SDN control device sends, to the switching device, a response to the exiting from the multicast group; and the switching device that reports the PacketIn packet sends, to the member that is to exit from the multicast group, the response to the exiting from the multicast group.

When the SDN control device queries a multicast group, a process of triggering updating of the multicast group information is as follows: The SDN control device periodically sends a PacketOut multicast group query request to a switching device connected to a multicast group member; the switching device sends the multicast group query request to a port on which the multicast group member is located; the multicast group member returns a response to multicast group query; because the switching device has no matched flow entry, the switching device reports a PacketIn packet to the SDN control device; and the SDN control device analyzes a multicast group query result, and updates the multicast group information.

After learning the multicast group information, the SDN control device needs to create a multicast group identifier. The multicast group identifier in this embodiment of the present invention is unique, and is used to distinguish from another multicast group in a DC network or another type of object that can have a device identifier; the multicast group identifier may be independent, or may be combined with another device identifier, and determines a packet forwarding path. For example, in this embodiment of the present invention, the multicast group identifier created by the SDN control device for the multicast group is 4.

Similar to the proactive flow entries in the data forwarding method 1, the SDN control device needs to deliver proactive flow entries to all backbone switching devices according to network topology information. For details, refer to the description in the data forwarding method 1, and details are not described again.

As shown in FIG. 23, in the SDN system to which the multicast group is added, in addition to delivering the proactive flow entries in the data forwarding method 1 to all the backbone switching devices, the SDN control device further needs to deliver other proactive flow entries to a switching device on which a rendezvous point is located and a switching device connected to a destination end (which is also referred to as a member). Details are described in the following. It should be noted that, a concept of a rendezvous point is derived from design of a shared tree in a multicast forwarding tree, where a router is used as a root of a routing tree, and the router is a rendezvous point (Rendezvous Point, RP). Forwarding paths from a multicast source to other members in the multicast group have an intersection, and an intersecting point at which any two paths intersect is a rendezvous point. That is, a switching device on which a rendezvous point in the multicast group is located is a switching device that forwards data to members in the multicast group by using more than two paths, and is a point that is close to a receive end and that copies and forwards a multicast packet. For a switching device on which a rendezvous point in the multicast group is located, forwarding paths from a multicast group member to other multicast group members have intersections, and an intersecting point that is closest to the multicast group member is the rendezvous point in the multicast group. In the SDN system shown in FIG. 23, the switching device on which the rendezvous point is located is, for example, the access switching device 1 and the aggregation switching device 2. The switching device on which the rendezvous point is located performs data copying and forwarding, which can further reduce DC network bandwidth. The switching device on which the rendezvous point in the multicast group is located varies with a multicast group member.

When a multicast group member changes, updating of the switching device on which the rendezvous point is located is triggered, for example, adding or deleting information about the switching device on which the rendezvous point in the multicast group is located. The SDN control device updates information about the rendezvous point in the multicast group. The information about the rendezvous point in the multicast group includes multicast group members, and corresponding multicast packet ingress ports and egress ports. The multicast packet is sent from the multicast source to the switching device on which the rendezvous point in the multicast group is located, where a receive port, on the switching device on which the rendezvous point in the multicast group is located, of the multicast packet is an ingress port. The multicast packet is sent from the switching device on which the rendezvous point in the multicast group is located to a multicast receiver, where a transmit port, on the switching device on which the rendezvous point in the multicast group is located, of the multicast packet is an egress port.

After acquiring the switching device on which the rendezvous point is located, the SDN control device generates information about the rendezvous point in the multicast group. FIG. 23 is used as an example, and information about switching devices on which rendezvous points are located is listed in Table 13:

TABLE 13

| Switching devices on which rendezvous points are located | Multicast group members | Egress ports | Ingress ports |
| --- | --- | --- | --- |
| Access switching device 1 | Member 1 | 7 | 4 |
| | Member 2 | 1 | 4 |
| | Members 3 and 4 | 4 | 1, 7 |

TABLE 13-continued

| Switching devices on which rendezvous points are located | Multicast group members | Egress ports | Ingress ports |
| --- | --- | --- | --- |
| Aggregation switching device 2 | Member 3 | 4 | 8 |
| | Member 4 | 7 | 8 |
| | Members 1 and 2 | 8 | 4, 7 |

In Table 13, the access switching device 1 disposes the egress port 7 and the ingress port 4 for the member 1, disposes the egress port 1 and the ingress port 4 for the member 2, and disposes the egress port 4 and the ingress ports 1 and 7 for the members 3 and 4. The aggregation switching device 2 disposes the egress port 4 and the ingress port 8 for the member 3, disposes the egress port 7 and the ingress port 8 for the member 4, and disposes the egress port 8 and the ingress ports 4 and 7 for the members 1 and 2.

For the switching device on which the rendezvous point is located, a proactive flow entry delivered by the SDN control device needs to meet the following characteristics:

a match condition: an ingress port of the rendezvous point in the multicast group and a multicast group identifier; and execution actions:

sending a multicast packet to a receiver: copying the multicast packet, removing the multicast group identifier from the copied multicast packet, and sending an original multicast packet to an egress port of the receiver; and sending the multicast packet to a next rendezvous point in the multicast group: copying the multicast packet, encapsulating a forwarding path to the next rendezvous point in the multicast group for the copied multicast packet, and sending the encapsulated multicast packet to a next-hop egress port.

For example, proactive flow entries delivered to the switching devices on which the rendezvous points are located in FIG. 23 are listed in Table 14:

TABLE 14

| Switching devices | Proactive flow entries |
| --- | --- |
| Access switching device 1 | Match condition: port 4 and multicast group identifier<br>Copy the multicast packet and separately execute actions:<br>(1). removing the multicast group identifier and sending an original multicast packet to the port 1;<br>(2) sending an original multicast packet to the port 7<br>Match condition: port 7 and multicast group identifier<br>Copy the multicast packet and separately execute actions:<br>(1). removing the multicast group identifier and sending an original multicast packet to the port 1;<br>(2). encapsulating a forwarding path to the aggregation switching device 2 and sending, to the port 4, the multicast packet in which the forwarding path is encapsulated |
| Aggregation switching device 2 | Match condition: port 4 and multicast group identifier<br>Copy the multicast packet and separately execute actions:<br>(1). encapsulating a forwarding path to the virtual switching device 2 and sending, to the port 7, the multicast packet in which the forwarding path is encapsulated;<br>(2). encapsulating a forwarding path to the access switching device 1 and sending, to the port 8, the multicast packet in which the forwarding path is encapsulated<br>Match condition: port 7 and multicast group identifier<br>Copy the multicast packet and separately execute actions:<br>(1) sending an original multicast packet to the port 4;<br>(2). encapsulating a forwarding path to the access switching device 1 and sending, to the port 8, the multicast packet in which the forwarding path is encapsulated |

TABLE 14-continued

| Switching devices | Proactive flow entries |
|---|---|
| | Match condition: port 8 and multicast group identifier<br>Copy the multicast packet and separately execute actions:<br>(1) sending an original multicast packet to the port 4;<br>(2). encapsulating a forwarding path to the virtual switching device 2 and sending, to the port 7, the multicast packet in which the forwarding path is encapsulated |

In Table 14, the SDN control device copies and forwards multicast packets received by the access switching device 1 from different ports. Multicast packets sent by the members 3 and 4 are received on the port 4, where: a multicast packet that goes to the member 1 is sent to the port 7; and for a multicast packet that goes to the member 2, an outer signpost is removed, and the multicast packet from which the signpost is removed is sent to the port 1. Multicast packets sent by the member 1 are received on the port 7, where: for a multicast packet that goes to the member 2, an outer signpost is removed, and the multicast packet from which the signpost is removed is sent to the port 1; and for multicast packets that go to the members 3 and 4, the forwarding path to a switching device (the aggregation switching device 2) on which a rendezvous point is located is encapsulated, and the multicast packets in which the forwarding path is encapsulated are sent to the port 4. The SDN control device copies and forwards multicast packets received by the aggregation switching device 2 from different ports. Multicast packets sent by the member 3 are received on the port 4, where: for a multicast packet that goes to the member 4, the forwarding path to the virtual switching device 2 is encapsulated, and the multicast packet in which the forwarding path is encapsulated is sent to the port 7; and for multicast packets that go to the members 1 and 2, the forwarding path to the access switching device 1 is encapsulated, and the multicast packets in which the forwarding path is encapsulated are sent to the port 8. Multicast packets sent by the member 4 are received on the port 7, where: a multicast packet that goes to the member 3 is sent to the port 4; and for multicast packets that go to the members 1 and 2, the forwarding path to the access switching device 1 on which the rendezvous point in the multicast group is located is encapsulated, and the multicast packets in which the forwarding path is encapsulated are sent to the port 8. Multicast packets sent by the members 1 and 2 are received on the port 8, where: a multicast packet that goes to the member 3 is sent to the port 4; and for a multicast packet that goes to the member 4, the forwarding path to the virtual switching device 2 is encapsulated, and the multicast packet in which the forwarding path is encapsulated is sent to the port 7.

Another proactive flow entry delivered by the SDN control device to the switching device connected to the multicast destination end (which is also referred to as a receiver) needs to meet the following characteristics:

a match condition: a multicast packet port and a multicast group identifier; and an execution action: removing the multicast group identifier from a multicast packet and sending an original multicast packet to the destination end.

For example, flow entries delivered to switching devices connected to multicast destination ends (which are also referred to as receivers) in FIG. 23 are listed in Table 15.

TABLE 15

| Devices devices | Proactive flow entries |
|---|---|
| Virtual switching device 1 | Match condition: port 5 and multicast group identifier<br>Execution action: removing the multicast group identifier and sending an original multicast packet to the port 2 |
| Access switching device 3 | Match condition: port 5 and multicast group identifier<br>Execution action: removing the multicast group identifier and sending an original multicast packet to the port 8 |
| Virtual switching device 2 | Match condition: port 3 and multicast group identifier<br>Execution action: removing the multicast group identifier and sending an original multicast packet to the port 1 |

In Table 15, for a multicast packet sent to the member 1, the SDN control device delivers a proactive flow entry to the virtual switching device 1 to match the multicast packet port 5 and the multicast group 1 identifier, remove the multicast group 1 identifier from the multicast packet, and send the original multicast packet to the port 2. For a multicast packet sent to the member 3, the SDN control device delivers a proactive flow entry to the access switching device 3 to match the multicast packet port 5 and the multicast group 1 identifier, remove the multicast group 1 identifier from the multicast packet, and send the original multicast packet to the port 8. For a multicast packet sent to the member 4, the SDN control device customizes a proactive flow entry for the virtual switching device 2 to match the multicast packet port 3 and the multicast group 1 identifier, remove the multicast group 1 identifier, and send the original multicast packet to the port 1.

Figure 24:
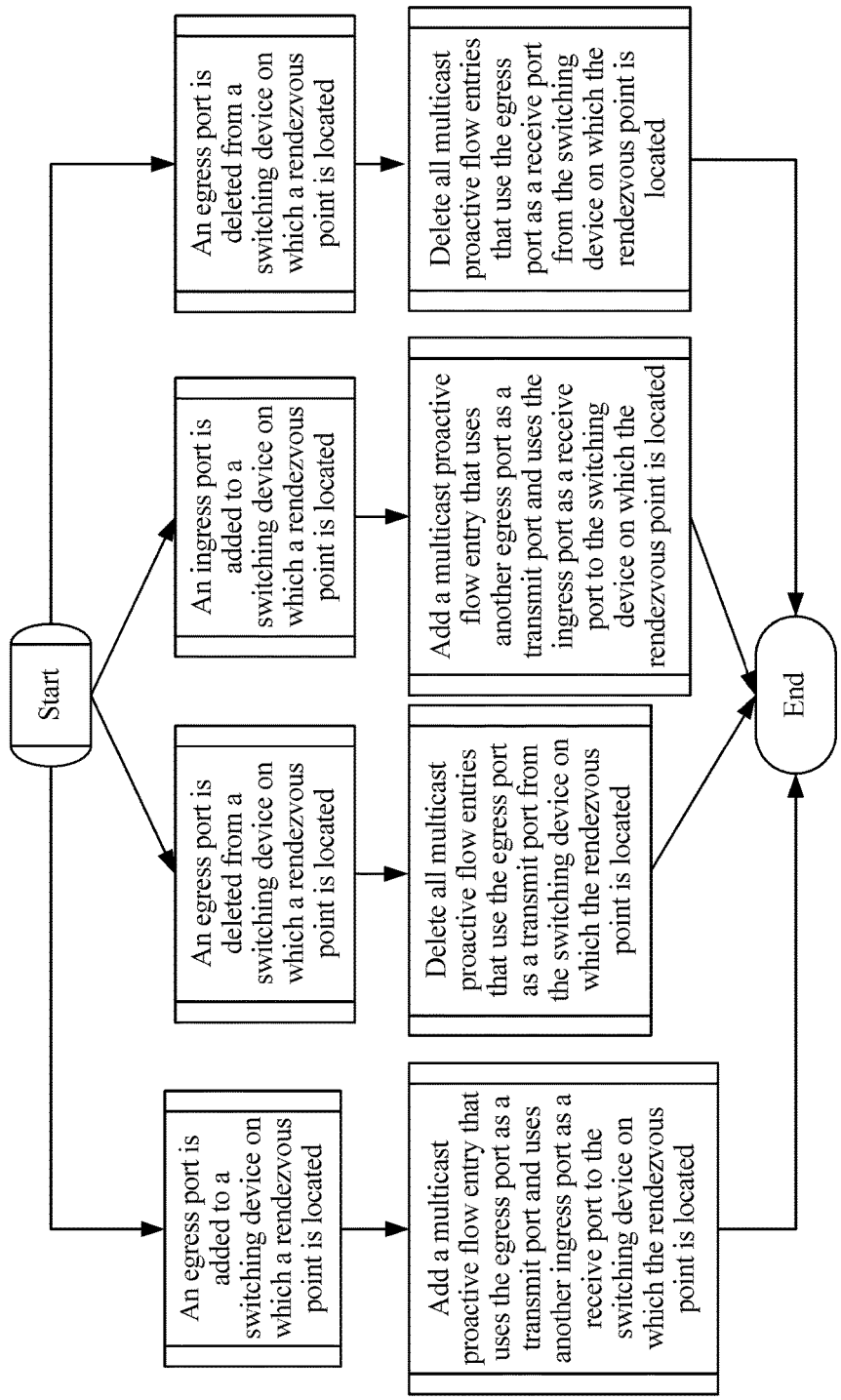
FIG. 24 is another schematic flowchart of updating a proactive flow entry by an SDN control device according to an embodiment of the present invention.

Similar to implementation of the data forwarding method 1, when a port status of a switching device changes, the SDN control device updates the multicast group information. As shown in FIG. 24:

When an egress port is added to the switching device on which the rendezvous point is located, a multicast proactive flow entry that uses the egress port as a transmit port and uses another ingress port as a receive port is added to the switching device on which the rendezvous point is located.

When an egress port is deleted from the switching device on which the rendezvous point is located, all multicast proactive flow entries that use the egress port as a transmit port are deleted from the switching device on which the rendezvous point is located.

When an ingress port is added to the switching device on which the rendezvous point is located, a multicast proactive flow entry that uses another egress port as a transmit port and uses the ingress port as a receive port is added to the switching device on which the rendezvous point is located.

When an egress port is deleted from the switching device on which the rendezvous point is located, all multicast proactive flow entries that use the egress port as a receive port are deleted from the switching device on which the rendezvous point is located.

2. Reactive Flow Entry

When sending data or a service packet to another member in a multicast group, a member in the multicast group sends a multicast packet to a switching device connected to the member. Because the connected switching device has no matched flow entry, the switching device reports a PacketIn packet to the SDN control device. The SDN control device analyzes a characteristic of the multicast packet, and selects a proper forwarding path according to current network topology information and multicast group information. A reactive flow entry meets the following characteristics:

a match condition: a port and a packet characteristic; and an execution action: successively encapsulating, for a multicast packet, a multicast group identifier and a forwarding path to a switching device on which a next rendezvous point in the multicast group is located, and sending the encapsulated multicast packet to a next-hop egress port.

For example, in the network architecture diagram shown in FIG. 23, reactive flow entries delivered by the SDN control device are listed in Table 16:

TABLE 16

| Switching devices | Reactive flow entries |
| --- | --- |
| Virtual switching device 1 | Match condition: port 2 and multicast packet characteristic Execution action: encapsulating the multicast group identifier and sending the encapsulated multicast packet to the port 5 |
| Access switching device 1 | Match condition: port 1 and multicast packet characteristic Encapsulate the multicast group identifier, copy the multicast packet, and separately execute actions: (1). encapsulating a forwarding path to the aggregation switching device 2 and sending the encapsulated multicast packet to the port 4; (2) sending the encapsulated multicast packet to the port 7 |
| Access switching device 3 | Match condition: port 8 and multicast packet characteristic Execution action: encapsulating the multicast group identifier and sending the encapsulated multicast packet to the port 5 |
| Virtual switching device 2 | Match condition: port 1 and multicast packet characteristic Execution action: encapsulating the multicast group identifier and a forwarding path to the aggregation switching device 2, and sending the encapsulated multicast packet to the port 3 |

In Table 16, for a multicast packet sent by the member 1, the reactive flow entry instructs the virtual switching device 1 to match the packet port 2 and the packet characteristic, encapsulate the multicast group 1 identifier into the original multicast packet, and send the encapsulated multicast packet to the port 5. For a multicast packet sent by the member 2 to the member 1, the reactive flow entry instructs the access switching device 1 to match the packet port 1 and the packet characteristic, encapsulate the multicast group 1 identifier into the original multicast packet, and send the encapsulated multicast packet to the port 7. For multicast packets sent by the member 2 to the members 3 and 4, the reactive flow entry instructs the access switching device 1 to match the packet port 1 and the packet characteristic, successively encapsulate the multicast group 1 identifier and the forwarding path to the aggregation switching device 2 into the original multicast packet, and send the encapsulated multicast packet to the port 4. For a multicast packet sent by the member 3, the reactive flow entry instructs the access switching device 3 to match the packet port 8 and the packet characteristic, encapsulate the multicast group 1 identifier into the original multicast packet, and send the encapsulated multicast packet to the port 5. For a multicast packet sent by the member 4, the reactive flow entry instructs the virtual switching device 2 to match the packet port 1 and the packet characteristic, successively encapsulate the multicast group 1 identifier and the forwarding path to the aggregation switching device 2 into the original multicast packet, and send the encapsulated multicast packet to the port 3. In actual implementation, it is possible that there is only one member used as a source end to send a packet; therefore, only one reactive flow entry in the foregoing Table 16 is used.

3. Data Forwarding

That the switching device on which the rendezvous point in the multicast group is located is represented as a first switching device (the access switching device 1 or the aggregation switching device 2 in FIG. 23) is used as an example for description. A source end of the data and multiple destination ends of the data form a multicast group. From the source end to a destination end, the data passes through the first switching device.

The first switching device is configured to receive the data and a multicast group identifier.

The first switching device is configured to execute one of the following actions according to a forwarding rule (for example, a proactive flow entry in Table 14) received from the SDN control device in the SDN system:

when the first switching device is connected to the destination end, the first switching device is configured to: delete the multicast group identifier, and forward the data to the destination end;

when the first switching device is connected to a second switching device, the first switching device is configured to forward the data and the multicast group identifier to the second switching device, where the second switching device is a switching device connected to the destination end or a switching device on which another rendezvous point in the multicast group is located; or when the first switching device is not connected to the destination end or a second switching device, the first switching device is configured to send, to a third switching device, the data, the multicast group identifier, and information about a path from the first switching device to the second switching device, where the second switching device is a switching device connected to the destination end or a switching device on which another rendezvous point in the multicast group is located, and the third switching device is a switching device connected to the first switching device.

The information about the path from the first switching device to the second switching device includes signposts of a fourth switching device to the second switching device that are on the data forwarding path, where the fourth switching device is a switching device, on the data forwarding path, connected to the third switching device.

The first switching device is configured to successively push the multicast group identifier and the signposts of the second switching device to the fourth switching device that are on the data forwarding path into a protocol stack, where the multicast group identifier is shifted into the bottom of the stack, a signpost of the second switching device is shifted into an upper layer of the bottom of the stack, and a signpost of the fourth switching device is shifted into the top of the stack, so that the protocol stack carries the path information and the multicast group identifier. Encapsulation of the multicast group identifier is similar to that of an identifier of a service device, and details are not described again.

The third switching device is configured to identify, according to the signpost of the fourth switching device, that a next-hop switching device of the data is the fourth switching device, where the signpost of the fourth switching device includes at least one of the following: a device identifier of the fourth switching device, an identifier of an egress port, on the third switching device, of the fourth switching device, or an identifier of a link between the fourth switching device and the third switching device.

The first switching device is further configured to copy the data according to the forwarding rule, where when the first switching device is neither connected to the another destination end nor a fifth switching device, the first switching device sends, to a sixth switching device, the data, the multicast group identifier, and information about a path from the first switching device to the fifth switching device, where the sixth switching device is connected to the first switching device, and the fifth switching device is a switching device connected to the another destination end or a switching device on which another rendezvous point is located.

Figure 20B:
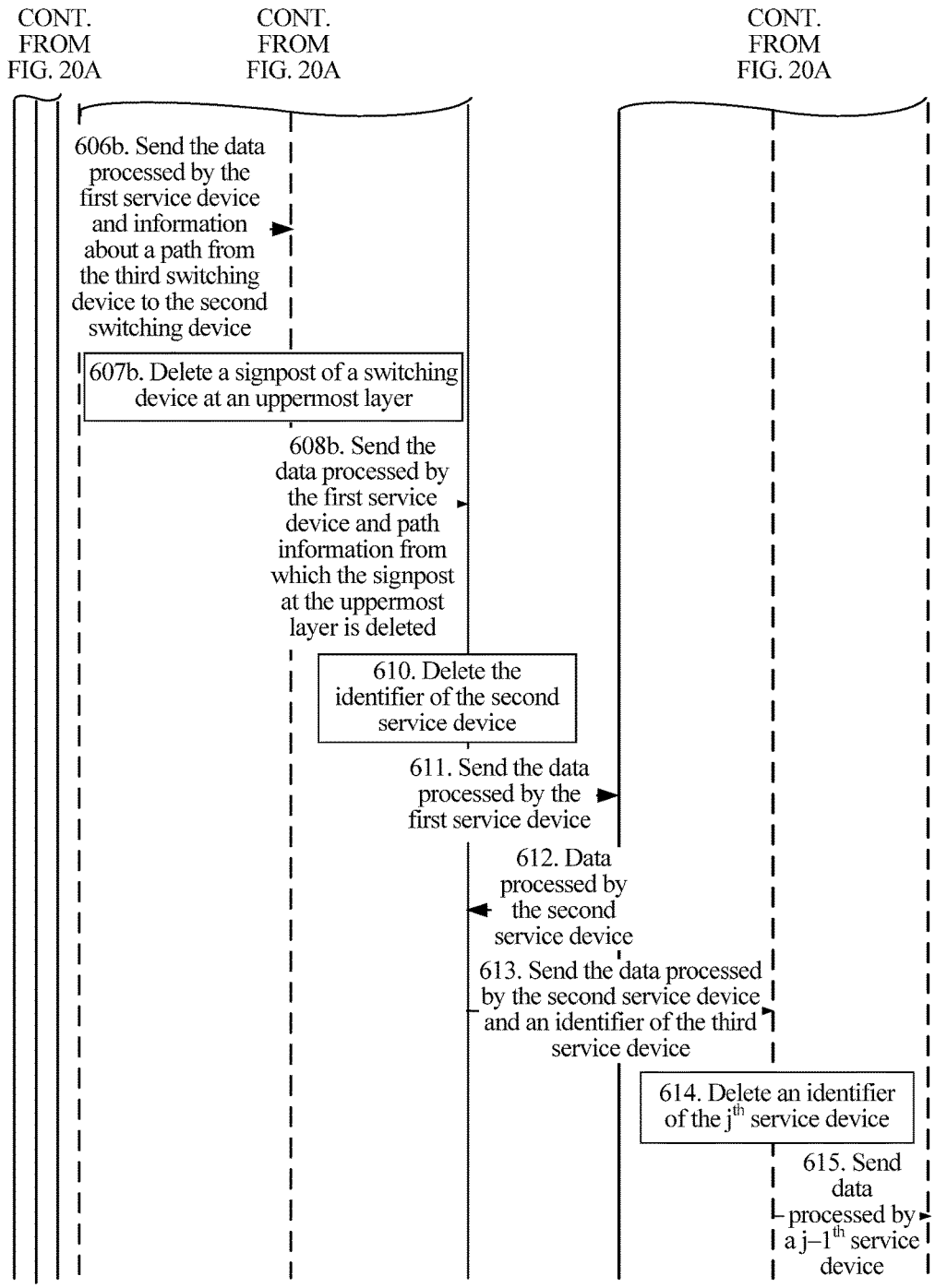

In addition, it should be noted that, similar to actions of the third switching device in FIG. 20A and FIG. 20B and the backbone switching device in the data forwarding method 1, actions of another backbone switching device, except the switching device on which the rendezvous point is located, on the data forwarding path are to delete a signpost of a switching device at an uppermost layer and send, to a next-hop switching device, path information from which the signpost at the uppermost layer is deleted. The actions are repeatedly executed until the data is transmitted to a switching device on which the destination end is located or a switching device on which another rendezvous point is located. For a specific process, details are not described again.

A multicast or broadcast solution is similar to the data forwarding method 2. Because the data can arrive at multiple destination ends, when delivering a forwarding path, the SDN control device cannot deliver forwarding paths to all the destination ends at a time, but needs to divide a path into multiple segments according to a switching device on which each rendezvous point is located. A start of each segment is a switching device on which the source end is located or a switching device on which a rendezvous point is located, an end is a switching device on which the destination end is located or a switching device on which another rendezvous point is located, and a path delivery manner of each segment is similar to an implementation manner shown in the data forwarding method 1. Therefore, for a specific data forwarding procedure, refer to the descriptions in the data forwarding method 1 and the data forwarding method 2, and details are not described again.

In a scenario in which multicast needs to be implemented, the method provided in this embodiment of the present invention can also reach an effect of improving a resource utilization rate of a device in SDN. After receiving a forwarding rule (which may also be referred to as a flow entry), a switching device (for example, a first switching device) on which a rendezvous point is located does not need to acquire a forwarding rule each time data is being forwarded. Accordingly, an SDN control device does not need to deliver a forwarding rule to the first switching device each time the data is being forwarded, that is, the forwarding rule may be reused during subsequent data forwarding. This reduces a quantity of forwarding rules delivered by the SDN control device to the first switching device, and accordingly reduces a device resource occupation rate of the SDN control device; and network bandwidth between the SDN control device and the first switching device is also reduced accordingly. In addition, the first switching device does not need to receive a forwarding rule each time the data is being forwarded, which improves a resource utilization rate of the first switching device.

In addition, during a data forwarding process, an aggregation switching device (for example, the access switching device 1 and the aggregation switching device 2 in FIG. 23) on a forwarding path can perform data forwarding according to a forwarding rule (for example, a proactive flow entry in Table 14) delivered by the SDN control device, and does not need to acquire a forwarding rule each time data is received, which reduces resource overheads of a control device, and improves a resource utilization rate of a device in SDN when multicast is implemented. In this embodiment of the present invention, the SDN control device delivers a part of flow entries according to network topology information, where this part of flow entries may be referred to as proactive flow entries. The proactive flow entries are unrelated to a service, but only related to the network topology information. After being delivered, the proactive flow entries may be reused during packet forwarding. After a packet is received, if no matched flow entry exists, the SDN control device delivers another part of flow entries to some switching devices, where this part of flow entries may be referred to as reactive flow entries. The reactive flow entries are related to the service, but are delivered only to some switching devices. In a multicast case, the SDN control device may deliver a reactive flow entry only to a switching device connected to a source end, and does not need to deliver a reactive flow entry to another switching device in a backbone network. The switching device connected to the source end and a switching device on which a rendezvous point is located encapsulate a forwarding path to a second switching device, and a switching device at a backbone layer executes a corresponding operation according to a proactive flow entry. Therefore, flow entries delivered by the SDN control device to a switching device in the backbone network are reduced, so that occupation of resources of the SDN control device and the backbone switching device by flow entries is reduced. In addition, when data or a service packet is being sent to a multicast group member, the data or the service packet is copied and sent, by delivering a proactive flow entry to the switching device on which the rendezvous point is located, to a switching device on which a next rendezvous point is located. A multicast packet is not at the source end, but is copied and forwarded on the switching device on which the rendezvous point is located, and therefore, DC network bandwidth is reduced.

Network Security

A DC generally supports multiple tenants, and allows the tenants to share a physical network of the DC and construct respective independent logical networks. The logical networks of the tenants are mutually separated, and cyberspaces may overlap. Therefore, to improve network security, the SDN control device may further allocate a tenant identifier to a tenant. Then, in step 204, the SDN control device further sends the tenant identifier to the first switching device by delivering the first forwarding rule.

In the embodiment shown in FIG. 5, Table 6 changes into Table 6'.

TABLE 6'

| Switching device | Reactive flow entry |
|---|---|
| Virtual switching device 1 | Match condition: characteristic information of the data<br>Execution action: encapsulating the tenant identifier and information about a path from the virtual switching device 1 to the virtual |

TABLE 6'-continued

| Switching device | Reactive flow entry |
|---|---|
| | switching device 2 and sending, to the port 5, the data in which the tenant identifier and the path information are encapsulated |

The reactive flow entry 1 includes the following information:

a match condition: the characteristic information of the data; and an execution action: encapsulating the tenant identifier and the information about the path from the virtual switching device 1 to the virtual switching device 2 and sending, to the port 5, the data in which the tenant identifier and the path information are encapsulated. The virtual switching device 2 is a switching device connected to the destination end of the data.

In step 205, the SDN control device further delivers, to the $n^{th}$ switching device by delivering the $n^{th}$ forwarding rule, a match condition for matching the tenant identifier and an execution action of removing the tenant identifier. Table 7 changes into Table 7'.

TABLE 7

| Switching device | Reactive flow entry |
|---|---|
| Virtual switching device 2 | Match condition: network identifier and characteristic information of the data<br>Execution action: removing the network identifier and sending, to the port 1, the data from which the network identifier is removed |

In step 206, the first switching device shifts the tenant identifier into the bottom of the stack, and shifts the signpost of the $n^{th}$ switching device into an upper layer of the bottom of the stack. The first switching device further sends, according to the first forwarding rule, the tenant identifier to the second switching device connected to the first switching device, so as to send the tenant identifier to the $n^{th}$ switching device by using the second switching device.

An action of a backbone switching device is similar to steps 207 to 208, and details are not described again.

In step 209, the $n^{th}$ switching device determines the destination end of the data according to the $n^{th}$ forwarding rule by using the tenant identifier and the characteristic information of the data, and then sends the data to the destination end.

To implement network security, it is only needed to change the reactive flow entry delivered by the SDN control device to the edge switching device, and the SDN control device does not need to deliver a proactive flow entry to the backbone switching device; therefore, it is easy to implement. In addition, according to the foregoing method for implementing data forwarding, after receiving a forwarding rule (for example, a proactive flow entry in the foregoing embodiment), a backbone switching device does not need to acquire a forwarding rule each time data is being forwarded, which reduces resource overheads of a control device and a switching device, and improves a utilization rate of resources in an SDN system.

Figure 25:
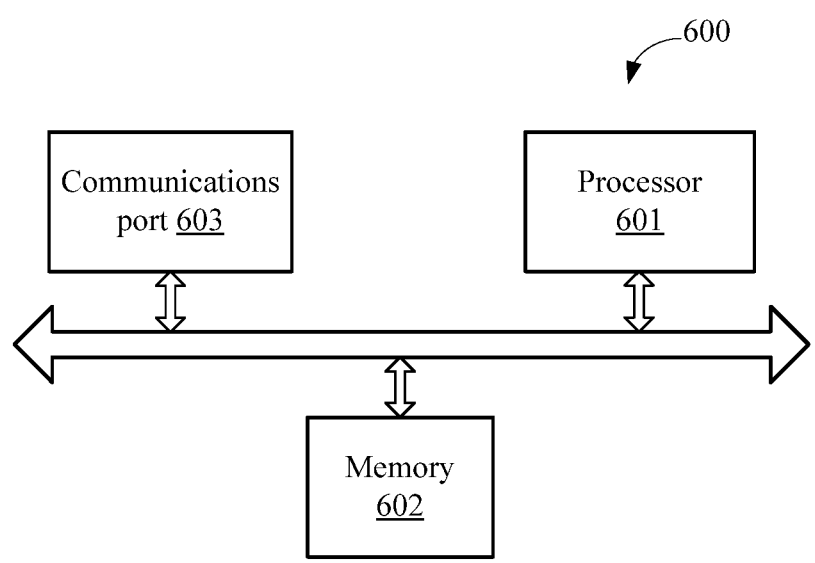
FIG. 25 is a schematic structural diagram of another SDN control device according to an embodiment of the present invention.

Referring to FIG. 25, FIG. 25 is a schematic structural diagram of an SDN control device 600 according to an embodiment of the present invention. The SDN control device 600 includes a processor 601, a memory 602, and a communications port 603.

The processor 601 is configured to execute a program. The program in this embodiment may include program code, where the program code includes a computer operation instruction. The processor may be a central processing unit CPU, or one or more integrated circuits configured to implement this embodiment of the present invention. The program executed by the processor is a program corresponding to each step executed by the SDN control device in the foregoing embodiments.

The memory 602 is configured to store the program executed by the processor.

The communications port 603 is configured to communicate with a switching device.

For specific functions, refer to the descriptions of the SDN control device in the foregoing embodiments.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some ports. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A software-defined networking (SDN) system for implementing data forwarding, comprising:
   an SDN control device; and
   n switching devices, a first of the n switching devices being connected to a source end of data, an $n^{th}$ switching device being connected to a destination end of the data, where $n \geq 3$, and wherein:
      the first switching device is configured to request a forwarding rule from the SDN control device, the request including characteristic information of the data, and to receive a first forwarding rule returned by the SDN control device, the first forwarding rule comprising a match condition which includes the characteristic information of the data and an execution action which indicates to encapsulate information about a path from the first switching device to the $n^{th}$ switching device in the data and to send, to a port on the first switching device directed to a second switching device the encapsulated data, wherein the information about the path from the first switching device to the $n^{th}$ switching device comprises a device identifier of each switching device from a third switching device to the $n^{th}$ switching device that is in the path from the first switching device to the $n^{th}$ switching device; and
      the second switching device is configured to receive the encapsulated data and acquire the information about the path from the first switching device to the $n^{th}$ switching device from the encapsulated data, query according to a device identifier of the third switching device in the information, a second forwarding rule stored in the second switching device, and obtain on the second switching device a port directed to the third switching device for forwarding the data to the third switching device through the port on the second switching device.

2. The SDN system according to claim 1, wherein: the second forwarding rule comprises a match field that includes the device identifier of the third switching device.

3. The SDN system according to claim 2, wherein when $n \geq 4$, the second switching device is further configured to send, to the third switching device, information about a path from the second switching device to the $n^{th}$ switching device, the information about the path from the second switching device to the $n^{th}$ switching device including device identifiers of a fourth switching device to the $n^{th}$ switching device that are in the path from the second switching device to the $n^{th}$ switching device.

4. The SDN system according to claim 3, wherein an $i^{th}$ switching device is configured to receive the data and information about a path from an $i-1^{th}$ switching device to the $n^{th}$ switching device that are sent by the $i-1^{th}$ switching device, i being an integer greater than or equal to 3 and less than n, wherein the information about the path from the $i-1^{th}$ switching device to the $n^{th}$ switching device comprises device identifiers of an $i+1^{th}$ switching device to the $n^{th}$ switching device that are in the path from the $i-1^{th}$ switching device to the $n^{th}$ switching device; and
   the $i^{th}$ switching device is configured to query, according to a device identifier of the $i+1^{th}$ switching device, an $i^{th}$ forwarding rule stored in the $i^{th}$ switching device, and according to the $i^{th}$ forwarding rule, determine a port directed to the $i+1^{th}$ switching device on the $i^{th}$ switching device and forward the data to the $i+1^{th}$ switching device through the port on the $i^{th}$ switching device.

5. The SDN system according to claim 4, wherein if the $i+1^{th}$ switching device is located between the first and $n^{th}$ switching device, the $i^{th}$ switching device being configured to send, to the $i+1^{th}$ switching device, information about a path from the $i^{th}$ switching device to the $n^{th}$ switching device according to the $i^{th}$ forwarding rule, wherein the information about the path from the $i^{th}$ switching device to the $n^{th}$ switching device comprises device identifiers of an $i+2^{th}$ switching device to the $n^{th}$ switching device that are in the path from the $i^{th}$ switching device to the $n^{th}$ switching device, the $i+2^{th}$ switching device being connected to the $i+1^{th}$ switching device.

6. The SDN system according to claim 5, the $i^{th}$ switching device is configured to remove the device identifier of the $i+1^{th}$ switching device from the information about the path from the $i-1^{th}$ switching device to the $n^{th}$ switching device to obtain the device identifiers of the $i+2^{th}$ switching device to the $n^{th}$ switching device, and send, to the $i+1^{th}$ switching device, the device identifiers of the $i+2^{th}$ switching device to the $n^{th}$ switching device, according to the $i^{th}$ forwarding rule.

7. The SDN system according to claim 1, wherein:
   the first switching device is configured to successively push the device identifiers of the third switching device to the $n^{th}$ switching device that are in the path from the first switching device to the $n^{th}$ switching device into a protocol stack, wherein a device identifier of the $n^{th}$ switching device is shifted into the bottom of the stack, and the device identifier of the third switching device is shifted into the top of the stack and the device identifier of each successive switching device sequentially follow thereafter, so that the protocol stack carries the information about the path from the first switching device to the $n^{th}$ switching device.

8. The SDN system according to claim 7, wherein the protocol stack comprises a Multiprotocol Label Switching (MPLS) stack, and one MPLS header of the MPLS stack carries a device identifier of one of the n switching devices.

9. The SDN system according to claim 1, wherein:
the second switching device is configured to identify, according to the device identifier of the third switching device, that a next-hop switching device of the data is the third switching device.

10. A method for implementing data forwarding to a software-defined networking (SDN) system, the SDN system comprising an SDN control device and n switching devices, a first switching device being connected to a source end of data, an $n^{th}$ switching device being connected to a destination end of the data, where n≥3, wherein the method comprises:
requesting, by the first switching device, a forwarding rule from the SDN control device, the request carrying characteristic information of the data;
receiving, by the first switching device, a first forwarding rule returned by the SDN control device, the first forwarding rule comprising a match condition which includes the characteristic information of the data and an execution action which indicates to encapsulate information about a path from the first switching device to the $n^{th}$ switching device in the data and to send, to a port on the first switching device directed to a second switching device the encapsulated data, the information about the path from the first switching device to the nth switching device comprising a device identifier of each switching device from a third switching device to the nth switching device that is in the path from the first switching device to the nth switching device;
sending, by the first switching device, to the second switching device, the encapsulated data according to the first forwarding rule; and
receiving, by the second switching device, the encapsulated data and acquiring the information about the path from the first switching device to the $n^{th}$ switching device from the encapsulated data, querying, according to a device identifier of the third switching device in the information about the path from the first switching device to the $n^{th}$ switching device, a second forwarding rule stored in the second switching device, and obtaining on the second switching device, a port directed to the third switching device, and forwarding the data to the third switching device through the port on the second switching device.

11. The method according to claim 10, wherein: the second forwarding rule comprises a match field that includes the device identifier of the third switching device.

12. The method according to claim 11, wherein when n≥4, the method comprises:
sending, by the second switching device, to the third switching device, information about a path from the second switching device to the $n^{th}$ switching device, wherein the information about the path from the second switching device to the $n^{th}$ switching device comprises device identifiers of a fourth switching device to the $n^{th}$ switching device in the path from the second switching device to the $n^{th}$ switching device.

13. The method according to claim 12, wherein the method comprises:
receiving, by an $i^{th}$ switching device, i being an integer greater than or equal to 3 and less than n, data and information about a path from an $i-1^{th}$ switching device to the $n^{th}$ switching device that are sent by the $i-1^{th}$ switching device, wherein the information about the path from the $i-1^{th}$ switching device to the $n^{th}$ switching device comprises device identifiers of an $i+1^{th}$ switching device to the $n^{th}$ switching device in the path from the $i-1^{th}$ switching device to the $n^{th}$ switching device; and
querying, by the $i^{th}$ switching device, according to a device identifier of the $i+1^{th}$ switching device, an $i^{th}$ forwarding rule stored in the $i^{th}$ switching device, and according to the $i^{th}$ forwarding rule, determines a port, on the $i^{th}$ switching device, directed to the $i+1^{th}$ switching device, and forwards the data to the $i+1^{th}$ switching device through the port, on the $i^{th}$ switching device, of the $i+1^{th}$ switching device.

14. The method according to claim 13, wherein if the $i+1^{th}$ switching device is located between the first switching device and the $n^{th}$ switching device, the method comprises:
sending, by the $i^{th}$ switching device, to the $i+1^{th}$ switching device, information about a path from the $i^{th}$ switching device to the $n^{th}$ switching device according to the $i^{th}$ forwarding rule, wherein the information about the path from the $i^{th}$ switching device to the $n^{th}$ switching device comprises device identifiers of an $i+2^{th}$ switching device to the $n^{th}$ switching device that are in the path from the $i^{th}$ switching device to the $n^{th}$ switching device.

15. The method according to claim 14, wherein the sending, by the $i^{th}$ switching device, to the $i+1^{th}$ switching device, information about a path from the $i^{th}$ switching device to the $n^{th}$ switching device according to the $i^{th}$ forwarding rule, comprises:
removing, by the $i^{th}$ switching device, the device identifier of the $i+1^{th}$ switching device from the information about the path from the $i-1^{th}$ switching device to the $n^{th}$ switching device to obtain device identifiers of the $i+2^{th}$ switching device to the $n^{th}$ switching device, and sending to the $i+1^{th}$ switching device, the device identifiers of the $i+2^{th}$ switching device to the $n^{th}$ switching device, according to the $i^{th}$ forwarding rule.

16. The method according to claim 10, wherein the method comprises:
successively pushing, by the first switching device, the device identifiers of the third switching device to the $n^{th}$ switching device that are in the path from the first switching device to the $n^{th}$ switching device into a protocol stack, wherein a device identifier of the $n^{th}$ switching device is shifted to a lower portion of the stack, and the device identifier of the third switching device is shifted to an upper portion of the stack and the device identifier for each successive switching device sequentially follow thereafter, so that the protocol stack carries the information about the path from the first switching device to the $n^{th}$ switching device.

17. The method according to claim 16, wherein the protocol stack comprises a Multiprotocol Label Switching (MPLS) stack, and one MPLS header of the MPLS stack carries a device identifier of one switching device.

18. The method according to claim 10, wherein the method comprises:
identifying, by the second switching device, according to the device identifier of the third switching device, a next-hop switching device of the data is the third switching device.

19. A method for implementing data forwarding to a software-defined networking (SDN) system, the SDN system comprising an SDN control device and n switching devices, a first switching device of then switching devices being connected to a source end of data, an $n^{th}$ switching device being connected to a destination end of the data, where $n \geq 3$, wherein the method comprises:

receiving, by the SDN control device, a request for a forwarding rule from the first switching device, the request carrying characteristic information of the data;

sending, by the SDN control device, a first forwarding rule to the first switching device according to the characteristic information of the data, wherein the first forwarding rule comprises a match condition which includes the characteristic information of the data and an execution action which indicates to encapsulate information about a path from the first switching device to the $n^{th}$ switching device in the data and to send, to a port on the first switching device directed to a second switching device the encapsulated data, wherein the information about the path from the first switching device to the $n^{th}$ switching device comprises a device identifier of each switching device from a third switching device to the $n^{th}$ switching device that is in the path from the first switching device to the $n^{th}$ switching device; and sending, by the SDN control device, an $n^{th}$ forwarding rule to the $n^{th}$ switching device according to the characteristic information of the data.

20. The method according to claim 19, further comprising:

sending, by the SDN control device, a second forwarding rule to a second of n switching devices according to network topology information of the SDN system, wherein the second forwarding rule is configured to instruct the second switching device to: obtain, on the second switching device, a port directed to the third switching device by using a device identifier of the third switching device in the information about the path from the first switching device to the $n^{th}$ switching device, and forward the data to the third switching device through the port, on the second switching device.

21. The method according to claim 20, further comprising:

selecting, by the SDN control, the path from the first switching device to the $n^{th}$ switching device according to the characteristic information of the data and the network topology information of the SDN system; and the second forwarding rule comprises a match field that includes the device identifier of the third switching device.

22. The method according to claim 21, further comprising:

delivering, by the SDN control device, an $i^{th}$ forwarding rule to an $i^{th}$ switching device according to the network topology information of the SDN system, wherein i is an integer greater than or equal to 3 and less than n, the $i^{th}$ forwarding rule being configured to instruct the $i^{th}$ switching device to obtain a port, on the $i^{th}$ switching device, directed to an $i+1^{th}$ switching device and forward the data to the $i+1^{th}$ switching device through the port on the $i^{th}$ switching device.

23. The method according to claim 22, wherein the information about the path from the $i-1^{th}$ switching device to the $n^{th}$ switching device comprises a device identifier of the $i+1^{th}$ switching device to the $n^{th}$ switching device that is in the path from the first switching device to the $n^{th}$ switching device; and if the $i+1^{th}$ switching device is not the $n^{th}$ switching device, the $i^{th}$ forwarding rule is further configured to instruct the $i^{th}$ switching device to: remove the device identifier of the $i+1^{th}$ switching device, and send, to the $i+1^{th}$ switching device, information about a path from the $i^{th}$ switching device to the $n^{th}$ switching device comprising a device identifier of an $i+2^{th}$ switching device to the $n^{th}$ switching device that is in the path from the $i^{th}$ switching device to the $n^{th}$ switching device.

24. A software-defined networking (SDN) control device comprising at least one processor, a memory, and a communications port, wherein:

the communications port is configured to communicate with each of a plurality of switching devices in an SDN system, a first switching device of the plurality of switching devices being connected to a source end of data, and an $n^{th}$ switching device of the plurality of switching devices being connected to a destination end of the data, where $n \geq 3$;

the memory is configured to store a program; and the at least one processor is configured to execute the program to implement the following process:

processing a request for a forwarding rule received from the first switching device, wherein the request carries characteristic information of the data and the first switching device;

sending a first forwarding rule to the first switching device according to the characteristic information of the data, wherein the first forwarding rule comprises a match condition which includes the characteristic information of the data and an execution action which indicates to encapsulate information about a path from the first switching device to the $n^{th}$ switching device in the data and to send, to a port on the first switching device directed to a second switching device the encapsulated data, wherein the information about the path from the first switching device to the $n^{th}$ switching device comprises a device identifier of each switching device from a third switching device to the $n^{th}$ switching device that is in the path from the first switching device to the $n^{th}$ switching device; and sending an $n^{th}$ forwarding rule to the $n^{th}$ switching device according to the characteristic information of the data.

* * * * *